(12) United States Patent
Abraham et al.

(10) Patent No.: US 10,223,111 B2
(45) Date of Patent: *Mar. 5, 2019

(54) PROCESSORS, METHODS, SYSTEMS, AND INSTRUCTIONS TO GENERATE SEQUENCES OF INTEGERS IN WHICH INTEGERS IN CONSECUTIVE POSITIONS DIFFER BY A CONSTANT INTEGER STRIDE AND WHERE A SMALLEST INTEGER IS OFFSET FROM ZERO BY AN INTEGER OFFSET

(71) Applicant: Intel Corporation, Santa Clara, CA (US)

(72) Inventors: Seth Abraham, Tempe, AZ (US); Elmoustapha Ould-Ahmed-Vall, Chandler, AZ (US); Robert Valentine, Kiryat Tivon (IL); Zeev Sperber, Zichron Yackov (IL); Amit Gradstein, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,796

(22) Filed: Sep. 30, 2017

(65) Prior Publication Data
US 2018/0088942 A1 Mar. 29, 2018

Related U.S. Application Data

(63) Continuation of application No. 13/976,580, filed as application No. PCT/US2011/067047 on Dec. 22, 2011, now Pat. No. 9,898,283.

(51) Int. Cl.
*G06F 9/30* (2018.01)
*G06F 9/345* (2018.01)

(52) U.S. Cl.
CPC ........ *G06F 9/3001* (2013.01); *G06F 9/30032* (2013.01); *G06F 9/30036* (2013.01);
(Continued)

(58) Field of Classification Search
None
See application file for complete search history.

(56) References Cited

U.S. PATENT DOCUMENTS 5,996,057 A 11/1999 Scales, III et al.
6,185,672 B1 2/2001 Trull
(Continued)

FOREIGN PATENT DOCUMENTS

CN 1508674 A 6/2004
CN 1158613 C 7/2004
(Continued)

OTHER PUBLICATIONS

Intel, "Intel 64 and IA-32 Architectures Software Developer's Manual", vol. 1: Basic Architecture, Order No. 253665-040US, Oct. 2011, 548 pages.
(Continued)

*Primary Examiner* — Corey S Faherty
(74) *Attorney, Agent, or Firm* — NDWE, LLP

(57) ABSTRACT

A method of an aspect includes receiving an instruction. The instruction indicates an integer stride, indicates an integer offset, and indicates a destination storage location. A result is stored in the destination storage location in response to the instruction. The result includes a sequence of at least four integers in numerical order with a smallest one of the at least four integers differing from zero by the integer offset and with all integers of the sequence in consecutive positions differing by the integer stride. Other methods, apparatus, systems, and instructions are disclosed.

11 Claims, 32 Drawing Sheets

(52) U.S. Cl.
CPC ...... *G06F 9/30163* (2013.01); *G06F 9/30167* (2013.01); *G06F 9/3455* (2013.01)

(56) References Cited

U.S. PATENT DOCUMENTS

| | | | |
|---|---|---|---|
| 6,266,759 | B1 | 7/2001 | Birrittella |
| 6,327,651 | B1 | 12/2001 | Dubey et al. |
| 6,704,834 | B1 * | 3/2004 | Demeure ............ G06F 12/0207 711/202 |
| 6,839,828 | B2 | 1/2005 | Gschwind et al. |
| 7,155,601 | B2 | 12/2006 | Chennupaty et al. |
| 7,370,180 | B2 | 5/2008 | Nancekievill et al. |
| 7,466,443 | B2 | 12/2008 | Weiner et al. |
| 7,529,918 | B2 | 5/2009 | Taunton |
| 7,725,678 | B2 | 5/2010 | Krueger et al. |
| 7,865,693 | B2 | 1/2011 | Eichenberger et al. |
| 7,873,812 | B1 | 1/2011 | Mimar |
| 7,900,025 | B2 | 3/2011 | Gschwind |
| 2002/0112147 | A1 | 8/2002 | Chennupaty et al. |
| 2002/0152367 | A1 | 10/2002 | Park |
| 2003/0196075 | A1 | 10/2003 | Akkary et al. |
| 2003/0212724 | A1 | 11/2003 | Ovshinsky et al. |
| 2005/0198474 | A1 | 9/2005 | Nancekievill et al. |
| 2005/0273576 | A1 * | 12/2005 | Wilson ................ G06F 9/30036 711/217 |
| 2006/0184765 | A1 | 8/2006 | Krueger et al. |
| 2007/0011441 | A1 | 1/2007 | Eichenberger et al. |
| 2008/0077768 | A1 | 3/2008 | Inoue et al. |
| 2008/0195846 | A1 | 8/2008 | Shen et al. |
| 2009/0013155 | A1 | 1/2009 | Wang et al. |
| 2009/0037694 | A1 | 2/2009 | Luick et al. |
| 2009/0187746 | A1 | 7/2009 | Symes et al. |
| 2009/0193300 | A1 | 7/2009 | Xia et al. |
| 2009/0254736 | A1 | 10/2009 | Symes et al. |
| 2010/0095097 | A1 | 4/2010 | Gschwind |
| 2010/0115233 | A1 * | 5/2010 | Brewer ............... G06F 9/30036 712/7 |
| 2011/0153997 | A1 | 6/2011 | Loktyukhin et al. |
| 2011/0258418 | A1 | 10/2011 | Roussel |
| 2013/0275482 | A1 | 10/2013 | Abraham et al. |
| 2013/0275729 | A1 | 10/2013 | Abraham et al. |
| 2013/0283019 | A1 | 10/2013 | Ould-Ahmed-Vall et al. |

FOREIGN PATENT DOCUMENTS

| | | |
|---|---|---|
| CN | 1605062 A | 4/2005 |
| CN | 101504600 A | 8/2009 |
| CN | 101620525 A | 1/2010 |
| CN | 101730880 A | 6/2010 |
| CN | 101925877 A | 12/2010 |
| CN | 101926095 A | 12/2010 |
| CN | 102109977 A | 6/2011 |
| EP | 0947918 A2 | 10/1999 |
| TW | 470914 A | 1/2002 |
| TW | 200525417 A | 8/2005 |
| TW | 200602974 A | 1/2006 |
| TW | I283353 B | 7/2007 |
| TW | 200821919 A | 5/2008 |
| TW | I326841 B | 7/2010 |
| TW | 201113717 A | 4/2011 |
| TW | 201135589 A | 10/2011 |
| WO | 2013/095580 A1 | 6/2013 |
| WO | 2013095554 A1 | 6/2013 |
| WO | 2013095555 A1 | 6/2013 |
| WO | 2013095563 A1 | 6/2013 |
| WO | 2013095564 A1 | 6/2013 |

OTHER PUBLICATIONS

Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.

Intel, "Intel 64 and Ia-32 Architectures Software Developer's Manual", vol. 3 (3A, 3B & 3C): System Programming Guide, Order No. 325384-040US, Oct. 2011, 1916 pages.

Intel, "Intel Advanced Vector Extensions Programming Reference", Jun. 2011, 595 pages.

Notice of Allowance received for Taiwan Patent Application No. 101143441, dated Jul. 23, 2015, 3 pages of Taiwan Notice of Allowance including 1 page of English Translation.

Office Action and Search Report received for Taiwan Patent Application No. 101143441, dated Sep. 26, 2014, 4 pages of Taiwan Office Action Only.

Final Office Action received for U.S. Appl. No. 13/976,580, dated Jul. 5, 2016, 9 pages.

Non-Final Office Action received for U.S. Appl. No. 13/976,580 dated Dec. 9, 2015, 7 pages.

Notice of Allowance received for U.S. Appl. No. 13/976,580, dated Oct. 6, 2017, 9 pages.

Office Action received for Chinese Patent Application No. 201180075711.X, dated Aug. 14, 2017, 21 pages of Chinese Office Action including 13 pages of English Translation.

Office Action received for Chinese Patent Application No. 201180075711.X, dated Oct. 31, 2016, 19 pages of Chinese Office Action including 9 pages of English Translation.

International Preliminary Report on Patentability and Written Opinion received for PCT Patent Application No. PCT/US2011/067047, dated Jul. 3, 2014, 6 pages.

International Search Report and Written Opinion received for PCT Patent Application No. PCT/US2011/067047, dated Aug. 27, 2012, 11 pages.

Nuzman, et al., "Auto-Vectorization of Interleaved Data for SIMD", ACM, Jun. 2006, pp. 132-143.

Ren, et al., "Optimizing Data Permutations for SIMD Devices", ACM, Jun. 2006, pp. 118-131.

Shen, et al., "Modern Processor Design", Fundamentals of Superscalar Processors, Oct. 9, 2002, 498 pages.

Notice of Allowance received for Chinese Patent Application No. 201180075711.X, dated Mar. 14, 2018, 4 pages of Chinese Notice of Allowance including 2 pages of English Translation.

Response for Taiwan Patent Application No. 101143441, filed on Mar. 26, 2015 to Office Action dated Sep. 26, 2014, 3 pages of Official copy only.

Response for U.S. Appl. No. 13/976,580, filed Jan. 5, 2017 to Final Office Action dated Jul. 5, 2016, 10 pages.

Response for U.S. Appl. No. 13/976,580, filed May 10, 2016 to Non-Final Office Action dated Dec. 9, 2015, 11 pages.

Response for Chinese Patent Application No. 201180075711.X filed on Dec. 29, 2017 to Office Action dated Aug. 14, 2017, 4 pages of Official copy only.

Advisory Action from U.S. Appl. No. 13/976,766, dated Dec. 15, 2016, 3 pages.

Advisory Action from U.S. Appl. No. 13/977,349, dated Mar. 19, 2018, 3 pages.

Final Office Action from U.S. Appl. No. 13/976,766, dated Apr. 12, 2018, 9 pages.

Final Office Action from U.S. Appl. No. 13/976,766, dated Jul. 1, 2016, 10 pages.

Final Office Action from U.S. Appl. No. 13/977,217, dated Jul. 1, 2016, 10 pages.

Final Office Action from U.S. Appl. No. 13/977,349, dated Jul. 1, 2016, 10 pages.

Final Office Action from U.S. Appl. No. 13/977,349, dated Oct. 10, 2017, 10 pages.

Final Office Action from U.S. Appl. No. 13/977,356, dated Jul. 1, 2016, 9 pages.

International Preliminary Report on Patentability for Application No. PCT/US2011/066999, dated Jul. 3, 2014, 6 pages.

International Preliminary Report on Patentability for Application No. PCT/US2011/067000, dated Jul. 3, 2014, 8 pages.

International Preliminary Report on Patentability for Application No. PCT/US2011/067013, dated Jul. 3, 2014, 9 pages.

International Preliminary Report on Patentability for Application No. PCT/US2011/067014, dated Jul. 3, 2014, 6 pages.

International Search Report and Written Opinion for Application No. PCT/US2011/066999, dated Aug. 27, 2012, 6 pages.

(56) References Cited

OTHER PUBLICATIONS

International Search Report and Written Opinion for Application No. PCT/US2011/067000, dated Aug. 24, 2012, 5 pages.
International Search Report and Written Opinion for Application No. PCT/US2011/067013, dated Aug. 24, 2012, 5 pages.
International Search Report and Written Opinion for Application No. PCT/US2011/067014, dated Aug. 14, 2012, 9 pages.
Non Final Office Action from U.S. Appl. No. 13/977,217, dated Dec. 9, 2015, 15 pages.
Non Final Office Action from U.S. Appl. No. 13/977,356, dated Dec. 9, 2015, 15 pages.
Non-Final Office Action from U.S. Appl. No. 13/976,766, dated Dec. 11, 2015, 17 pages.
Non-Final Office Action from U.S. Appl. No. 13/976,766, dated Oct. 10, 2017, 11 pages.
Non-Final Office Action from U.S. Appl. No. 13/977,349, dated Dec. 9, 2015, 17 pages.
Non-Final Office Action from U.S. Appl. No. 13/977,349, dated Feb. 3, 2017, 11 pages.
Non-Final Office Action from U.S. Appl. No. 15/721,799, dated May 22, 2018, 16 pages.
Notice of Allowance from foreign counterpart Chinese Patent Application No. 201180075696.9, dated Aug. 21, 2017, 4 pages.
Notice of Allowance from foreign counterpart Taiwan Patent Application No. 101143443, dated Aug. 24, 2015, 3 pages.
Notice of Allowance from foreign counterpart Taiwan Patent Application No. 101145984, dated Nov. 24, 2015, 2 pages.
Notice of Allowance from foreign counterpart Taiwan Patent Application No. 101145985, dated Jun. 2, 2015, 2 pages.
Notice of Allowance from foreign counterpart Taiwan Patent Application No. 101146865, dated Jun. 3, 2015, 3 pages.
Notice of Allowance from foreign counterpart Taiwan Patent Application No. 104131599, dated Sep. 12, 2017, 3 pages.
Notice of Allowance from U.S. Appl. No. 13/977,217, dated Oct. 6, 2017, 21 pages.
Notice of Allowance from U.S. Appl. No. 13/977,356, dated Dec. 16, 2016, 8 pages.
First Office Action and Search Report from foreign counterpart Chinese Patent Application No. 201180075696.9, dated Oct. 24, 2016, 23 pages. (English Translation for Office Action only).
Office Action and Search Report from foreign counterpart Chinese Patent Application No. 201180075787.2, dated Sep. 27, 2016, 10 pages.
Office Action and Search Report from foreign counterpart Taiwan Patent Application No. 104131599, dated Oct. 14, 2016, 9 pages of Taiwan Office Action including 1 page English translation of Search Report.
Office Action and Search Report from Foreign Counterpart Taiwan Patent Application No. 106135154, dated May 31, 2018, 4 pages. (Translation available only for Search Report).
Office Action from foreign counterpart Chinese Patent Application No. 201180075695.4, dated Aug. 16, 2016, 18 pages.
Office Action from foreign counterpart Chinese Patent Application No. 201180075695.4, dated Mar. 22, 2017, 16 pages.
Office Action from foreign counterpart Chinese Patent Application No. 201180075787.2, dated Jul. 27, 2017, 7 pages.
First Office Action and Search Report from foreign counterpart Chinese Patent Application No. 201180076416.6, dated Dec. 2, 2016, 22 pages. (English Translation for Office Action only).
Office Action from foreign counterpart Taiwan Patent application No. 101143443, dated Feb. 12, 2015, 13 pages. (Translation available only for Search Report).
Office Action from foreign counterpart Taiwan Patent Application No. 101145984, dated Jul. 17, 2015, 7 pages.
Office Action from foreign counterpart Taiwan Patent Application No. 101145985, dated Nov. 11, 2014, 7 pages.
Office Action from foreign counterpart Taiwan Patent Application No. 101146865, dated Oct. 2, 2014, 4 pages.
Patterson, et al., Computer Architecture: A Quantitative Approach, Second Edition 1996, 946 pages.
Ren, et al., Optimizing Data Permutations for SIMD Devices, Jun. 6, 2006, pp. 118-131.
Requirement for Restriction/Election from U.S. Appl. No. 13/976,580, dated Sep. 4, 2015, 6 pages.
Requirement for Restriction/Election from U.S. Appl. No. 13/976,766, dated Sep. 8, 2015, 6 pages.
Requirement for Restriction/Election from U.S. Appl. No. 13/977,217, dated Sep. 4, 2015, 6 pages.
Requirement for Restriction/Election from U.S. Appl. No. 13/977,349, dated Sep. 4, 2015, 7 pages.
Requirement for Restriction/Election from U.S. Appl. No. 13/977,356, dated Sep. 4, 2015, 6 pages.
Shen, et al., Modern Processor Design: Fundamentals of Superscalar Processors, Oct. 9, 2002, 488 pages.
Third Office Action from foreign counterpart Chinese Patent Application No. 201180076416.6, dated Mar. 28, 2018, 7 pages.
Non-Final Office Action from U.S. Appl. No. 15/721,803, dated Dec. 13, 2018, 37 pages.
Notice of Allowance from U.S. Appl. No. 15/721,799, dated Oct. 11, 2018, 22 pages.

* cited by examiner

FIG. 2

METHOD OF
PROCESSING
PACKED DATA
REARRANGEMENT
CONTROL INDEXES
GENERATION
INSTRUCTION
212

↓

RECEIVE PACKED DATA REARRANGEMENT CONTROL INDEXES GENERATION INSTRUCTION INDICATING FIRST DESTINATION STORAGE LOCATION — 213

↓

STORE RESULT IN FIRST DESTINATION STORAGE LOCATION IN RESPONSE TO PACKED DATA REARRANGEMENT CONTROL INDEXES GENERATION INSTRUCTION, RESULT INCLUDING SEQUENCE OF AT LEAST FOUR NON-NEGATIVE INTEGERS WITH PLURALITY OF DIFFERENT VALUES REPRESENTING PACKED DATA REARRANGEMENT CONTROL INDEXES — 214

↓

RECEIVE PACKED DATA REARRANGEMENT INSTRUCTION INDICATING PACKED DATA REARRANGEMENT CONTROL INDEXES, AT LEAST ONE SOURCE PACKED DATA, AND SECOND DESTINATION STORAGE LOCATION — 215

↓

STORE PACKED DATA RESULT IN SECOND DESTINATION STORAGE LOCATION IN RESPONSE TO PACKED DATA REARRANGEMENT INSTRUCTION, PACKED DATA RESULT INCLUDING DATA ELEMENTS FROM AT LEAST ONE SOURCE PACKED DATA REARRANGED ACCORDING TO PACKED DATA REARRANGEMENT CONTROL INDEXES — 216

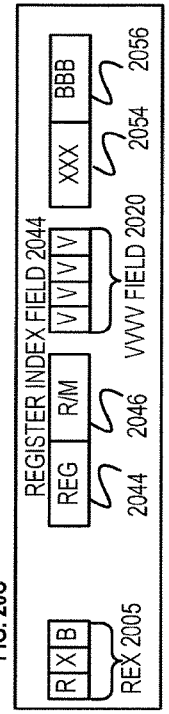
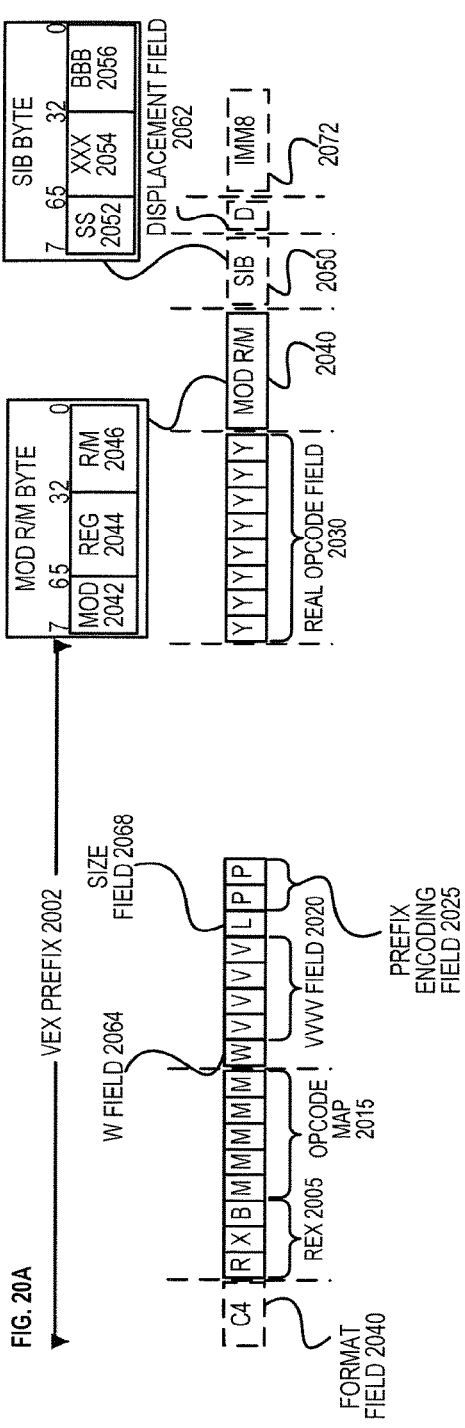
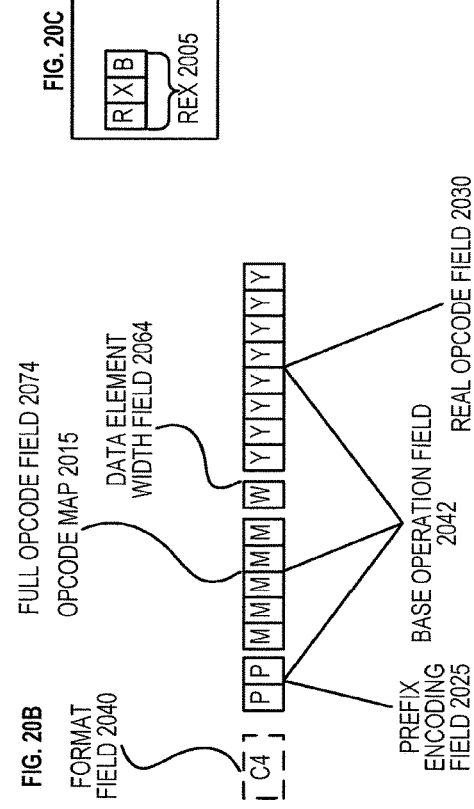

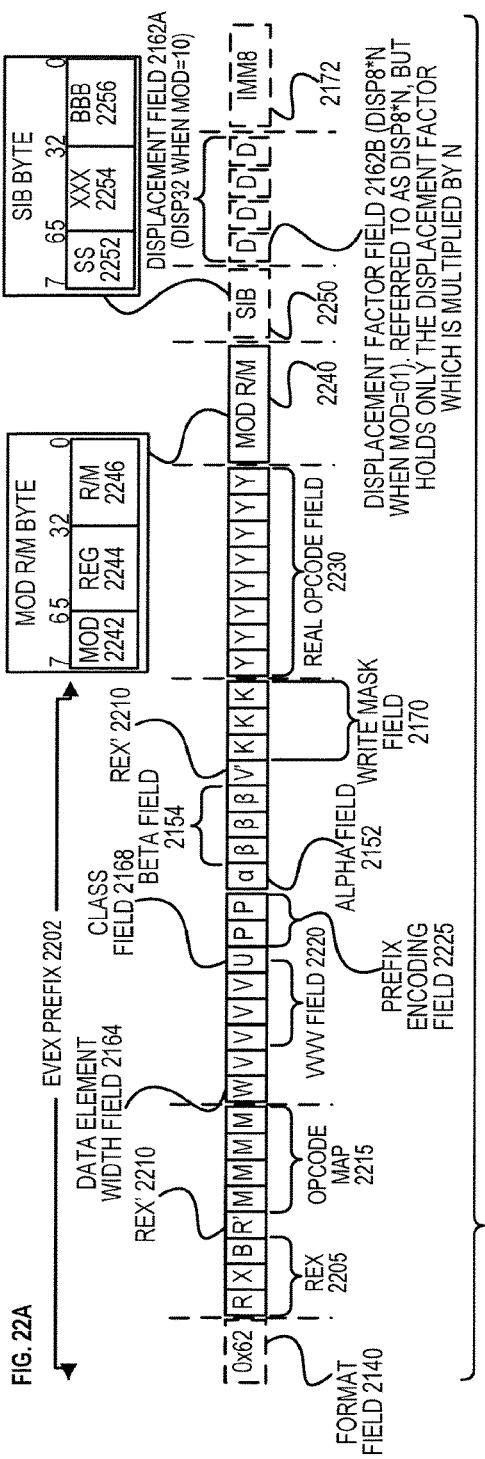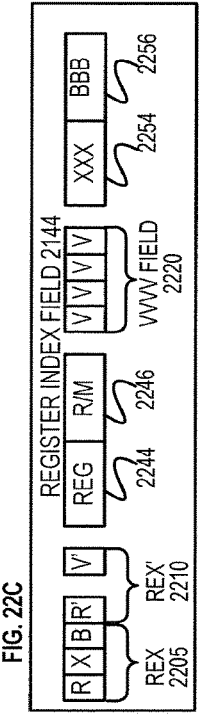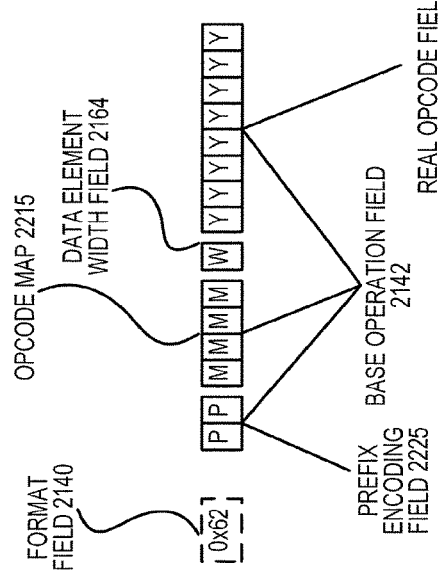

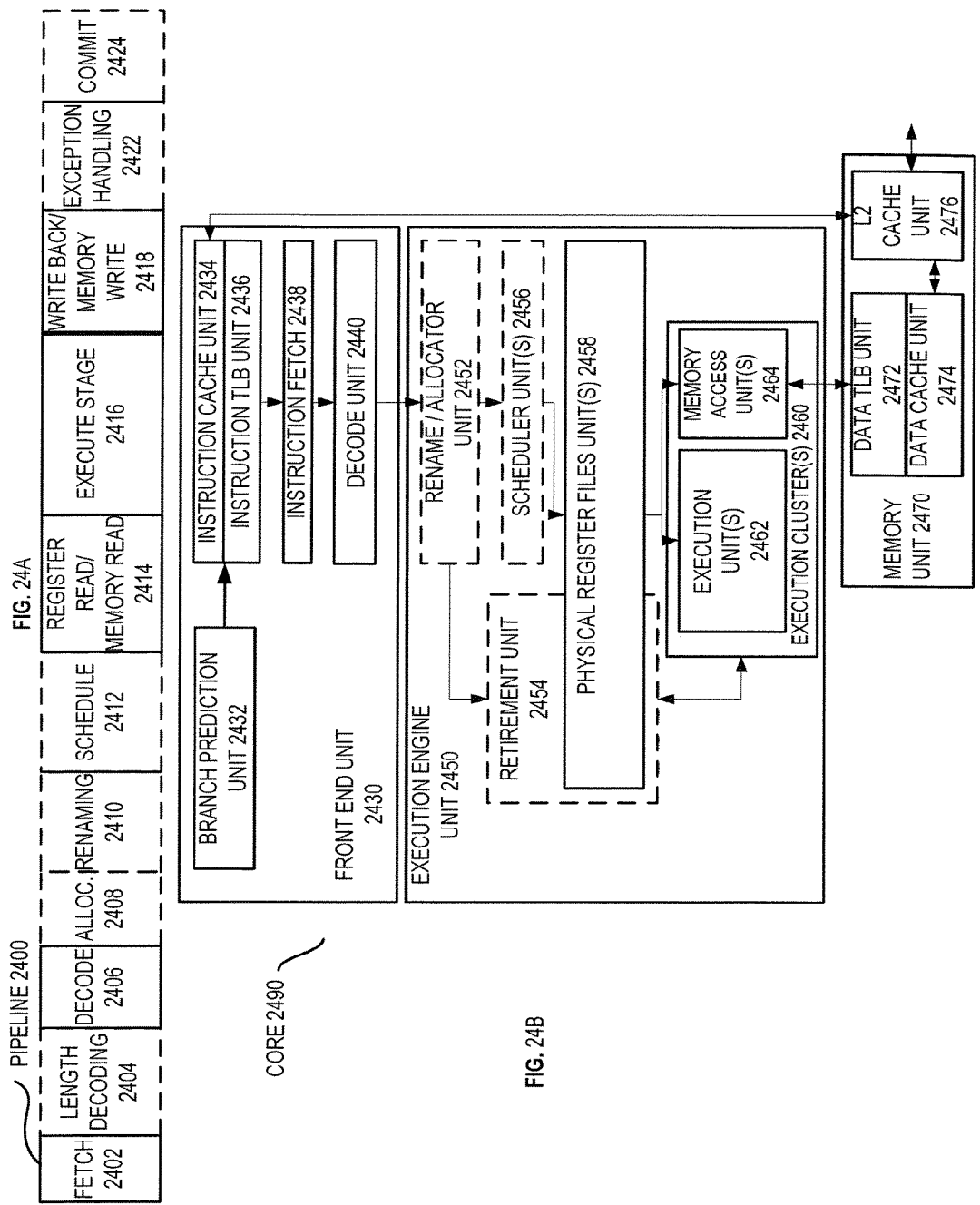

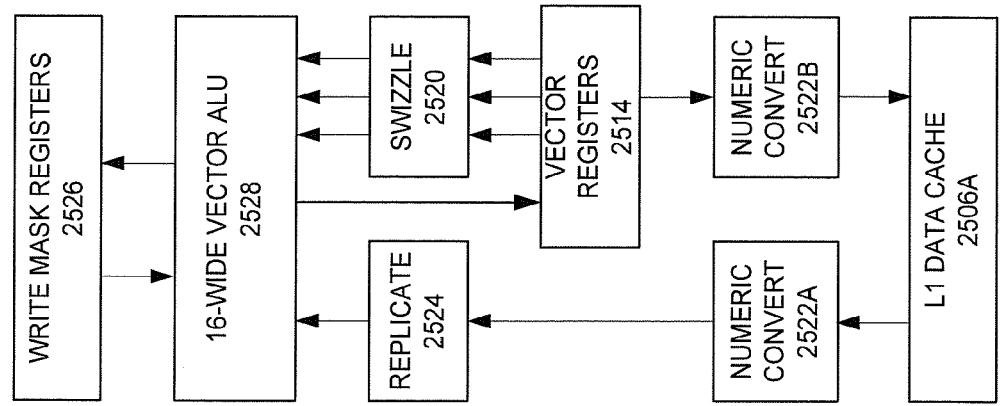
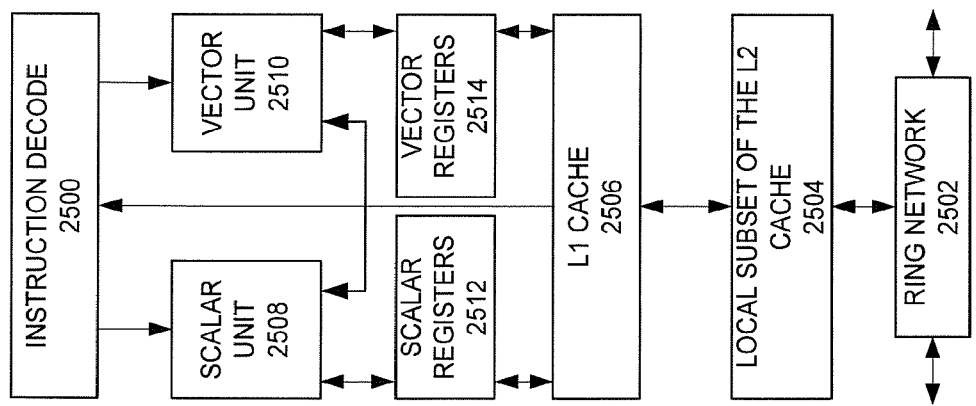

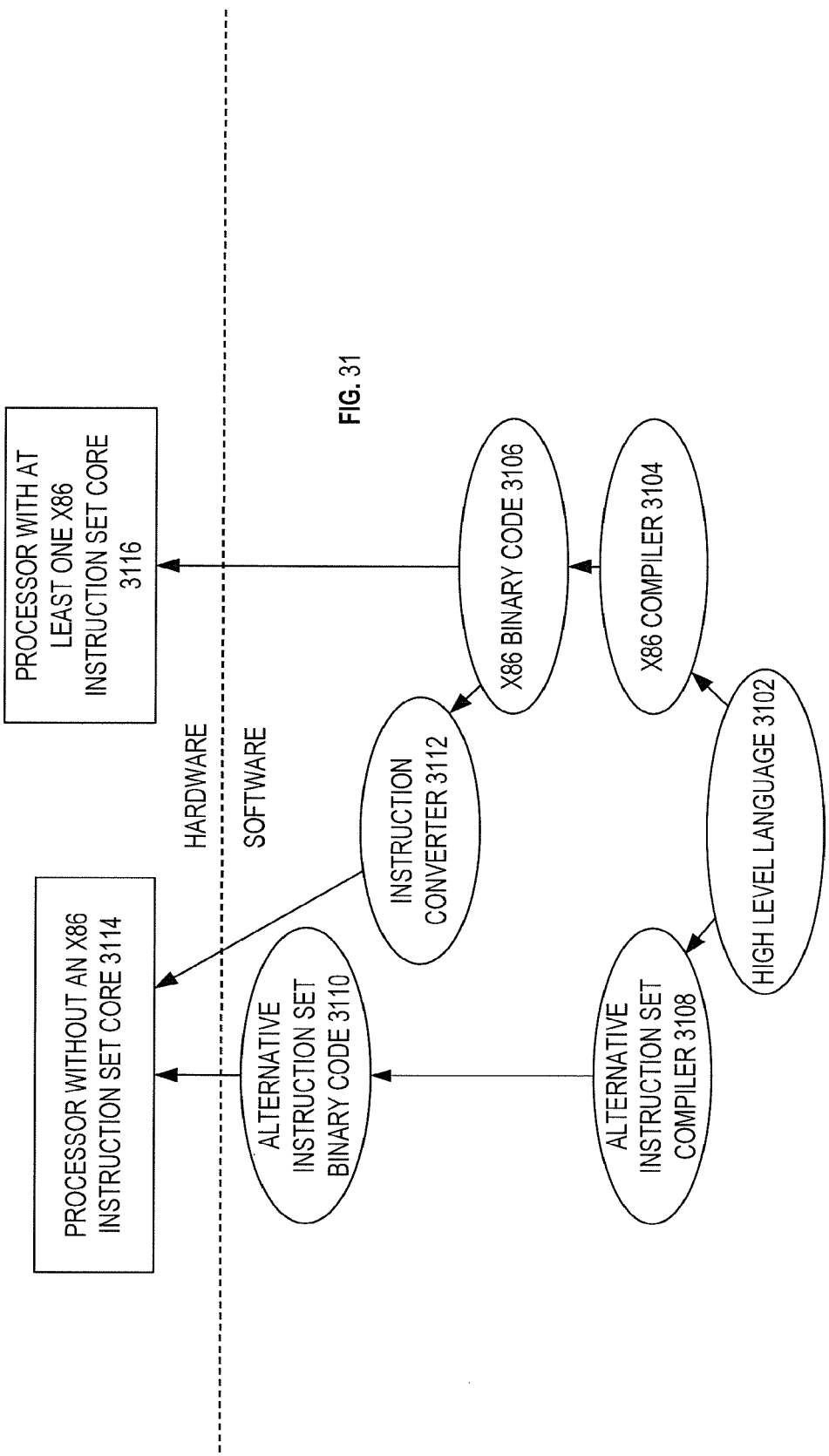

PROCESSORS, METHODS, SYSTEMS, AND INSTRUCTIONS TO GENERATE SEQUENCES OF INTEGERS IN WHICH INTEGERS IN CONSECUTIVE POSITIONS DIFFER BY A CONSTANT INTEGER STRIDE AND WHERE A SMALLEST INTEGER IS OFFSET FROM ZERO BY AN INTEGER OFFSET

CROSS REFERENCE TO RELATED APPLICATIONS

This application is a Continuation of U.S. patent application Ser. No. 13/976,580, filed Jun. 27, 2013, titled "PROCESSORS, METHODS, SYSTEMS, AND INSTRUCTIONS TO GENERATE SEQUENCES OF INTEGERS IN WHICH INTEGERS IN CONSECUTIVE POSITIONS DIFFER BY A CONSTANT INTEGER STRIDE AND WHERE A SMALLEST INTEGER IS OFFSET FROM ZERO BY AN INTEGER OFFSET", which is a U.S. National Phase Application under 35 U.S.C. § 371 of International Application No. PCT/US2011/067047, filed Dec. 22, 2011. International Application No. PCT/US2011/067047 is hereby incorporated herein by this reference in its entirety and for all purposes.

BACKGROUND

Field

Embodiments relate to processors. In particular, embodiments relate to processors having instruction sets that include instructions that use control indexes.

Background Information

Many processors have Single Instruction, Multiple Data (SIMD) architectures. In SIMD architectures, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel.

Multiple data elements may be packed within one register or memory location as packed data or vector data. In packed data, the bits of the register or other storage location may be logically divided into a sequence of multiple data elements. For example, a 256-bit wide packed data register may have four 64-bit wide packed data elements, eight 32-bit wide packed data elements, sixteen 16-bit wide packed data elements, etc. Each of the packed data elements may represent a separate individual piece of data (e.g., a red, green, blue, or alpha color component of a pixel, or a real or imaginary component of a complex number, etc.) that may be operated upon separately or independently of the others.

Some SIMD architectures have instructions to flexibly rearrange packed data elements within one or more source packed data according to control indexes. Examples of such instructions are permuted instructions and shuffle instructions. The control indexes control how the packed data elements are rearranged by the instructions.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 2 is a block flow diagram of an example embodiment of a method of processing an example embodiment of a packed data rearrangement control indexes generation instruction.

FIG. 20A illustrates an exemplary AVX instruction format including a VEX prefix, real opcode field, Mod R/M byte, SIB byte, displacement field, and IMM8.

FIG. 20B illustrates which fields from FIG. 20A make up a full opcode field and a base operation field. FIG. 20C illustrates which fields from FIG. 20A make up a register index field.

FIG. 22A is a block diagram illustrating an exemplary specific vector friendly instruction format according to embodiments of the invention.

FIG. 22B is a block diagram illustrating the fields of the specific vector friendly instruction format that make up the full opcode field according to one embodiment of the invention.

FIG. 22C is a block diagram illustrating the fields of the specific vector friendly instruction format that make up the register index field according to one embodiment of the invention.

FIG. 24A is a block diagram illustrating both an exemplary in-order pipeline and an exemplary register renaming, out-of-order issue/execution pipeline according to embodiments of the invention.

FIG. 24B shows processor core including a front end unit coupled to an execution engine unit, and both are coupled to a memory unit.

FIG. 25A is a block diagram of a single processor core, along with its connection to the on-die interconnect network and with its local subset of the Level 2 (L2) cache, according to embodiments of the invention.

FIG. 25B is an expanded view of part of the processor core in FIG. 25A according to embodiments of the invention.

FIG. 31 is a block diagram contrasting the use of a software instruction converter to convert binary instructions in a source instruction set to binary instructions in a target instruction set according to embodiments of the invention.

DETAILED DESCRIPTION

Figure 1:
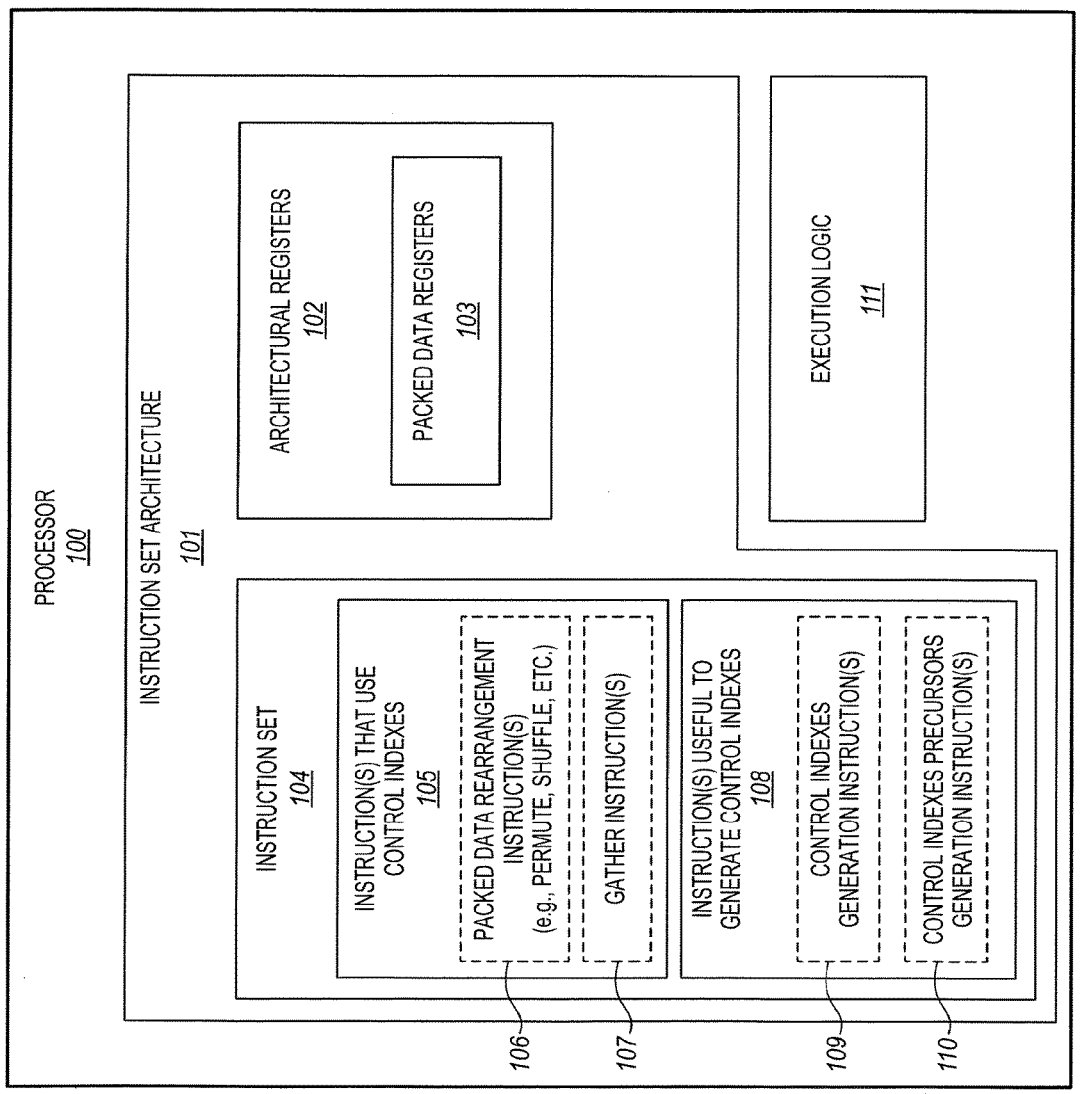
FIG. 1 is a block diagram of an example embodiment of a processor to process instructions useful to generate control indexes.

In the following description, numerous specific details are set forth (e.g., specific processors, methods, operations, instructions, numerical patterns, and data formats). However, it is understood that embodiments of the invention may be practiced without these specific details. In other instances, well-known circuits, structures and techniques have not been shown in detail in order not to obscure the understanding of this description.

Control indexes for permute instructions and shuffle instructions are typically built up progressively from scratch by executing a series of general-purpose instructions that operate on source packed data operands having source packed data elements. For example, part of a method of generating the control indexes may include executing a series of general-purpose packed data arithmetic instructions in order to perform a series of packed data arithmetic operations on source packed data elements to ultimately convert the source packed data elements into the control indexes.

One factor that tends to limit the usefulness of permute and shuffle instructions, as well as other packed data rearrangement instructions in general, is the number of instructions that typically need to be executed in order to generate the permute control indexes, shuffle control indexes, or other packed data rearrangement control indexes. Several instructions (e.g., around 4 to 10, or even more) may be needed to generate a set of control indexes. Moreover, the number of instructions needed generally tends to increase as the total number of packed data elements increases, which tends to be the case over time, as the bit-width of packed data registers increases.

Executing these instructions tends to be expensive in terms of processing time, processor resource utilization, and power consumption. Moreover, such expense tends to detract from, or diminish, the overall benefit provided by the packed data rearrangement instructions. In some cases, after the control indexes have been generated and used, the control indexes may be discarded, in which case they may need to be regenerated from scratch if the need arises. In other cases, after the control indexes have been generated and used, the control indexes may be stored in main memory, and then later retrieved from the main memory over a system bus when they are needed. This may help to avoid generating the control indexes from scratch each time they are needed, although retrieving the control indexes from main memory also tends to take a significant amount of time.

Disclosed herein are instructions that are useful to generate control indexes for other instructions (e.g., permute instructions, shuffle instructions, other packed data rearrangement instructions, and other instructions that use control indexes). Also disclosed are processors to execute the instructions, methods performed by the processors when processing or executing the instructions, and systems incorporating one or more processors to process or execute the instructions. The various processors and systems disclosed elsewhere herein are suitable. Advantageously, these instructions, processors, methods, and systems may help to reduce the amount of processing time and/or the number of instructions that need to be executed in order to generate the control indexes.

FIG. 1 is a block diagram of an example embodiment of a processor 100 to process instructions useful to generate control indexes. The processor may be any of various complex instruction set computing (CISC) processors, various reduced instruction set computing (RISC) processors, various very long instruction word (VLIW) processors, various hybrids thereof, or other types of processors entirely. In some embodiments, the processor may be a general-purpose processor (e.g., a general-purpose microprocessor), although this is not required. Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The processor has an instruction set architecture (ISA) 101. The ISA represents a part of the architecture of the processor related to programming. The ISA commonly includes the native instructions, architectural registers, data types, addressing modes, memory architecture, interrupt and exception handling, and external input and output (I/O) of the processor. The ISA is distinguished from the microarchitecture, which generally represents the particular processor design techniques selected to implement the ISA. Processors with different microarchitectures may share a common ISA.

The ISA includes architecturally-visible or architectural registers (e.g., an architectural register file) 102. The architectural registers represent on-processor storage locations. The architectural registers may also be referred to herein simply as registers. Unless otherwise specified or clearly apparent, the phrases architectural register, register file, and register are used herein to refer to registers that are visible to the software and/or programmer (e.g., software-visible) and/or the registers that are specified by general-purpose macroinstructions to identify operands. These registers are contrasted to other non-architectural or non-architecturally visible registers in a given microarchitecture (e.g., temporary registers used by instructions, reorder buffers, retirement registers, microarchitectural read-only registers used by microinstructions, etc.). The illustrated architecturally-visible registers include packed data registers 103. Each of the packed data registers is operable to store packed data, vector data, or SIMD data.

The illustrated ISA includes an instruction set 104 that is supported by the processor. The instructions of the instruction set represent macroinstructions (e.g., instructions provided to the processor for execution), as opposed to microinstructions or micro-ops (e.g., those which result from a decoder of the processor decoding macroinstructions). The processor may include specific or particular logic (e.g., circuitry potentially with some firmware or software) to execute the instructions of the instruction set.

The instruction set includes one or more instructions that use control indexes 105. As mentioned above, in some embodiments these may include one or more permute instructions, shuffle instructions, or other packed data rearrangement instructions 106. As another option, as will be discussed further below, in some embodiments, these may include one or more gather instructions, or load instructions 107, which are operable to gather or load non-contiguous data from off-processor memory using the control indexes.

In accordance with embodiments of the invention, the instruction set also includes one or more instructions that are each useful to generate the control indexes 108. In some embodiments, these may include one or more control indexes generation instructions 109 that are operable to generate the actual control indexes. Each of the control indexes generation instructions may be operable to generate the control indexes entirely within the confines of the execution of a single macroinstruction. By contrast, conventionally a series of general-purpose macroinstructions generally need to be executed in order to gradually or progressively build up the control indexes from scratch.

In some embodiments, the instructions may include one or more control indexes precursors generation instructions 110, which do not generate the actual control indexes, but which generate control indexes precursors. Each of the control indexes precursors generation instructions may be operable to generate the control indexes precursors entirely within the confines of the execution of a single macroinstruction. Rather than needing to generate the actual control indexes from scratch, the control indexes precursors may serve as useful starting-point or head-start values that may be efficiently converted into the actual control indexes by one or more other instructions. Advantageously, the use of the precursors may allow the actual control indexes to be generated more quickly and/or with fewer instructions than if starting from scratch.

The processor also includes execution logic 111. The execution logic is operable to execute or process the instructions of the instruction set.

FIG. 2 is a block flow diagram of an example embodiment of a method 212 of processing an example embodiment of a packed data rearrangement control indexes generation instruction. The packed data rearrangement control indexes generation instruction is received, at block 213. The received instruction specifies or otherwise indicates a first destination storage location. In some aspects, the first destination storage location may be explicitly specified by bits or one or more fields of an encoding of the instruction. In other aspects, the first destination storage location may be implicit to the instruction.

A result is stored in the first destination storage location, in response to and/or as a result of the packed data rearrangement control indexes generation instruction, at block 214. The result includes a sequence of at least four non-negative integers representing packed data rearrangement control indexes. The at least four integers typically have a plurality of different values (i.e., they are not all the same integer value). In various embodiments, the sequence may include at least eight, at least sixteen, at least thirty-two, or at least sixty-four non-negative integers representing packed data rearrangement control indexes. The result and/or the sequence of integers may be any of the results and/or sequences of integers disclosed elsewhere herein. In some embodiments, the result and/or the sequence of the integers may be generated entirely within the confines of the execution of a single macroinstruction (e.g., values of the integers may not depend on any previous instructions in the program flow).

To further illustrate certain concepts, and although the invention is not limited in this respect, reception of a packed data rearrangement instruction occurs, at block 215. In various aspects, this instruction may be a permute instruction, a shuffle instruction, or another type of packed data rearrangement instruction operable to rearrange data elements in one or more source packed data according to the packed data rearrangement control indexes. The instruction indicates the packed data rearrangement control indexes (e.g., specifies the first destination storage location). The instruction also specifies or otherwise indicates at least one source packed data having packed data elements and specifies or otherwise indicates a second destination storage location.

A packed data result is stored in the second destination storage location, in response to and/or as a result of the packed data rearrangement instruction, at block 216. The packed data result includes data elements from the at least one source packed data rearranged according to the packed data rearrangement control indexes. In some embodiments, as in the case of many permute and shuffle instructions, the packed data rearrangement control indexes may identify, select, or otherwise index particular data elements within the at least one source packed data. The indexed data elements may be stored in result data elements that correspond in position to the indexes.

Figure 3:
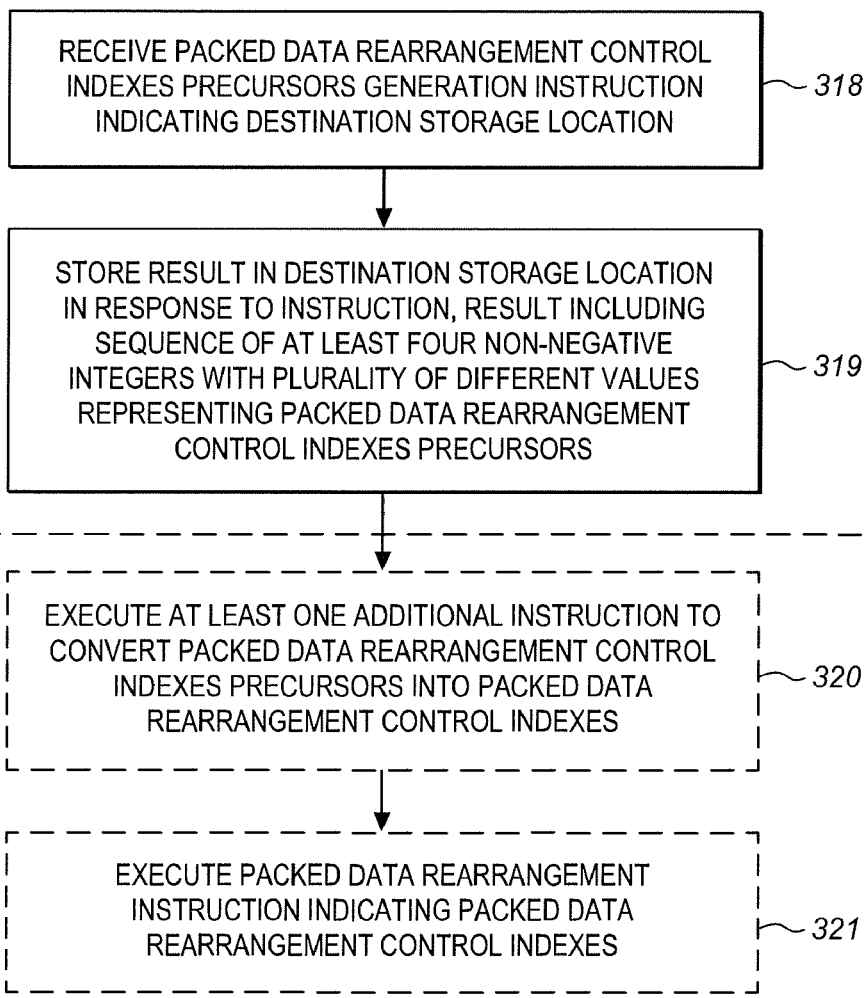
FIG. 3 is a block flow diagram of an example embodiment of a method of processing an example embodiment of a packed data rearrangement control indexes precursors generation instruction.

FIG. 3 is a block flow diagram of an example embodiment of a method 317 of processing an example embodiment of a packed data rearrangement control indexes precursors generation instruction. The packed data rearrangement control indexes precursors generation instruction is received, at block 318. The received instruction specifies or otherwise indicates a destination storage location.

A result is stored in the destination storage location, in response to and/or as a result of the packed data rearrangement control indexes precursors generation instruction, at block 319. The result includes a sequence of at least four non-negative integers representing packed data rearrangement control indexes precursors. The at least four integers typically have a plurality of different values. In various embodiments, the sequence may include at least eight, at least sixteen, at least thirty-two, or at least sixty-four non-negative integers representing packed data rearrangement control indexes precursors. The result and/or the sequence of integers may be any of the results and/or sequences of integers disclosed elsewhere herein. In some embodiments, the result and/or the sequence of the integers may be generated entirely within the confines of the execution of a single macroinstruction (e.g., values of the integers may not depend on any previous instructions in the program flow).

To further illustrate certain concepts, and although the invention is not limited in this respect, execution of at least one additional instruction (e.g., at least one general-purpose arithmetic instruction) is performed to convert the packed data rearrangement control indexes precursors into packed data rearrangement control indexes, at block 320. A first of the at least one additional instruction may indicate the destination storage location as a source of the packed data rearrangement control indexes precursors.

Then, a packed data rearrangement instruction indicating the packed data rearrangement control indexes may be executed, at block 321. The operation of the packed data rearrangement instruction may be similar to that previously described.

In FIGS. 2 and 3, the operations at blocks 215, 216, 320, and 321 have been shown to better illustrate certain concepts. However, it is to be understood that the invention is not limited to the operations performed at these blocks. Other embodiments pertain to methods and operations of the individual packed data rearrangement control indexes generation instructions, and still other embodiments pertain to methods and operations of the individual packed data rearrangement control indexes precursors generation instructions, which are not limited to the operations of other subsequent instructions.

Figure 4:
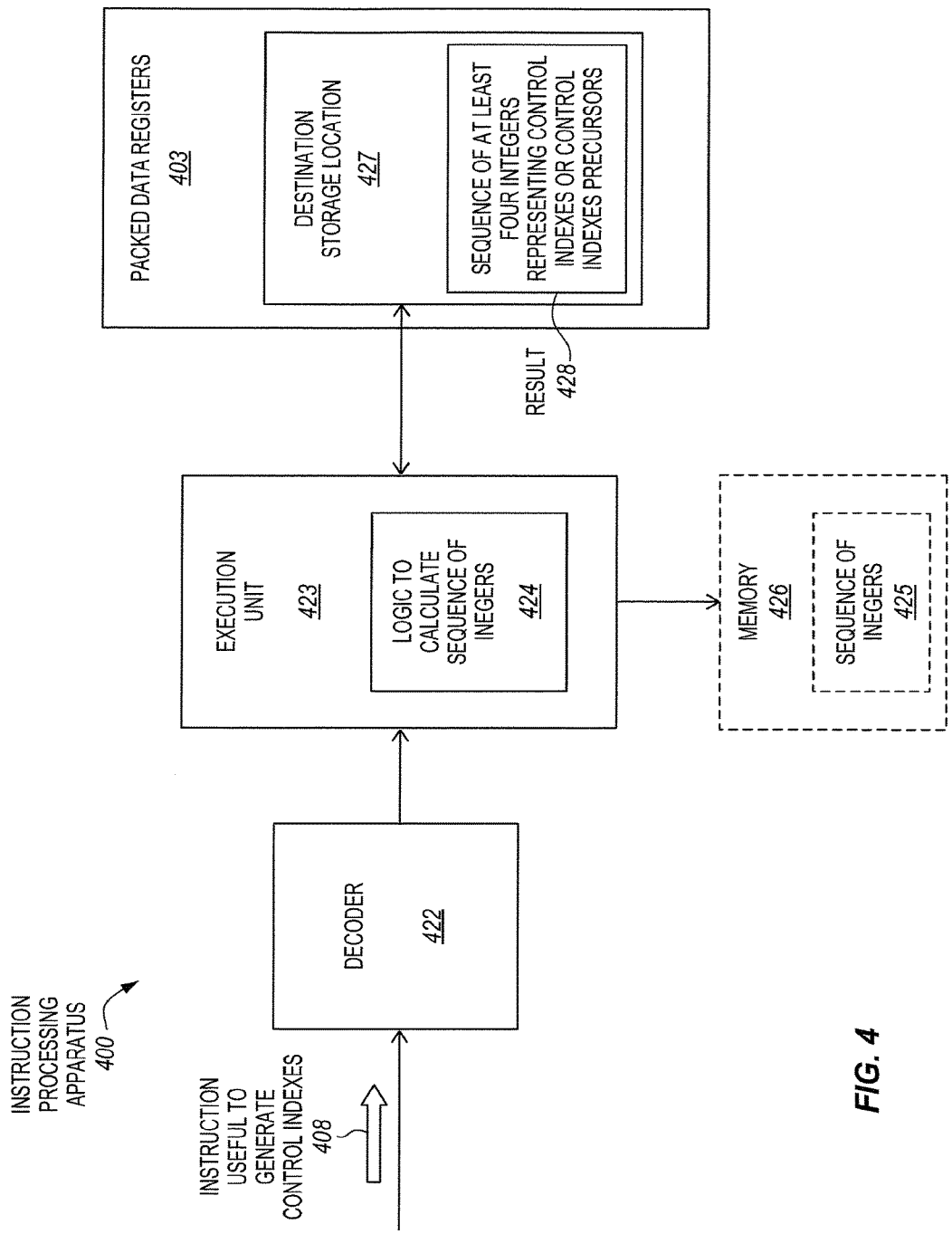
FIG. 4 is a block diagram of an example embodiment of an instruction processing apparatus to process instructions useful to generate control indexes.

FIG. 4 is a block diagram of an example embodiment of an instruction processing apparatus 400. The instruction processing apparatus may be a processor, or may be part of a processor. For example, in some embodiments, the instruction processing apparatus may be, or may be part of, the processor 100 of FIG. 1, or one similar. Alternatively, the instruction processing apparatus may be included in a different processor, or electronic system (e.g., one of the other processors or systems disclosed herein).

The instruction processing apparatus may receive an instruction 408 that is useful to generate control indexes. The instruction may represent any of the various embodiments of the instructions useful to generate control indexes disclosed elsewhere herein. The instruction may represent a machine instruction, macroinstruction, or like control signal. The instruction processing apparatus has specific or particular circuitry or other logic (e.g., hardware potentially combined with firmware and/or software) that is operable to process the instruction and/or store a result in response to, as a result of, and/or according to the instruction.

The illustrated instruction processing apparatus includes an instruction decoder 422. The decoder may receive and decode higher-level machine instructions or macroinstructions, and output one or more lower-level micro-operations, micro-code entry points, microinstructions, or other lower-level instructions or control signals that reflect and/or are derived from the original higher-level instruction. The one or more lower-level instructions or control signals may implement the operation of the higher-level instruction through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms used to implement decoders known in the art.

Alternatively, instead of having the decoder 422, in one or more other embodiments, the apparatus may have an instruction emulator, translator, morpher, interpreter, or other instruction conversion logic. Various different types of instruction conversion logic are known in the arts and may be implemented in software, hardware, firmware, or a combination thereof. The instruction conversion logic may receive the instruction, emulate, translate, morph, interpret, or otherwise convert it into one or more corresponding derived instructions or control signals. In still other embodiments, the instruction processing apparatus may have both instruction conversion logic and a decoder. For example, the instruction processing apparatus may have instruction conversion logic to convert the received instruction into one or more intermediate instructions, and a decoder to decode the one or more intermediate instructions into one or more lower-level instructions or control signals executable by native hardware of the instruction processing apparatus. Some or all of the instruction conversion logic may be located off-die from the rest of the instruction processing apparatus, such as on a separate die or in an off-die memory.

Referring again to FIG. 4, the instruction useful to generate the control indexes 408 explicitly specifies (e.g., through one or more fields), or otherwise indicates (e.g., implicitly indicates), a destination storage location 427. As shown, in some embodiments, the destination storage location may be within a set of packed data registers 403 of the instruction processing apparatus. Alternatively, the destination storage location may be another register or memory location. The packed data registers are architecturally-visible on-processor storage locations that may be implemented in different ways in different microarchitectures, using well known techniques, and are not limited to any known particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof.

The instruction processing apparatus also includes an execution unit 423. The execution unit is coupled with the decoder 422 and the destination storage location 427. The execution unit may receive from the decoder one or more micro-operations, micro-code entry points, microinstructions, other instructions, or other control signals, which reflect, or are derived from, the instruction 408. By way of example, the execution unit may include an arithmetic logic unit, a logic unit, an arithmetic unit, a functional unit, or the like. The execution unit may include specific or particular hardware logic (e.g., integrated circuitry) potentially with other logic (e.g., software, firmware, or a combination) that is operable to execute the instruction (e.g., execute one or more microinstructions) and/or store a result in response to the instruction.

The execution unit is operable, in response to the instruction and/or as a result of the instruction 408, to store a result 428 in the destination storage location 427. As shown, in embodiments, the result may include a sequence of at least four integers. In embodiments where the instruction 408 is a control indexes generation instruction, each of the integers may represent a control index. In embodiments where the instruction 408 is a control indexes precursors generation instruction, each of the integers may represent a control index precursor.

In some embodiments, the execution unit may include calculation logic 424 operable to calculate the sequence of the at least four integers. These may be special-purpose or particular circuits (e.g., to calculate the integers using a column sweep approach, iteratively calculate the integers, etc.). In other embodiments, the execution unit may access a pre-existing copy of the sequence of the at least four integers 425 from a memory 426 (e.g., a non-architecturally visible read only memory (ROM) that is on-die with the execution unit) responsive to the instruction. See e.g., the discussion of FIG. 16 below. In either of these embodiments, the sequence of integers is typically not accessed from off-die main memory or over a system bus.

In some embodiments, the result may include a sequence of at least four, at least eight, at least sixteen, at least thirty-two, or at least sixty-four, non-negative integers that follow a numerical pattern. In some embodiments, the integers that follow the numerical pattern may be consecutive non-negative integers in numerical order (e.g., 0, 1, 2, 3, 4, 5, 6, and 7). In other embodiments, the integers that follow the numerical pattern may be non-negative integers in numerical order with all integers in consecutive positions differing by a constant integer stride of at least two. In some embodiments, the stride may be equal to two, and the sequence of integers may be a sequence of consecutive same parity integers in numerical order. For example, the consecutive same parity integers may be consecutive even integers (e.g., 0, 2, 4, 6, 8, 10, 12, and 14), or consecutive odd integers (e.g., 1, 3, 5, 7, 9, 11, 13, and 15). In other embodiments, the stride (N) may be greater than two (e.g., the stride may be 3, 4, 8, 16, etc.), and the sequence of integers may include consecutive integer multiples of the stride (e.g., 0, N, 2N, 3N, 4N, 5N, 6N, and 7N).

In some embodiments, the instruction may explicitly specify or otherwise indicate one or more numerical pattern defining parameters (e.g., an integer offset, a constant integer stride, an integer rotation amount, an integer offset and a constant integer stride, etc.). In some embodiments, the instruction may indicate a positive integer offset (K), and a smallest of the integers may be offset from zero by the integer offset (e.g., in the case of consecutive integers, K, K+1, K+2, K+3, K+4, K+5, K+6, and K+7). In some embodiments, the instruction may indicate a positive integer offset (K) and a constant integer stride (N), and the integers may be consecutive integer multiples of the stride that are offset from zero (e.g., K, N+K, 2N+K, 3N+K, 4N+K, 5N+K, 6N+K, and 7N+K). Alternatively, the result and/or the sequence of the at least four integers may be any of the results and/or sequences of at least four integers disclosed elsewhere herein for the various embodiments of the instructions useful to generate control indexes. In some embodiments, the numerical pattern is based entirely or at least predominantly on an opcode, or the opcode and one or more numerical pattern defining parameters, of the instruction, or fixed by the opcode, or the opcode and the one or more numerical pattern defining parameters. It still further embodiments, the sequence of integers need not follow a numerical pattern (e.g., they may be seemingly random).

To avoid obscuring the description, a relatively simple instruction processing apparatus 400 has been shown and described. In other embodiments, the instruction processing apparatus may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. Embodiments may have multiple cores, logical processors, or execution engines. An execution unit operable to execute an embodiment of an instruction disclosed herein may be included in at least one, at least two, most, or all of the cores, logical processors, or execution engines. It is to be understood that there are literally numerous different combinations and configurations of components in processors, and that the scope of the invention is not limited to any particular combination or configuration.

Figure 5:
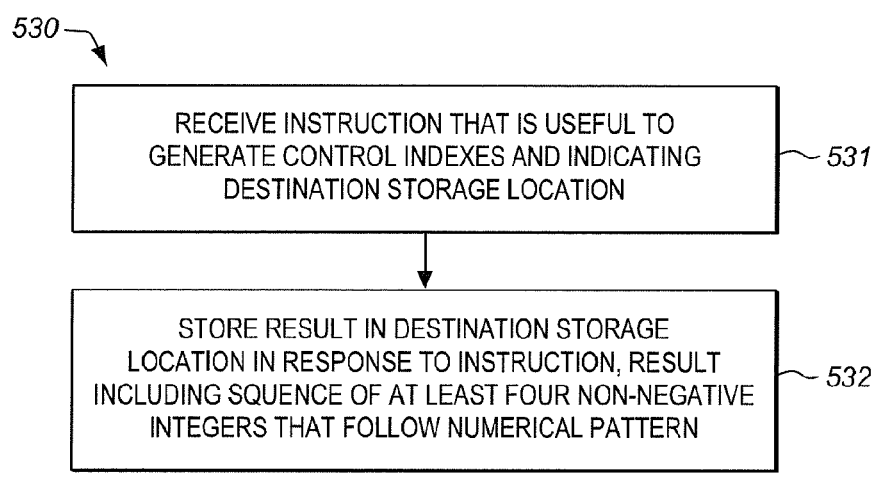
FIG. 5 is a block flow diagram of an example embodiment of a method of processing an instruction that stores a sequence of at least four non-negative integers that follow a numerical pattern.

FIG. 5 is a block flow diagram of an example embodiment of a method 530 of processing an instruction useful to generate control indexes, which stores a sequence of at least four non-negative integers that follow a numerical pattern. The instruction is received, at block 531. The instruction specifies or otherwise indicates a destination storage location.

A result is stored in the destination storage location, in response to the instruction and/or as a result of the instruction, at block 532. The result includes a sequence of at least four non-negative integers that follow a numerical pattern. In various embodiments, the result may include a sequence of at least eight, at least sixteen, at least thirty-two, at least sixty-four, or even more non-negative integers that follow the numerical pattern. The sequence of integers may be any of the sequences of integers that follow the various numerical patterns disclosed elsewhere herein. Often, at least two, at least four, at least half, or even all of the integers may have a different value (i.e., the integers are typically not all identical).

Figure 6:
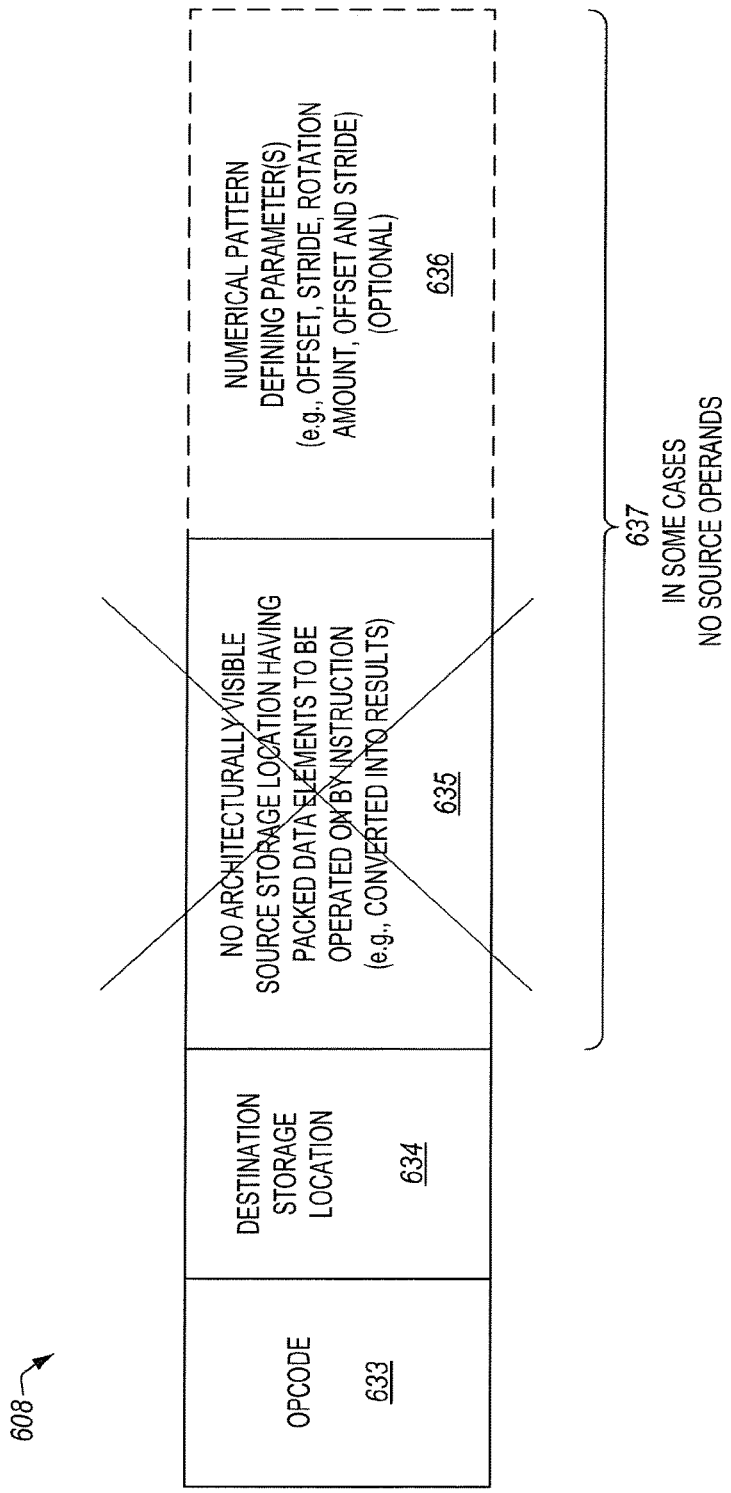
FIG. 6 is a block diagram of an embodiment of an instruction format of an instruction useful to generate control indexes.

FIG. 6 is a block diagram of an embodiment of an instruction format for an instruction 608 useful to generate control indexes. The instruction format includes an opcode 633. The opcode may represent a plurality of bits or one or more fields of the instruction format to identify the instruction. The instruction format also includes a destination storage location 634. In the illustrated embodiment, the instruction format includes a plurality of bits or one or more fields of the instruction format to explicitly specify the destination storage location. Alternatively, the destination storage location may be implicit to the instruction.

In some embodiments, the instruction format does not explicitly specify, implicitly indicate, or otherwise indicate, an architecturally-visible source storage location (e.g., a packed data register or a main memory location) having packed data elements to be operated on by the instruction 635. In embodiments of the invention, sequences of integers, control indexes, and control indexes precursors, which are stored by instructions disclosed herein, are not calculated or otherwise derived from packed data elements in an architecturally-visible source storage location. By contrast, as discussed in the background section, conventionally permute and shuffle control indexes are typically built up gradually from scratch by executing a series of general-purpose instructions (e.g., general-purpose packed data arithmetic instructions) that do operate on packed data elements in architecturally-visible source packed data registers until the packed data elements are ultimately converted into the permute or shuffle control indexes. In embodiments of the invention, the sequences of integers, control indexes, and control indexes precursors, which are stored by instructions disclosed herein, are generated entirely within the confines of the execution of the single instruction, and are not based on results of any preceding instructions in program order.

In some embodiments, the instruction format may have one or more source operands and/or one or more immediates to explicitly specify one or more numerical pattern defining parameters 636. Alternatively, one or more numerical pattern defining parameters may be implicitly indicated by the instruction (e.g., provided through a register implicitly indicated by the instruction. Each of the one or more pattern defining parameters may affect a numerical pattern of a result or sequence of integers stored as a result of the instruction. Each of the one or more pattern defining parameters may affect values of each of the integers in the sequence or result. Each of the one or more pattern defining parameters may be used to evaluate a numerical pattern defining equation or relation that is implicit to the instruction. A few representative examples of suitable numerical pattern defining parameters include, but are not limited to, integer offsets from zero, integer strides, integer rotation amounts, and combinations thereof (e.g., integer offsets from zero together with integer strides).

In other embodiments, the instruction may not specify or otherwise indicate any numerical pattern defining parameters. In some embodiments (e.g., in embodiments where the instruction does not specify or otherwise indicate any numerical pattern defining parameters), the instruction may not have (e.g., specify or otherwise indicate) any source operands 637.

Figure 7A:
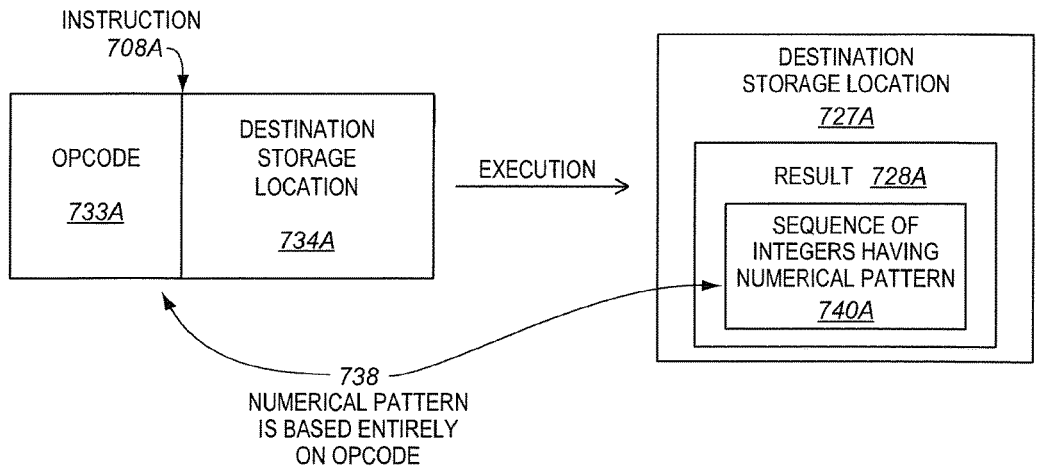
FIG. 7A is a block diagram illustrating that in some embodiments a sequence of integers stored by an instruction may have a numerical pattern that is based predominantly or entirely on an opcode of the instruction.

FIG. 7A is a block diagram illustrating that in some embodiments a sequence of integers 740A in a result 728A stored in a destination storage location 727A by an instruction 708A may have a numerical pattern that is based entirely or at least predominantly 738 on an opcode 733A of the instruction. The instruction has the opcode and bits or one or more fields 734A to specify the destination storage location 727A. Note that the instruction of this embodiment does not specify or otherwise indicate any numerical pattern defining parameters, or any source operands for that matter. Execution of the instruction causes the result to be stored in the destination storage location. The result includes the sequence of integers having the numerical pattern. In these embodiments, the numerical pattern of the sequence of integers is based entirely or at least predominantly on the opcode of the instruction. In these embodiments, the numerical pattern of the sequence of integers is fixed or constant for the opcode of the instruction. For example, a difference between consecutive integers in the sequence may be based entirely or at least predominantly on the opcode of the instruction and/or fixed or constant for the opcode of the instruction. Upon identifying the opcode, the sequence of integers and their numerical pattern may be fixed (i.e., may not depend on any source operands of the instruction). In some embodiments, the instruction/opcode may only be capable of storing one particular sequence of integers and/or one particular numerical pattern. By way of comparison, when general-purpose arithmetic instructions operate on source packed data to produce permute or shuffle control indexes, the permute or shuffle control indexes do not have a numerical pattern that is based entirely or even predominantly on the opcode of the general-purpose arithmetic instructions, rather it is based on the source packed data.

Figure 7B:
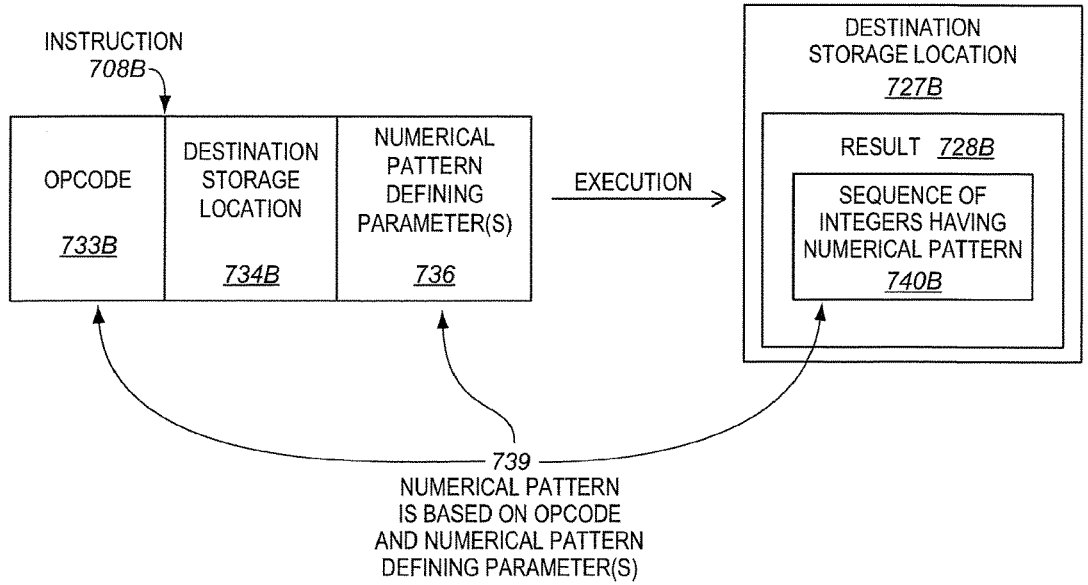
FIG. 7B is a block diagram illustrating that in some embodiments a sequence of integers stored by an instruction may have a numerical pattern that is based partly on an opcode of the instruction and partly on one or more numerical pattern defining parameters indicated by the instruction.

FIG. 7B is a block diagram illustrating that in some embodiments a sequence of integers 740B in a result 728B stored in a destination storage location 727B by an instruction 708B may have a numerical pattern that is based 739 partly on an opcode 733B of the instruction and partly on one or more numerical pattern defining parameters 736 indicated by the instruction. The numerical pattern is based entirely or at least predominantly on the opcode and the one or more numerical pattern defining parameters. The instruction has the opcode, bits or one or more fields 734B to specify the destination storage location 727B, and specifies or otherwise indicates the one or more numerical pattern defining parameters 736. Execution of the instruction causes the result to be stored in the destination storage location. The result includes the sequence of integers having the numerical pattern. In these embodiments, the numerical pattern of the sequence of integers is based partly on the opcode of the instruction and partly on the one or more numerical pattern defining parameters indicated by the instruction, but is based entirely or at least predominantly on the opcode and the one or more numerical pattern defining parameters (i.e., is not based on source packed data stored as a result by a preceding instruction).

Figure 8:
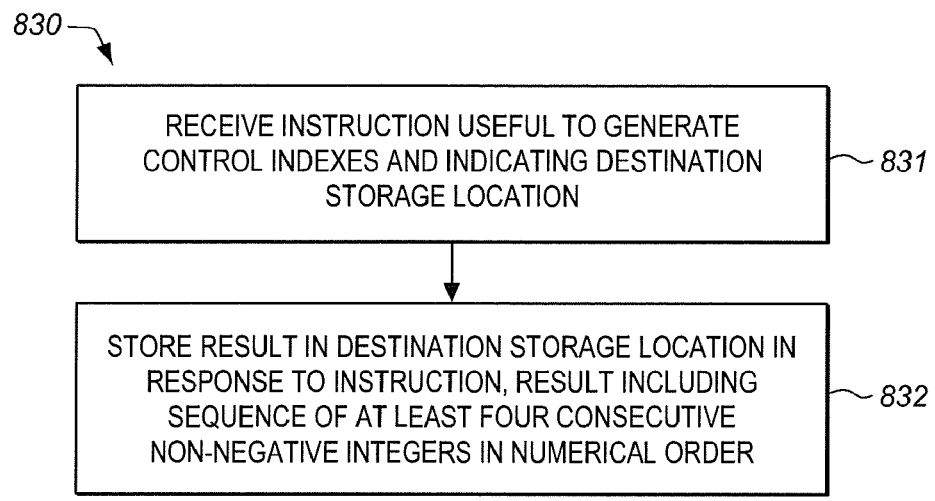
FIG. 8 is a block flow diagram of an example embodiment of a method of processing an instruction that stores a sequence of at least four consecutive non-negative integers in numerical order.

FIG. 8 is a block flow diagram of an example embodiment of a method 830 of processing an instruction useful to generate control indexes, which stores a sequence of at least four consecutive non-negative integers in numerical order. The instruction is received, at block 831. The instruction specifies or otherwise indicates a destination storage location.

A result is stored in the destination storage location, in response to the instruction and/or as a result of the instruction, at block 832. The result includes a sequence of at least four consecutive non-negative integers in numerical order. In some embodiments, the result may include a sequence of at least eight, at least sixteen, at least thirty-two, at least sixty-four, or even more, consecutive non-negative integers in numerical order in the destination storage location. In various embodiments, the sequence of consecutive integers may include any of those shown in Tables 1-3.

Table 1 lists example embodiments of sequences of consecutive non-negative integers in increasing numerical order for different numbers of integers.

TABLE 1

| NUMBER OF INTEGERS | SEQUENCES OF CONSECUTIVE INTEGERS IN INCREASING NUMERICAL ORDER |
|---|---|
| 4 | 0, 1, 2, 3 |
| 8 | 0, 1, 2, 3, 4, 5, 6, 7 |
| 16 | 0, 1, 2, 3, 4, 5, 6, 7, 8, 9, 10, 11, 12, 13, 14, 15 |
| 32 | 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31 |
| 64 | 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63 |

In increasing numerical order, the values of the integers increase with increasing bit significance of the destination storage location (e.g., the smallest integer is to be stored nearest to the lowest-order bit of the register, and the largest integer is to be stored nearest to a highest-order bit of the register). In each of these examples, the smallest integer is zero. In some embodiments, an instruction/opcode may only be capable of storing a sequent of integers selected from Table 1 (i.e., it may not be capable of storing other integers), although this is not required for other embodiments. Such sequences of consecutive integers in increasing numerical order are particularly useful for control indexes precursors, since they may be quickly, efficiently, and versatility, arithmetically or logically converted with one or a few additional instructions into a wide range of different sequences of integers useful for control indexes.

Table 2 lists example embodiments of sequences of consecutive non-negative integers in decreasing numerical order for different numbers of integers.

TABLE 2

| NUMBER OF INTEGERS | SEQUENCES OF CONSECUTIVE INTEGERS IN DECREASING NUMERICAL ORDER |
|---|---|
| 4 | 3, 2, 1, 0 |
| 8 | 7, 6, 5, 4, 3, 2, 1, 0 |
| 16 | 15, 14, 13, 12, 11, 10, 9, 8, 7, 6, 5, 4, 3, 2, 1, 0 |
| 32 | 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0 |
| 64 | 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0 |

In the decreasing numerical order, the values of the integers decrease with increasing bit significance of the destination storage location. In some embodiments, an instruction may have one or more bits to indicate whether or not integers are to be stored in increasing or decreasing numerical order to allow one instruction/opcode to be used for either. Such sequences of consecutive integers in decreasing numerical order are useful for mirroring packed data rearrangements. In an example mirroring packed data rearrangement, data elements in a packed data source are "mirrored" about a center of the packed data source. For example, a highest-order data element in a source is made a lowest-order data element in a result, a next-highest-order data element in the source is made a next-lowest-order data element in the result, and so on, up to making a next-to-lowest-order data element in the source a next-to-highest-order data element in the result, and making a lowest-order data element in the source a highest-order data element in the result.

Table 3 lists example embodiments of sequences of consecutive non-negative integers in increasing numerical order, which have a smallest integer offset from zero by an integer offset (K), for different numbers of integers.

TABLE 3

| NUMBER OF INTEGERS | INTEGER OFFSET FROM ZERO (K) | OFFSET SEQUENCES OF CONSECUTIVE INTEGERS IN INCREASING NUMERICAL ORDER |
|---|---|---|
| 4 | 2 | 2, 3, 4, 5 |
| 4 | K | K, K + 1, K + 2, K + 3 |
| 8 | 5 | 5, 6, 7, 8, 9, 10, 11, 12 |
| 8 | K | K, K + 1, K + 2, K + 3, K + 4, K + 5, K + 6, K + 7 |
| 16 | 1 | 1, 2, 3, 4, 5, 6, 7, 8, 9, 10, 11, 12, 13, 14, 15, 16 |
| 16 | K | K, K + 1, K + 2, K + 3, K + 4, K + 5, K + 6, K + 7, K + 8, K + 9, K + 10, K + 11, K + 12, K + 13, K + 14, K + 15 |
| 32 | 7 | 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38 |
| 64 | 12 | 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75 |

As shown, a smallest one of the integers may be offset from zero by the offset and may have a value of the offset. By way of example, the integer offset (K) may optionally be added to each of the integers of the sequences shown in Table 1. Analogous embodiments are contemplated for consecutive non-negative integers in decreasing numerical order. Such consecutive non-negative integers in numerical order, which are offset from zero by a variable positive integer offset (K), are useful to help extract unaligned packed data from two aligned packed data to avoid needing to perform unaligned loads (see e.g., the discussion of FIG. 9).

In some embodiments, the instruction may explicitly specify (e.g., through a source operand or an immediate) or otherwise indicate (e.g., implicitly indicate a register having) the integer offset (K). The offset (K) represents an example embodiment of a pattern defining parameter, which affects the values of each of the integers in the numerical pattern, and which the numerical pattern is based on.

In some embodiments, a result may include rotated consecutive non-negative integers in numerical order, which have been rotated by an integer rotation amount (R). Table 4 lists example embodiments of sequences of consecutive non-negative integers in increasing numerical order, which have been rotated by an integer rotation amount (R), for different numbers of integers.

TABLE 4

| NUMBER OF INTEGERS | INTEGER ROTATION AMOUNT (R) | ROTATED SEQUENCES OF CONSECUTIVE INTEGERS IN INCREASING NUMERICAL ORDER |
|---|---|---|
| 4 | 3 | 1, 2, 3, 0 |
| 8 | 5 | 3, 4, 5, 6, 7, 0, 1, 2 |
| 16 | 2 | 14, 15, 0, 1, 2, 3, 4, 5, 6, 7, 8, 9, 10, 11, 12, 13 |
| 32 | 4 | 28, 29, 30, 31, 0, 1, 2, 3, 4, 5, 6, 7, 8, 9, 10, 11, 12, 13, 14, 15, 16, 17, 18, 19, 20, 21, 22, 23, 24, 25, 26, 27 |
| 64 | 1 | 63, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62 |

As shown, each integer is rotated in the rotation direction, and when rotated out of one end is rotated into the other end. In some embodiments, the instruction may explicitly specify (e.g., through a source operand or an immediate) or otherwise indicate (e.g., implicitly indicate a register having) the rotation amount (R). The rotation amount (R) represents an example embodiment of a pattern defining parameter, which affects the values of each of the integers in the numerical pattern, and which the numerical pattern is based on. The integers may be rotated either to the right or to the left. In some embodiments, the instruction may also explicitly specify or implicitly indicate a rotation direction. Analogous embodiments are contemplated for consecutive non-negative integers in decreasing numerical order. Such rotated consecutive integers are useful for rotating packed data elements. Such rotated consecutive integers are useful for rotating packed data elements in sequences smaller than the full vector size.

Figure 9:
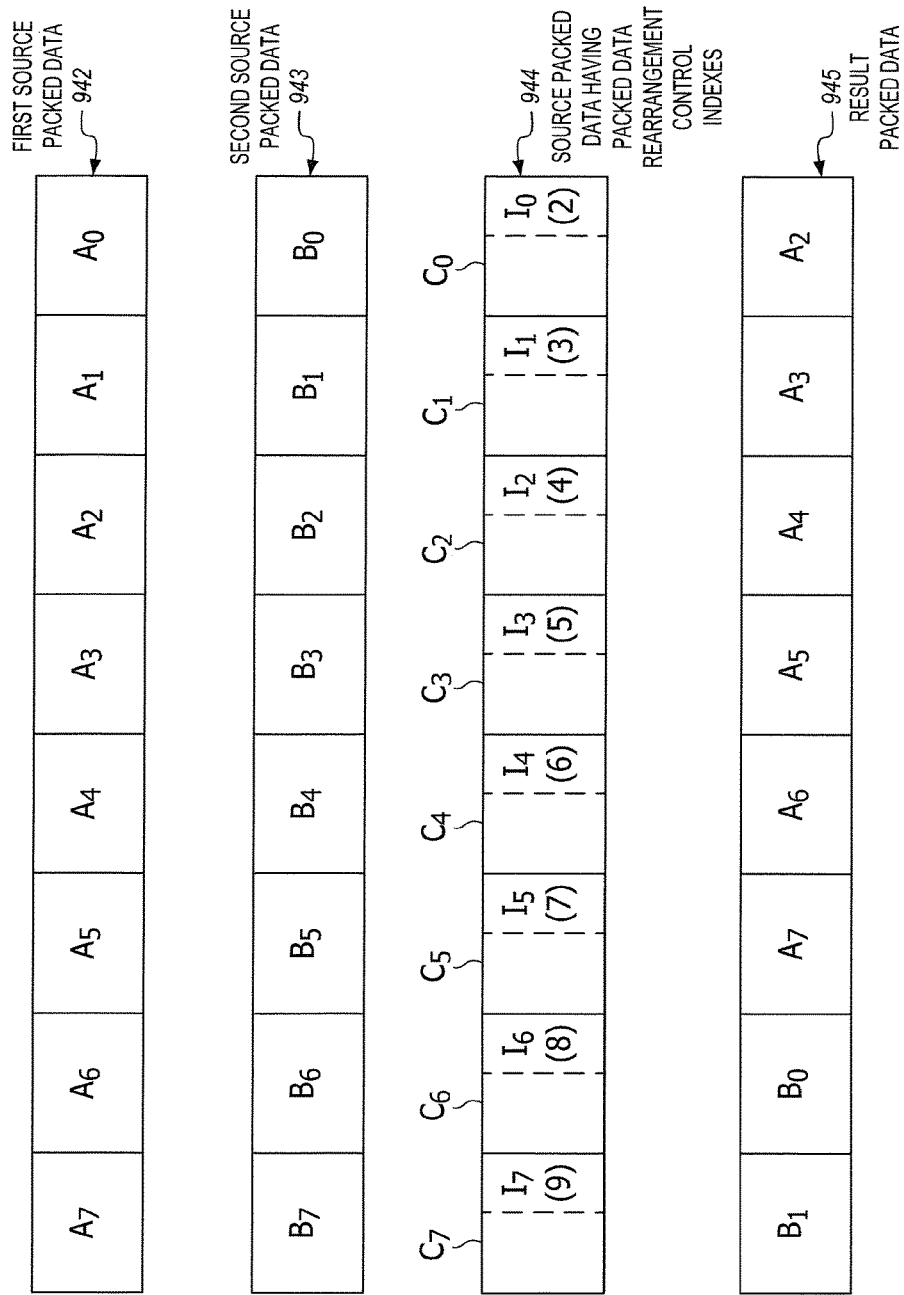
FIG. 9 is a block diagram illustrating an example embodiment of a packed data rearrangement operation using packed data rearrangement control indexes having values of offset consecutive integers in numerical order to extract unaligned packed data from two aligned packed data to avoid needing to perform unaligned loads.

FIG. 9 is a block diagram illustrating an example embodiment of a packed data rearrangement operation using packed data rearrangement control indexes having values of offset consecutive integers in numerical order to extract unaligned packed data from two aligned packed data to avoid needing to perform unaligned loads. The operation may be performed in response to a packed data rearrangement instruction.

The packed data rearrangement instruction may indicate a first source packed data 942 having eight data elements $A_0$-$A_7$, a second source packed data 943 having eight data elements $B_0$-$B_7$, a third source packed data 944 having eight packed data elements $C_0$-$C_7$, which each include a corresponding one of eight packed data rearrangement control indexes $I_0$-$I_7$, and a result packed data 945. By way of example, each of the control indexes $I_0$-$I_7$ may be 4-bits wide and may be included in the least significant 4-bits of the corresponding packed data element $C_0$-$C_7$, which may be 8-bits, 16-bits, 32-bits, or 64-bits wide. Other instructions may use other numbers of data elements and control indexes.

The result packed data 945 is generated and stored in response to the packed data rearrangement operation/instruction. In this embodiment, each of the packed data rearrangement control indexes corresponds to a result data element in a corresponding bit position. Each of the control indexes is operable to select any one of the sixteen data elements of the first and second source packed data (i.e., any one of $A_0$-$A_7$ or $B_0$-$B_7$) to be stored into the corresponding result data element. For example, the first control index $I_0$ is operable to select any one of $A_0$-$A_7$ or $B_0$-$B_7$ to be stored in a first result packed data element of the result packed data.

Four bits are sufficient to uniquely select any one of the sixteen source data elements. According to one possible convention, a control index has a value of 0 to select $A_0$, 1 to select $A_1$, 2 to select $A_2$, 3 to select $A_3$, 4 to select $A_4$, 5 to select $A_5$, 6 to select $A_6$, 7 to select $A_7$. A control index has a value of 8 to select $B_0$, 9 to select $B_1$, 10 to select $B_2$, 11 to select $B_3$, 12 to select $B_4$, 13 to select $B_5$, 14 to select $B_6$, and 15 to select $B_7$.

In this embodiment, the packed data rearrangement control indexes have values of offset consecutive integers in numerical order. In particular, the control indexes $I_0$, $I_1$, $I_2$, $I_3$, $I_4$, $I_5$, $I_6$, $I_7$, respectively, have the values 2, 3, 4, 5, 6, 7, 8, and 9. As shown, these control indexes are operable to select $A_2$, $A_3$, $A_4$, $A_5$, $A_6$, $A_7$, $B_0$, and $B_1$, for the eight data elements of the result packed data. The operation with these indexes merges $A_2$-$A_7$ with $B_0$-$B_1$. Rather than needing to perform unaligned loads to merge $A_2$-$A_7$ with $B_0$-$B_1$, such merging may be performed with the use of the offset consecutive integers in numerical order as the control indexes.

Similarly, it may be readily seen how consecutive integers in decreasing numerical order may be used to perform mirroring packed data element rearrangements. Moreover, it may be readily seen how rotated consecutive integers may be used to rotate packed data elements.

Figure 10:
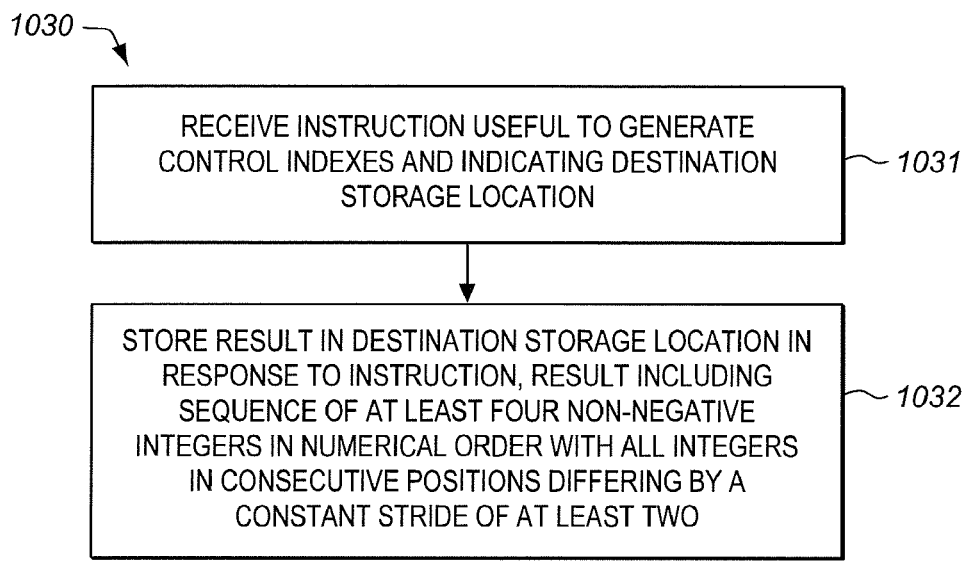
FIG. 10 is a block flow diagram of an example embodiment of a method of processing an instruction that stores a sequence of at least four non-negative integers in numerical order with all integers in consecutive positions differing by a constant integer stride of at least two.

FIG. 10 is a block flow diagram of an example embodiment of a method 1030 of processing an instruction useful to generate control indexes, which stores a sequence of at least four non-negative integers in numerical order with all integers in consecutive positions differing by a constant integer stride of at least two. The instruction is received, at block 1031. The instruction specifies or otherwise indicates a destination storage location.

A result is stored in the destination storage location, in response to the instruction and/or as a result of the instruction, at block 1032. The result includes a sequence of at least four non-negative integers in numerical order with all integers in consecutive positions differing by a constant integer stride of at least two. In some embodiments, the result may include a sequence of at least eight, at least sixteen, at least thirty-two, at least sixty-four, or even more, non-negative integers in numerical order with all integers in consecutive positions differing by a constant integer stride of at least two.

The constant stride represents a constant difference between values of integers in consecutive positions in the destination storage location. In various embodiments, the stride may be two, three, four, or more. Integers separated by constant strides of two, three, and four are particularly useful for processing repetitively-arranged paired/two-tuple data (e.g., pairs of real and imaginary numbers, or other pairs of data), three-tuple data (e.g., RGB, or other color component data), and four-tuple data (e.g., RGBA or other color component plus transparency/opacity data). Even greater strides are useful for control indexes for gather instructions that gather non-contiguous data from memory (e.g., from tables or other structured data arrangements). In some embodiments, the instruction may only be capable of storing a sequence of integers in which consecutive integers differ by a constant stride, although other embodiments are not so limited.

Figure 11:
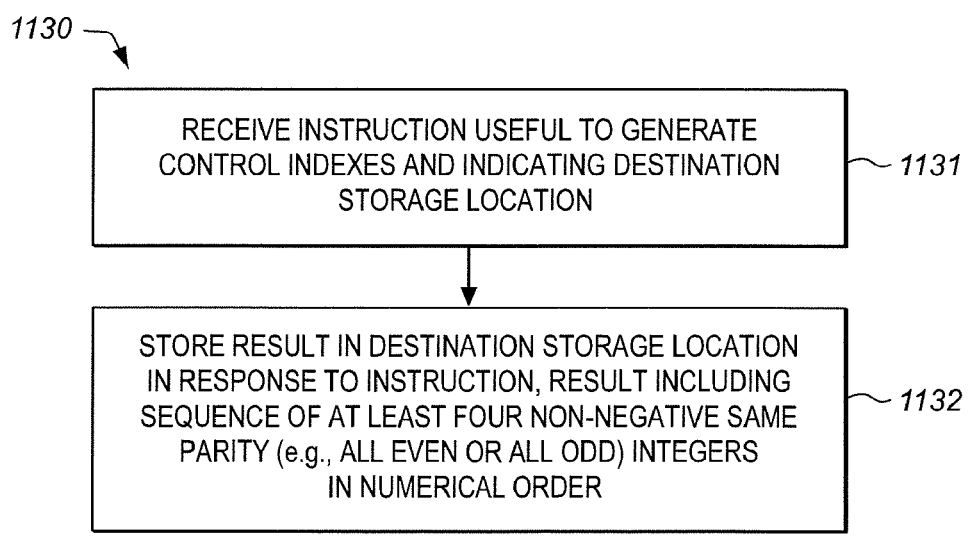
FIG. 11 is a block flow diagram of an example embodiment of a method of processing an instruction that stores a sequence of at least four non-negative same parity (e.g., all even or all odd) integers in numerical order.

FIG. 11 is a block flow diagram of an example embodiment of a method 1130 of processing an instruction useful to generate control indexes, which stores a sequence of at least four non-negative same parity (e.g., all even or all odd) integers in numerical order. The instruction is received, at block 1131. The instruction specifies or otherwise indicates a destination storage location.

A result is stored in the destination storage location, in response to the instruction and/or as a result of the instruction, at block 1132. The result includes a sequence of at least four non-negative same parity integers in numerical order. The parity of an integer refers to whether it is even or odd. Even integers have a same parity, and odd numbers have a same parity, which is a different parity than that of the even numbers. In some embodiments, the result may include a sequence of at least eight, at least sixteen, at least thirty-two, at least sixty-four, or even more, even integers (e.g., consecutive even integers) in numerical order. In other embodiments, the result may include a sequence of at least eight, at least sixteen, at least thirty-two, at least sixty-four, or even more, odd integers (e.g., consecutive odd integers) in numerical order.

Table 5 lists example embodiments of sequences of consecutive even integers in increasing numerical order for different numbers of integers.

TABLE 5

| NUMBER OF INTEGERS | SEQUENCES OF CONSECUTIVE EVEN INTEGERS IN INCREASING NUMERICAL ORDER |
|---|---|
| 4 | 0, 2, 4, 6 |
| 8 | 0, 2, 4, 6, 8, 10, 12, 14 |
| 16 | 0, 2, 4, 6, 8, 10, 12, 14, 16, 18, 20, 22, 24, 26, 28, 30 |
| 32 | 0, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62 |
| 64 | 0, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126 |

Table 6 lists example embodiments of sequences of consecutive odd integers in increasing numerical order for different numbers of integers.

TABLE 6

| NUMBER OF INTEGERS | SEQUENCES OF CONSECUTIVE ODD INTEGERS IN INCREASING NUMERICAL ORDER |
|---|---|
| 4 | 1, 3, 5, 7 |
| 8 | 1, 3, 5, 7, 9, 11, 13, 15 |
| 16 | 1, 3, 5, 7, 9, 11, 13, 15, 17, 19, 21, 23, 25, 27, 29, 31 |
| 32 | 1, 3, 5, 7, 9, 11, 13, 15, 17, 19, 21, 23, 25, 27, 29, 31, 33, 35, 37, 39, 41, 43, 45, 47, 49, 51, 53, 55, 57, 59, 61, 63 |
| 64 | 1, 3, 5, 7, 9, 11, 13, 15, 17, 19, 21, 23, 25, 27, 29, 31, 33, 35, 37, 39, 41, 43, 45, 47, 49, 51, 53, 55, 57, 59, 61, 63, 65, 67, 69, 71, 73, 75, 77, 79, 81, 83, 85, 87, 89, 91, 93, 95, 97, 99, 101, 103, 105, 107, 109, 111, 113, 115, 117, 119, 121, 123, 125, 127 |

In some embodiments, an instruction/opcode may only be capable of storing a sequent of integers selected from Tables 5 or 6 (i.e., it may not be capable of storing other integers), although this is not required for other embodiments. Such sequences of consecutive even and odd integers are particularly useful for processing repetitively-arranged two-tuple data, such as, for example, pairs of real and imaginary numbers representing complex numbers, as well as other paired data. For example, such sequences of consecutive even and odd integers may be used to separate, isolate, or de-interleave one type of paired or two-tuple data from another (e.g., separate real numbers from imaginary numbers). See e.g., the discussion of FIG. 12.

In other embodiments, an integer offset (K) may optionally be added to each of the same parity integers. In still other embodiments, the sequence of same parity integers may be rotated by an integer rotation amount (R). In still further embodiments, the same parity integers may be in decreasing numerical order.

Figure 12:
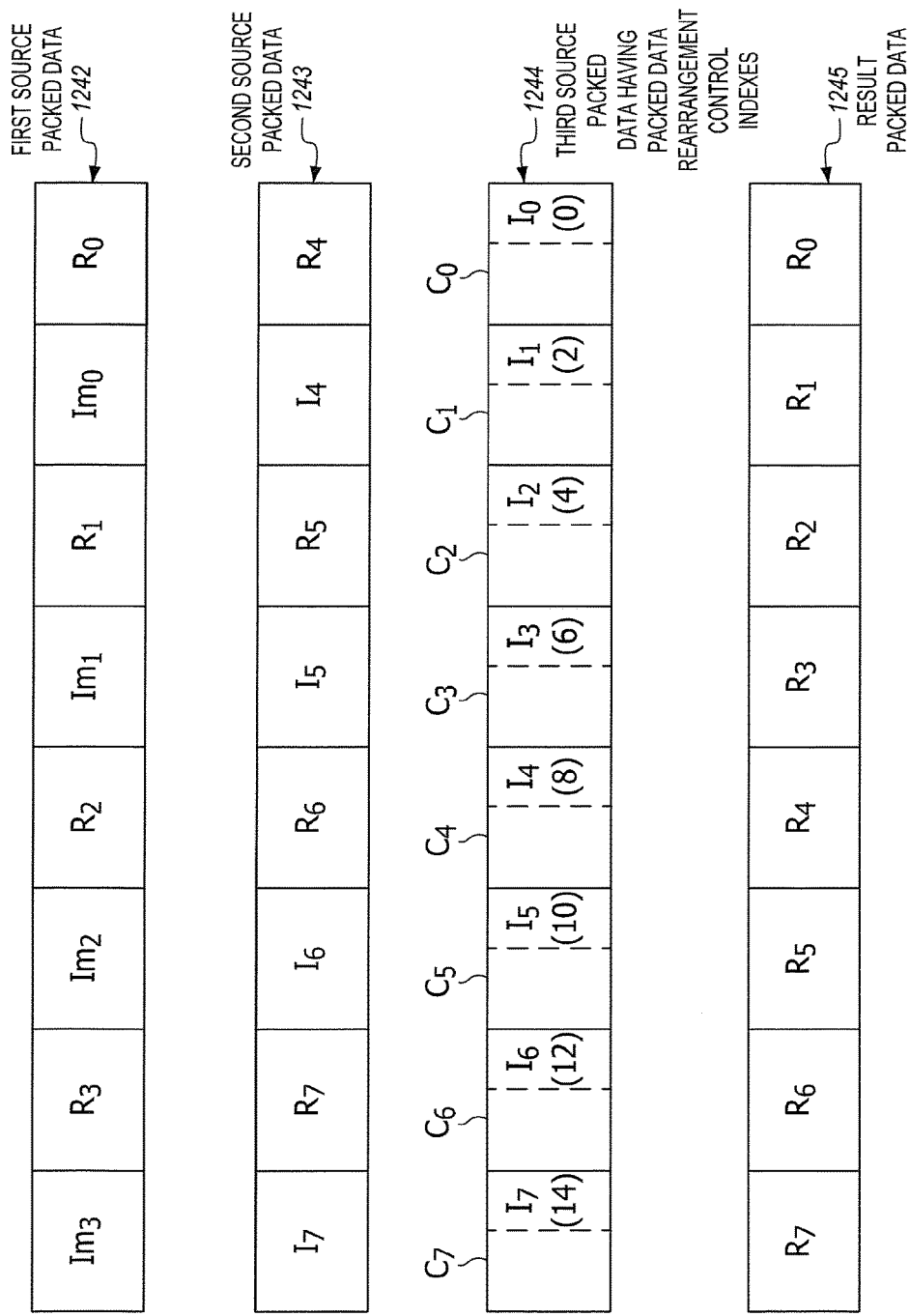
FIG. 12 is a block diagram illustrating an example embodiment of a packed data rearrangement operation using packed data rearrangement control indexes having values of consecutive even integers in increasing numerical order to separate real numbers (R) from imaginary numbers (IM).

FIG. 12 is a block diagram illustrating an example embodiment of a packed data rearrangement operation using packed data rearrangement control indexes having values of consecutive even integers in increasing numerical order to separate real numbers (R) from imaginary numbers (IM). The operation may be performed in response to a packed data rearrangement instruction.

The instruction may indicate a first source packed data 1242 having eight data elements $R_0$, $IM_0$, $R_1$, $IM_1$, $R_2$, $IM_2$, $R_3$, $IM_3$, a second source packed data 1243 having eight data elements $R_4$, $IM_4$, $R_5$, $IM_5$, $R_6$, $IM_6$, $R_7$, $IM_8$, a third source packed data 1244 having eight data elements $C_0$-$C_7$, each including a corresponding one of eight packed data rearrangement control indexes $I_0$-$I_7$, and a result packed data 1245. In the first and second source packed data, real numbers (R) and imaginary numbers (IM) are interleaved. By way of example, each of the control indexes $I_0$-$I_7$ may be 4-bits wide and may be included in the least significant 4-bits of the corresponding data element $C_0$-$C_7$.

The result packed data 1245 is generated and stored in response to the packed data rearrangement operation/instruction. In this embodiment, each of the control indexes corresponds to a result data element in a corresponding bit position. In this embodiment, the control indexes have values of consecutive even integers in increasing numerical order. In particular, the control indexes $I_0$, $I_1$, $I_2$, $I_3$, $I_4$, $I_5$, $I_6$, and $I_7$, respectively, have the values 0, 2, 4, 6, 8, 10, 12, and 14. As shown, these control indexes are operable to select and store the real numbers $R_0$, $R_1$, $R_2$, $R_3$, $R_4$, $R_5$, $R_6$, and $R_7$, in the eight data elements of the result packed data. This essentially de-interleaves or separates the real numbers (R) from the imaginary numbers (IM).

In an alternate embodiment, a similar packed data rearrangement operation may be performed using control indexes having values of consecutive odd integers in increasing numerical order to separate the imaginary numbers (I) from the real numbers (R). In particular, the control indexes $I_0$, $I_1$, $I_2$, $I_3$, $I_4$, $I_5$, $I_6$, and $I_7$, respectively, may have the values 1, 3, 5, 7, 9, 11, 13, and 15, in order to select and store the imaginary numbers $IM_0$, $IM_1$, $IM_2$, $IM_3$, $IM_4$, $IM_5$, $IM_6$, and $IM_7$, in the eight data elements of the result packed data. Moreover, control indexes having consecutive even or odd integers in numerical order may also be used to separate other types of paired or two-tuple data.

In other embodiments, the stride may be greater than two. Table 7 lists example embodiments of sequences of integers in numerical order, with integers in consecutive positions differing by a constant integer stride that is greater than two, for different numbers of integers.

TABLE 7

| NUMBER OF INTEGERS | CONSTANT STRIDE (N) | SEQUENCES OF INTEGERS IN INCREASING NUMERICAL ORDER DIFFERING BY STRIDE GREATER THAN TWO |
|---|---|---|
| 4 | 3 | 0, 3, 6, 9 |
| 4 | 4 | 0, 4, 8, 12 |
| 4 | 8 | 0, 8, 16, 24 |
| 4 | N | 0, N, 2N, 3N |
| 8 | 3 | 0, 3, 6, 9, 12, 15, 18, 21 |
| 8 | 4 | 0, 4, 8, 12, 16, 20, 24, 28 |
| 8 | 8 | 0, 8, 16, 24, 32, 40, 48, 56 |

TABLE 7-continued

| NUMBER OF INTEGERS | CONSTANT STRIDE (N) | SEQUENCES OF INTEGERS IN INCREASING NUMERICAL ORDER DIFFERING BY STRIDE GREATER THAN TWO |
|---|---|---|
| 8 | N | 0, N, 2N, 3N, 4N, 5N, 6N, 7N |
| 16 | 3 | 0, 3, 6, 9, 12, 15, 18, 21, 24, 27, 30, 33, 36, 39, 42, 45 |
| 16 | 4 | 0, 4, 8, 12, 16, 20, 24, 28, 32, 36, 40, 44, 48, 52, 56, 60 |
| 16 | 8 | 0, 8, 16, 24, 32, 40, 48, 56, 64, 72, 80, 88, 96, 104, 112, 120 |
| 16 | N | 0, N, 2N, 3N, 4N, 5N, 6N, 7N, 8N, 9N, 10N, 11N, 12N, 13N, 14N, 15N |

These are just a few illustrative examples. For simplicity, examples are only shown for four, eight, or sixteen control indexes or control indexes precursors, although other numbers are also contemplated (e.g., 32, 64, etc.). Also, for simplicity, only a few representative examples of strides are shown (i.e., 3, 4, and 8), although other strides are also possible (e.g., 5, 6, 10, 16, etc.). Still other embodiments are contemplated in which the integers of the sequence are in decreasing numerical order, are offset from zero, and/or are rotated.

Figure 13:
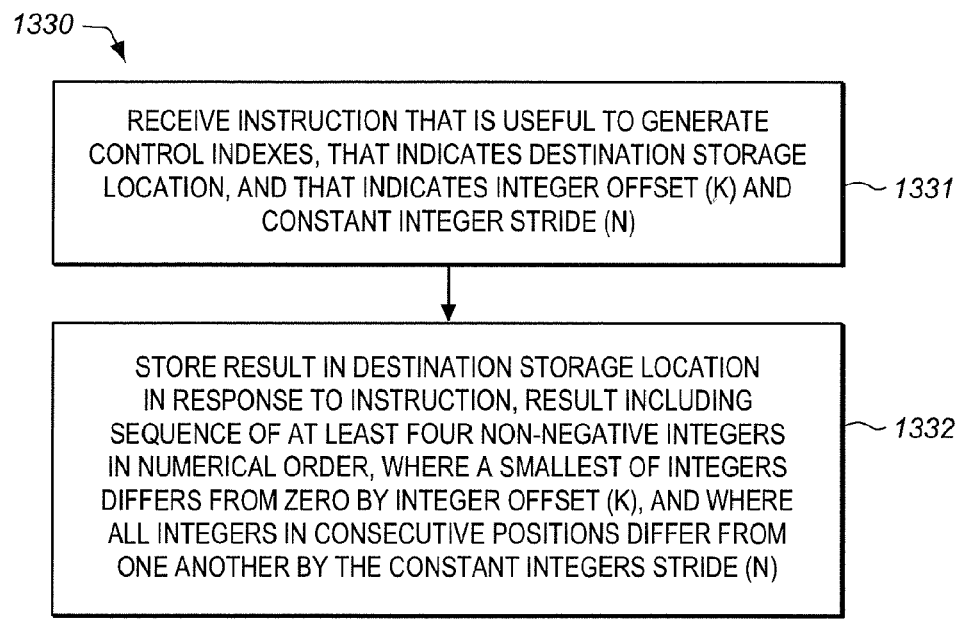
FIG. 13 is a block flow diagram of an example embodiment of a method of processing an instruction that stores a sequence of at least four integers in numerical order, where a smallest of the integers is offset from zero by the offset, and where all of the integers in consecutive positions differ from one another by the stride.

FIG. 13 is a block flow diagram of an example embodiment of a method 1330 of processing an instruction useful to generate control indexes, which stores a sequence of at least four integers in numerical order, where a smallest of the integers is offset from zero by the offset (K), and where all of the integers in consecutive positions differ from one another by the stride (N). The instruction is received, at block 1331. The instruction specifies or otherwise indicates a destination storage location.

In some embodiments, the instruction explicitly specifies, or otherwise indicates, an integer offset (K) and a constant integer stride (N). In some embodiments, the instruction may have at least one of a source operand and an immediate to explicitly specify the offset (K) and/or the stride (N). As another option, the instruction may implicitly indicate a register that provides the offset (K) and/or the stride (N). In some cases, the offset may be zero, or in other cases it may be a non-zero positive integer. The constant integer stride is a positive integer of one or more. The instruction may set each of the offset (K) and the stride (N) to obtain a desired numerical pattern appropriate for the desired control indexes.

A result is stored in the destination storage location, in response to the instruction and/or as a result of the instruction, at block 1332. The result includes a sequence of at least four non-negative integers in numerical order in the destination storage location, where a smallest of the integers is offset from zero by the offset (K), and where all of the integers in consecutive positions differ from one another by the stride (N). The value of an integer at position (i) in the destination storage location may be equal to the stride (N) multiplied by the position (i) added to the offset (K). Mathematically, this may be expressed as integer at position (i)=(N*i+K), where i ranges from zero to one less than the total number of integers in the sequence (e.g., i is 0 for the first integer, i is 1 for the second integer, etc.).

Table 8 lists example embodiments of sequences of integers in numerical order, where a smallest of the integers differs from zero by the offset (K), and where all of the integers in consecutive positions differ from one another by the stride (N), for different numbers of integers.

TABLE 8

| NUMBER OF INTEGERS | CONSTANT STRIDE (N) | OFF-SET (K) | SEQUENCES OF INTEGERS FOLLOWING FORMULA (N*i + K) |
|---|---|---|---|
| 4 | 2 | 1 | 1, 3, 5, 7 |
| 4 | 3 | 2 | 2, 5, 8, 11 |
| 4 | 4 | 2 | 2, 6, 10, 14 |
| 4 | N | K | K, N + K, 2N + K, 3N + K |
| 8 | 2 | 2 | 2, 4, 6, 8, 10, 12, 14, 16 |
| 8 | 3 | 1 | 1, 4, 7, 10, 13, 16, 19, 22 |
| 8 | 4 | 3 | 3, 7, 11, 15, 19, 23, 27, 31 |
| 8 | N | K | K, N + K, 2N + K, 3N + K, 4N + K, 5N + K, 6N + K, 7N + K |
| 16 | 2 | 4 | 4, 6, 8, 10, 12, 14, 16, 18, 20, 22, 24, 26, 28, 30, 32, 36 |
| 16 | 3 | 7 | 7, 10, 13, 16, 19, 22, 25, 28, 31, 34, 37, 40, 43, 46, 49, 52 |
| 16 | 4 | 3 | 3, 7, 11, 15, 19, 23, 27, 31, 35, 39, 43, 47, 51, 55, 59, 63 |
| 16 | N | K | K, N + K, 2N + K, 3N + K, 4N + K, 5N + K, 6N + K, 7N + K, 8N + K, 9N + K, 10N + K, 11N + K, 12N + K, 13N + K, 14N + K, 15N + K |

As discussed above, consecutive non-negative integers in numerical order are useful and versatile for generating a variety of different integer sequences and/or numerical patterns. In some embodiments, an instruction that stores consecutive non-negative integers in numerical order may be used together with an instruction that applies a stride and an offset to generate one of numerous useful numerical patterns.

Figure 14:
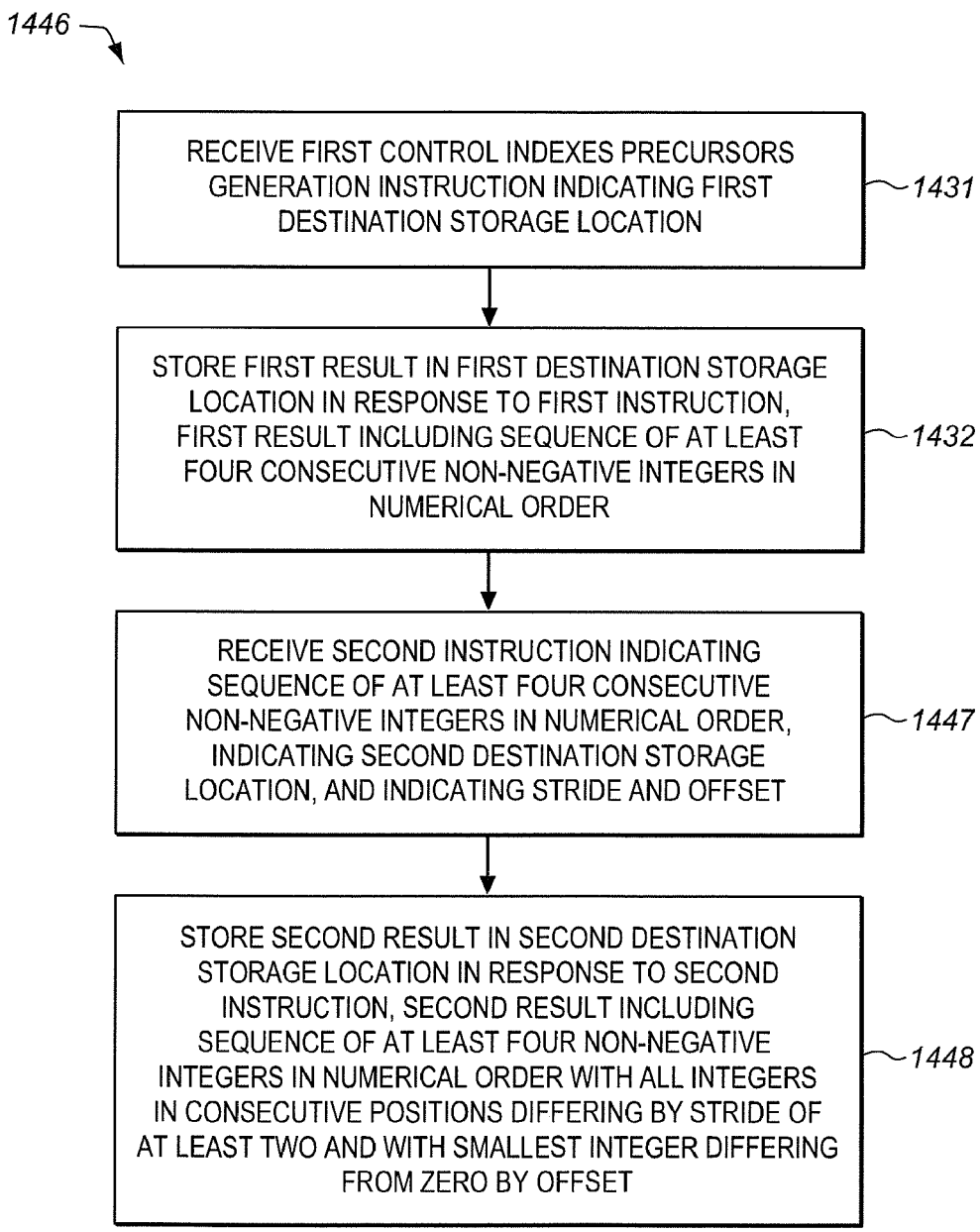
FIG. 14 is a block flow diagram of an example embodiment of a method of processing a first control indexes precursors generation instruction to store a sequence of consecutive non-negative integers in numerical order and a second instruction that applies a stride and an offset to each of the integers.

FIG. 14 is a block flow diagram of an example embodiment of a method 1446 of processing a first control indexes precursors generation instruction to store a sequence of consecutive non-negative integers in numerical order a second instruction that applies a stride and an offset to each of the consecutive non-negative integers in numerical order.

The first control indexes precursors generation instruction is received, at block 1431. The instruction specifies or otherwise indicates a first destination storage location.

A first result is stored in the first destination storage location, in response to the first instruction, at block 1432. The result includes a sequence of at least four consecutive non-negative integers in numerical order. In some embodiments, the result may include one of the sequences of integers shown in Table 1 above.

A second instruction indicating the sequence of the at least four consecutive integers in numerical order (e.g., explicitly specifying the first destination storage location as a source) is received, at block 1447. The second instruction indicates a second destination storage location and indicates a stride (N) and an offset (K). In some embodiments, the second instruction may have at least one source operand and/or immediate to explicitly specify the stride and the offset.

A second result is stored in the second destination storage location, in response to the second instruction, at block 1448. The second result includes a sequence of at least four non-negative integers in numerical order, where all integers in consecutive positions differ from one another by the stride (N), and where a smallest of the integers is offset from zero by the offset (K). In some embodiments, each of the at least four consecutive integers may be multiplied by the stride (N), and the offset (K) may be added to each of the products. For example, the stride (N) may be broadcast into a plurality of values of the stride (N) in a first temporary register, the offset (K) may be broadcast into a plurality of values of the offset (K) in a second temporary register, and each of the at least four consecutive integers may be multiplied by the first temporary register and the resulting products may be added to the second temporary register. The sequence of integers of the second result may follow the numerical pattern (N*i+K).

Figure 15:
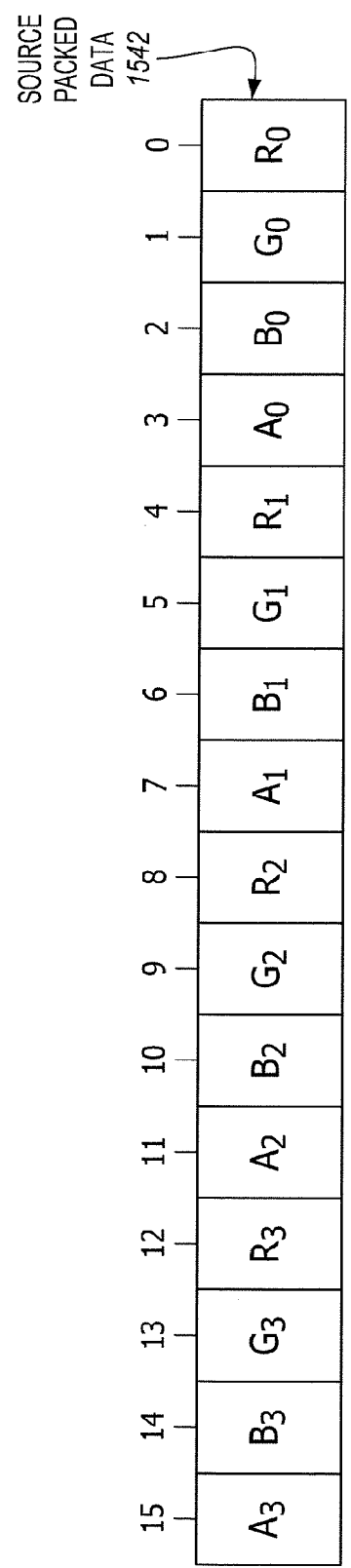
FIG. 15 is a block diagram of a source packed data storing Red Green Blue Alpha four-tuple data.

FIG. 15 is a block diagram of a source packed data 1542 storing RGBA (i.e., Red Green Blue Alpha) four-tuple data. The RGBA data represents color component plus transparency/opacity data. RGBA data is commonly used in computers and other electronic devices having displays/screens. The particular illustrated packed data operand has sixteen data elements. In the illustration, the sixteen data elements respectively store $R_0, G_0, B_0, A_0, R_1, G_1, B_1, A_1, R_2, G_2, B_2, A_2, R_3, G_3, B_3, A_3$. In some embodiments, a numerical pattern or sequence of integers may be operable to perform useful operations on four-tuple data.

Table 9 lists example embodiments of sequences of integers to perform various useful operations on RGBA data or other 4-tuple data. Many of these sequences are useful for four-tuple data in general.

TABLE 9

| NUMBER OF INTEGERS | SEQUENCES OF INTEGERS | EXAMPLE OF USE |
|---|---|---|
| 16 | 0, 4, 8, 12, 1, 5, 9, 13, 2, 6, 10, 14, 3, 7, 11, 15 | Separate each of the R, G, B, and A components |
| 16 | 3, 2, 1, 0, 7, 6, 5, 4, 11, 10, 9, 8, 15, 14, 13, 12 | Reverse or mirror order within RGBA four-tuples |
| 16 | 0, 1, 2, 4, 5, 6, 8, 9, 10, 12, 13, 14 | Remove A components from RGBA four-tuples |
| 16 | 0, 1, 3, 2, 4, 5, 7, 6, 8, 9, 11, 10, 12, 13, 15, 14 | Swap order of R and G components within RGBA four-tuples |
| 16 | 3, 0, 1, 2, 7, 4, 5, 6, 11, 8, 9, 10, 15, 12, 13, 14 | Convert from RGBA to ARGB |
| 16 | 2, 1, 0, 3, 6, 5, 4, 7, 10, 9, 8, 11, 14, 13, 12, 15 | Convert from RGBA to BGRA |

Notice that these numerical patterns have a repeat unit of four integers such that the pattern repeats every four integers. These are just a few examples. Other sequences to perform other operations are also contemplated.

Still other embodiments need not utilize packed data rearrangement control indexes with numerical patterns. In general, any sequence of integers may be used as long as it is useful for control indexes or control indexes precursors.

The integers may have values appropriate for control indexes or control indexes precursors. Commonly, packed data rearrangement instructions use control indexes that are operable to index or select any one of 4 source packed data elements, 8 source packed data elements, 16 source packed data elements, 32 source packed data elements, 64 source packed data elements, or in some cases 128 source packed data elements. In embodiments, each of the integers in a sequence may have a value that ranges from zero to an upper bound that is one less than the total number of data elements that the associated packed data rearrangement instruction indexes among. For example, in various embodiments, the integer values may all range from 0 to 127 in order to index or select any one of 128 source packed data elements, may range from 0 to 63 in order to index any one of 64 data elements, may range from 0 to 31 in order to index any one of 32 data elements, may range from 0 to 15 in order to index any one of 16 data elements, or may range from 0 to 7 in order to index any one of 8 data elements. In some embodiments, the instruction/opcode may be incapable of storing integers outside of these ranges, although this is not required for other embodiments. Instructions useful to generate control indexes for gather or load instructions that load non-contiguous data from memory (e.g., from a table) often have somewhat greater ranges of integer values.

Various ISAs have one or more instructions that load data from non-contiguous memory locations or store data to non-contiguous memory locations. Examples of such instructions include, but are not limited to gather and scatter instructions. By way of example, the gather instructions may gather or load multiple data elements into a result packed data from multiple non-contiguous memory locations using a gather index vector provided through a source of the gather instructions. The scatter instructions may scatter or store multiple data elements from a source packed data into multiple non-contiguous memory locations using a scatter index vector provided through a source of the scatter instructions. In some embodiments, the control indexes generation instructions disclosed herein may be used to generate control indexes for such gather and/or scatter instructions and/or for other instructions that access non-contiguous locations in memory. For example, the control indexes generation instructions disclosed herein may be used to generate gather index vectors and/or scatter index vectors that may be indicated as source operands, respectively, by the gather or scatter instructions.

Gather and scatter instructions are useful for various different purposes. In some embodiments, the gather and scatter instructions are used, respectively, to load data from or store data to, tables or other regularly arranged data structures. As an example, the gather and scatter instructions may be used to access a row of a two-dimensional array when the data is ordered in column-major order. As another example, the gather and scatter instructions may be used to access a column of the array when the data is stored in row-major order. Other examples include accessing data in multi-dimensional arrays. In such examples, sequences or control indexes as disclosed herein may be used to generate, or assist with generating, the gather index vectors and/or scatter index vectors. Commonly, as in accessing data from a row in column-major ordered arrays, or as in accessing data from a column in a row-major ordered array, a constant stride as disclosed elsewhere herein may be used. Stride values and offset values as disclosed herein may be used as previously described to generate the gather index vectors and/or scatter index vectors. By way of example, the stride may be based on the row length and/or the column location within the row. The gather or scatter instruction may then specify the gather index vectors and/or scatter index vectors as a source.

Alternatively, in other embodiments, an instruction to load data from non-contiguous memory locations (e.g., a gather instruction) or an instruction to store data to non-contiguous memory locations (e.g., a scatter instruction) may incorporate control indexes generation capabilities as described elsewhere herein. For example, in some embodiments, a gather instruction and/or a scatter instruction may indicate a source having one or more of a stride and an offset and the gather and/or scatter instruction may be operable to both use the stride and/or the offset to generate control indexes and perform the gather and/or scatter operations within the confines of the execution of the single gather and/or scatter instruction. The different possibilities for using the stride and the offset mentioned before may also be used by these instructions. On possible advantage of such instructions is that a vector scale-index-base (SIB) may not be needed which may allow reclaiming the traditional SIB and/or a shorter instruction encoding.

Different ways of generating control indexes and/or control indexes precursors are contemplated. In some embodiments, a sequence of integers may be stored in a memory of a processor at a time of manufacture (e.g., prior to runtime execution of application code), and instructions as disclosed herein (e.g., included in application code at runtime) may be operable to access the sequence of integers from the memory when they are executed at runtime.

Figure 16:
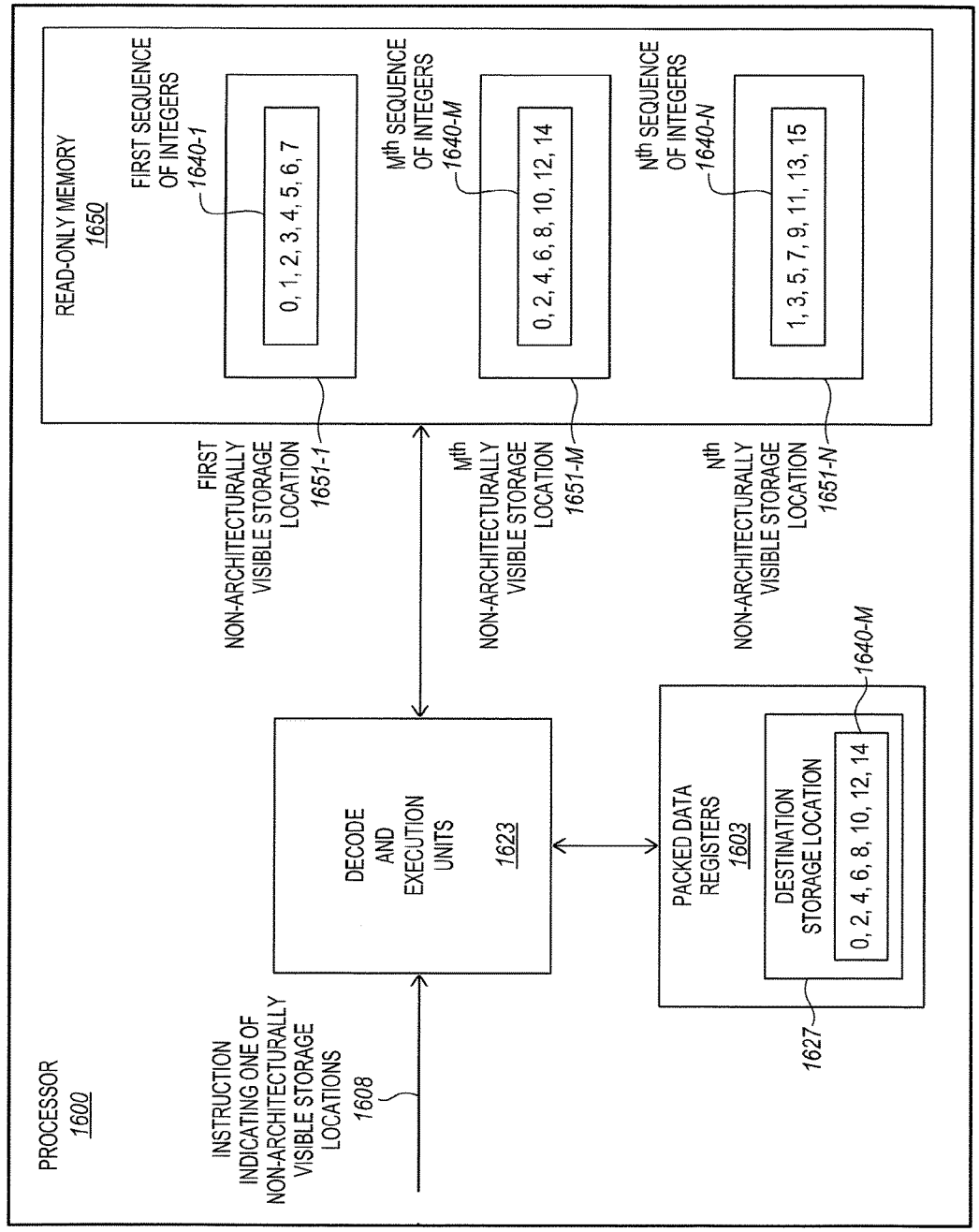
FIG. 16 is a block diagram of an example embodiment of a processor that includes a read-only memory (ROM) storing one or more sequences of integers.

FIG. 16 is a block diagram of an example embodiment of a processor 1600. The processor includes decode and execution units 1623, packed data registers 1603, and a read-only memory (ROM) 1650. The ROM has multiple non-architecturally visible storage locations 1651. Each of the storage locations stores a different sequence of integers. For example, a first storage location 1651-1 stores a first sequence of integers (e.g., 0, 1, 2, 3, 4, 5, 6, and 7), an Mth storage location 1651-M stores an Mth sequence of integers (e.g., 0, 2, 4, 6, 8, 10, 12, and 14), and an Nth storage location 1651-N stores an Nth sequence of integers (e.g., 1, 3, 5, 7, 9, 11, 13, and 15). The sequences of integers stored in these storage locations represent predetermined sequences of integers. The storage locations may store any of the sequences of integers disclosed herein, as well as other sequences entirely. Typically, one or several (e.g., from about two to about ten or more) of the more commonly used sequences of integers and/or sequences of integers that are relatively more expensive to generate from scratch may be stored.

The decode and execution units 1623 receive an instruction 1608 that is useful to generate control indexes. The instruction indicates a destination storage location 1627, which in some embodiments may be in the packed data registers 1603. In some embodiments, the instruction (e.g., an opcode of the instruction) may implicitly indicate the ROM and the instruction may indicate one of the non-architecturally visible storage locations. In some such embodiments, the one indicated non-architecturally visible storage location may be fixed or implicit to the instruction (e.g., fixed or implicit to an opcode of the instruction). In other such embodiments, the instruction may have one or more bits to explicitly specify or select the one non-architecturally visible storage location. For example, in some embodiments, the instruction may have one, two, three, four, or more bits, respectively, to select among two, four, eight, or sixteen different predetermined sequences of integers. Advantageously, in this way one instruction/opcode may be capable of selecting among multiple sequences of integers.

In the illustrated example, the instruction indicates the Mth non-architecturally visible storage location 1651-M. Responsive to the instruction, the execution unit may access the Mth sequence of integers (e.g., 0, 2, 4, 6, 8, 10, 12, and 14), and store them in the destination storage location 1627. In such embodiments, the Mth sequence of integers does not need to be generated or calculated, but rather pre-existing/pre-stored values may merely be accessed from the ROM. This may allow the sequence of integers to be provided quickly and efficiently, within the execution of a single instruction. In some embodiments, the ROM may be on-die with the processor and/or the decode and execution units, such that the sequence of integers does not need to be accessed from an off-die main memory or other source and/or over a system bus.

Processors commonly include ROM on-die to store various different types of information (e.g., processor identification information, cryptographic keys, configuration information, etc.). There is often room available in such ROM to store one or more sequence of integers as disclosed herein. Alternatively, a dedicated ROM, a read-only register, a non-architecturally visible register, or another non-architecturally visible storage space may be included on-die to store one or more sequence of integers as disclosed herein. As another option, one or more sequences of integers may be burnt into one-time-programmable fuses of a processor or otherwise pre-stored or pre-provided on-die with a processor and/or execution unit.

In some embodiments, a column-sweep approach may be used to generate a numerical pattern of integers in numerical order. For example, to generate consecutive integers, a value of 1 may be broadcast across nine elements to give (A). Then, a copy of the elements with the broadcasted values of 1 may be shifted to the left to give (B). Then (A) and (B) may be added to give (C). Then (C) may be shifted to the left by two to give (D). Then (C) and (D) may be added to give (E). Then (E) may be shifted left by four to give (F). Then (E) and (F) may be added to give (G), etc.

| | |
|---|---|
| 1 1 1 1 1 1 1 1 1 | (A) |
| 1 1 1 1 1 1 1 1 | (B) |
| 2 2 2 2 2 2 2 2 1 | (C) |
| 2 2 2 2 2 2 1 | (D) |
| 4 4 4 4 4 4 3 2 1 | (E) |
| 4 4 3 2 1 | (F) |
| 8 8 7 6 5 4 3 2 1 | (G) |

Such column-sweep approaches generally allow for generation of the sequences of integers quickly, as compared to purely iterative generation. In still other embodiments, a sequence of integers as disclosed herein may be generated iteratively. For example to generate consecutive integers, each integer may be calculated in turn as the previous integer calculated plus one.

Figure 17A:
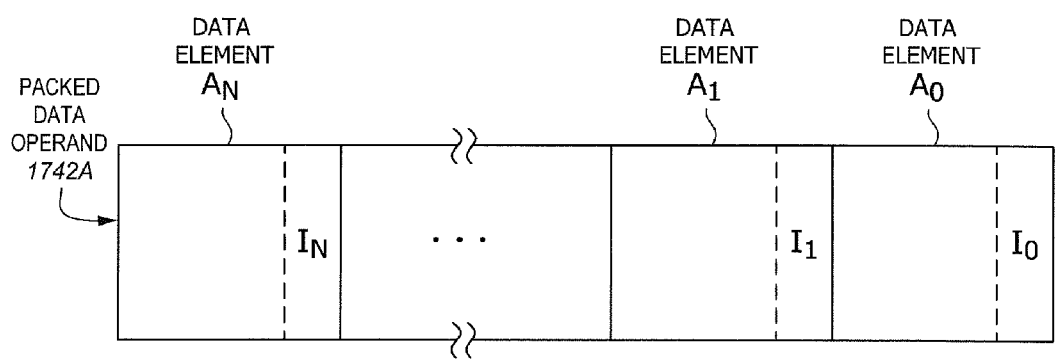
FIG. 17A is a block diagram illustrating a first example embodiment of a suitable format for storing control indexes and control indexes precursors.

FIG. 17A is a block diagram illustrating a first example embodiment of a suitable format for storing control indexes and control indexes precursors. A packed data operand 1742A includes packed data elements $A_0$-$A_N$. By way of example, there may be 4, 8, 16, 32, or 64, data elements. Each of the data elements $A_0$-$A_N$ has a different corresponding control index or control index precursor. In particular, a first data element $A_0$ has a first control index or precursor $I_0$, a second data element $A_1$ has a second control index or precursor $I_1$, an Nth data element $A_N$ has an Nth control index or precursor $I_N$, etc. Each of the control indexes or precursors is stored in a subset of bits of the corresponding data element. For example, each of the control indexes or precursors may be stored in a subset of bits of a lowest order byte or control byte of the corresponding data element, although this is not required. In various embodiments, each of the control indexes or precursors may be contained within the lowest order 2-bits, 3-bits, 4-bits, 5-bits, or 6-bits, for example, of the corresponding data element. Each of the control indexes or precursors may be an integer often having a value ranging from 0 to 64. For packed data rearrangement control indexes/precursors, the maximum integer size, and the number of bits per control index/precursor, depends on the number of source data elements indexed among. In various embodiments, the data elements may be 8-bit bytes, 16-bit words, 32-bit doublewords, or 64-bit quadwords.

Figure 17B:
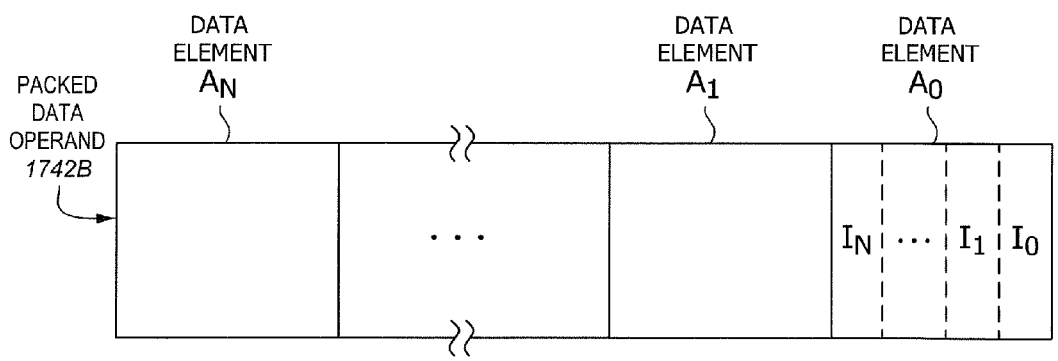
FIG. 17B is a block diagram illustrating a second example embodiment of a suitable format for storing control indexes and control indexes precursors.

FIG. 17B is a block diagram illustrating a second example embodiment of a suitable format for storing control indexes and control indexes precursors. A packed data operand 1742B includes data elements $A_0$-$A_N$. Instead of each of the data elements $A_0$-$A_N$ having a different corresponding control index or precursor, the control indexes or precursors are grouped together contiguously within a subset of data elements of the packed data operand. In the illustrated embodiment, a first data element $A_0$ has a first control index or precursor $I_0$, a second control index or precursor $I_1$, and an Nth control index or precursor $I_N$, etc. Depending upon the size of the control indexes or precursors, and the size of the data elements, a subset of two or more data elements may be used to store all of the control indexes or precursors. Also, in the case of control indexes precursors, they may be stored in a general-purpose or integer register and later converted into packed data format by a subsequent instruction.

Figure 18:
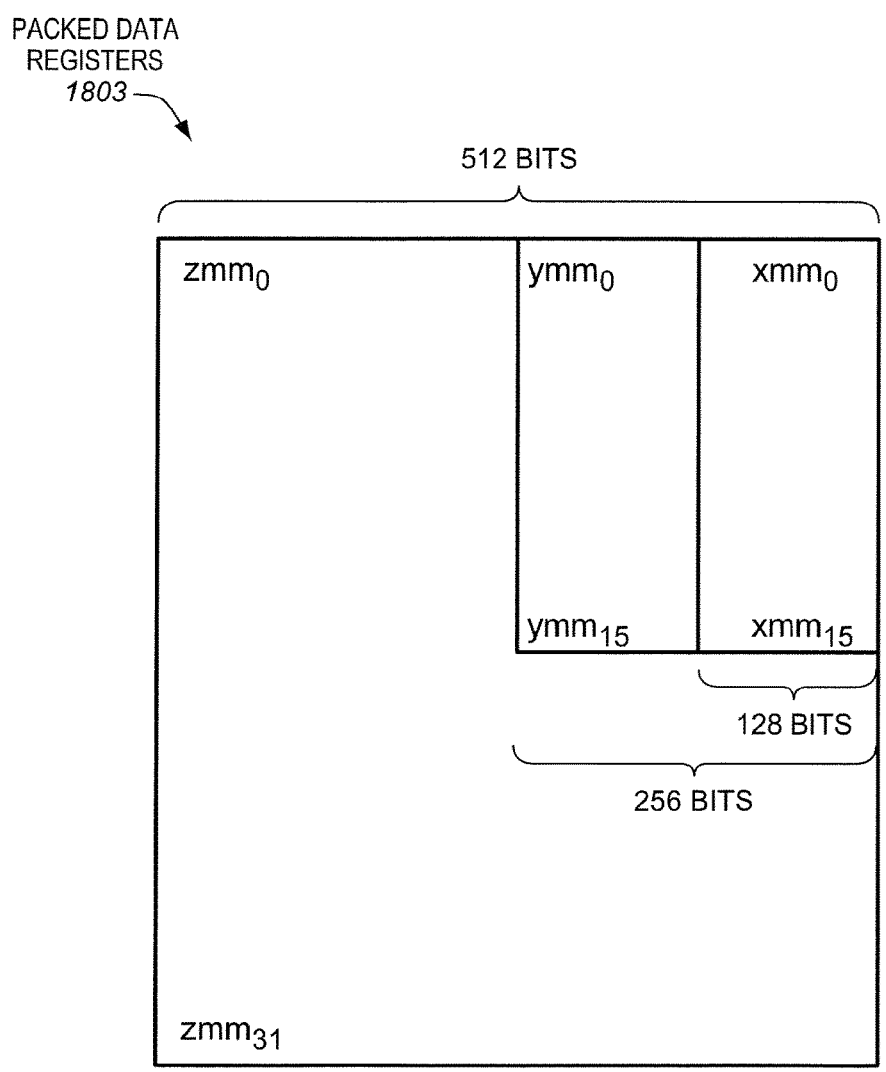
FIG. 18 is a block diagram of an example embodiment of a suitable set of packed data registers.

FIG. 18 is a block diagram of an example embodiment of a suitable set of packed data registers 1803 suitable for storing packed data operands. The illustrated packed data registers include thirty-two 512-bit wide packed data or vector registers. These thirty-two 512-bit wide registers are labeled ZMM0 through ZMM31. In the illustrated embodiment, the lower order 256-bits of the lower sixteen of these registers, namely ZMM0-ZMM15, are aliased or overlaid on respective 256-bit wide packed data or vector registers labeled YMM0-YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit wide registers ZMM0 through ZMM31 are operable to hold 512-bit packed data, 256-bit packed data, or 128-bit packed data. The 256-bit wide registers YMM0-YMM15 are operable to hold 256-bit packed data, or 128-bit packed data. The 128-bit wide registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Figure 19:
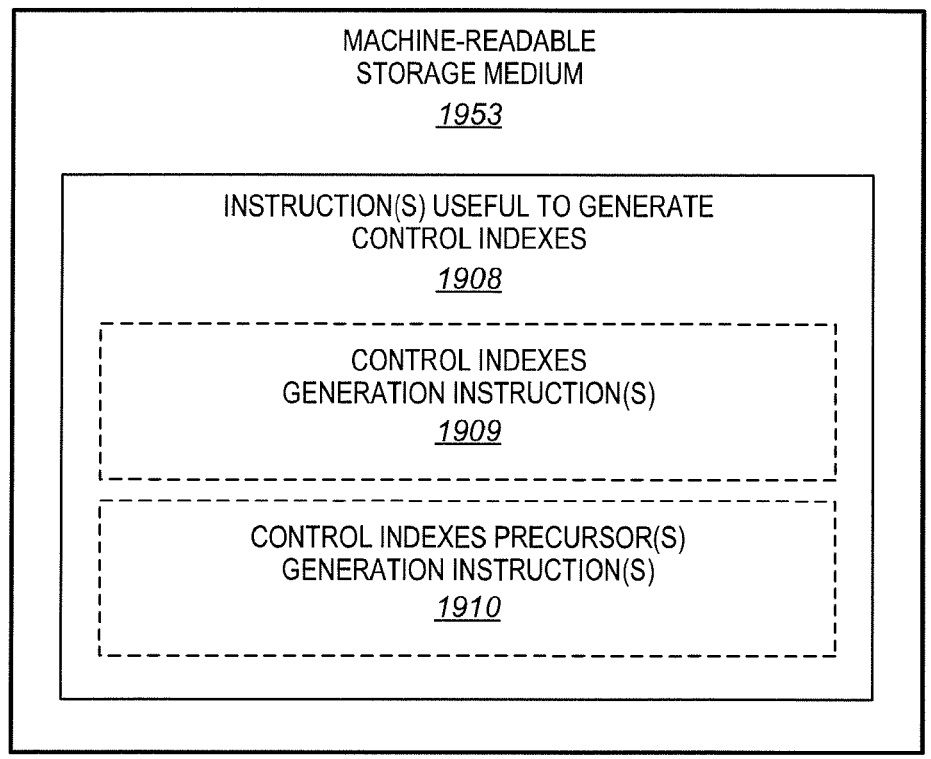
FIG. 19 is a block diagram of an article of manufacture including a machine-readable storage medium storing an instruction useful to generate control indexes.

FIG. 19 is a block diagram of an article of manufacture (e.g., a computer program product) 1952 including a machine-readable storage medium 1953. In some embodiments, the machine-readable storage medium may be a tangible and/or non-transitory machine-readable storage medium. In various example embodiments, the machine-readable storage medium may include a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a semiconductor memory, other types of memory, or a combinations thereof. In some embodiments, the medium may include one or more solid data storage materials, such as, for example, a semiconductor data storage material, a phase-change data storage material, a magnetic data storage material, an optically transparent solid data storage material, etc.

The machine-readable storage medium stores one or more instructions useful to generate control indexes 1908. In some embodiments, these may include one or more control indexes generation instructions 1910. In some embodiments, these may include one or more control indexes precursors generation instructions 1911. Each of the instructions useful to generate the control indexes, if executed by a machine, is operable to cause the machine to store a result in a destination storage location indicated by the instruction. The result includes a sequence of integers representing control indexes or control indexes precursors. Any of the instructions, results, and sequences of integers disclosed herein, are suitable. Moreover, other instructions may be stored on the medium (e.g., packed data rearrangement instructions, gather instructions, other instructions that use the control indexes, etc.).

Examples of different types of machines include, but are not limited to, processors (e.g., general-purpose processors and special-purpose processors), instruction processing apparatus, and various electronic devices having one or more processors or instruction processing apparatus. A few representative examples of such electronic devices include, but are not limited to, computer systems, desktops, laptops, notebooks, servers, network routers, network switches, net-tops, set-top boxes, cellular phones, video game controllers, etc.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or sub formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 20A illustrates an exemplary AVX instruction format including a VEX prefix 2002, real opcode field 2030, Mod R/M byte 2040, SIB byte 2050, displacement field 2062, and IMM8 2072. FIG. 20B illustrates which fields from FIG. 20A make up a full opcode field 2074 and a base operation field 2042. FIG. 20C illustrates which fields from FIG. 20A make up a register index field 2044.

VEX Prefix (Bytes 0-2) 2002 is encoded in a three-byte form. The first byte is the Format Field 2040 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 2005 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 2015 (VEX byte 1, bits [4:0]—mmmmm) includes content to encode an implied leading opcode byte. W Field 2064 (VEX byte 2, bit [7]—W)—is represented by the notation VEX.W, and provides different functions depending on the instruction. The role of VEX.vvvv 2020 (VEX Byte 2, bits [6:3]—vvvv) may include the following: 1) VEX.vvvv encodes the first source register operand, specified in inverted (1 s complement) form and is valid for instructions with 2 or more source operands; 2) VEX.vvvv encodes the destination register operand, specified in 1 s complement form for certain vector shifts; or 3) VEX.vvvv does not encode any operand, the field is reserved and should contain 1111b. If VEX.L 2068 Size field (VEX byte 2, bit [2]—L)=0, it indicates 128 bit vector; if VEX.L=1, it indicates 256 bit vector. Prefix encoding field 2025 (VEX byte 2, bits [1:0]—pp) provides additional bits for the base operation field.

Real Opcode Field 2030 (Byte 3) is also known as the opcode byte. Part of the opcode is specified in this field.

MOD R/M Field 2040 (Byte 4) includes MOD field 2042 (bits [7-6]), Reg field 2044 (bits [5-3]), and R/M field 2046 (bits [2-0]). The role of Reg field 2044 may include the following: encoding either the destination register operand or a source register operand (the rrr of Rrrr), or be treated as an opcode extension and not used to encode any instruction operand. The role of R/M field 2046 may include the following: encoding the instruction operand that references a memory address, or encoding either the destination register operand or a source register operand.

Scale, Index, Base (SIB)—The content of Scale field 2050 (Byte 5) includes SS2052 (bits [7-6]), which is used for memory address generation. The contents of SIB.xxx 2054 (bits [5-3]) and SIB.bbb 2056 (bits [2-0]) have been previously referred to with regard to the register indexes Xxxx and Bbbb.

The Displacement Field 2062 and the immediate field (IMM8) 2072 contain address data.
Generic Vector Friendly Instruction Format A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 21A:
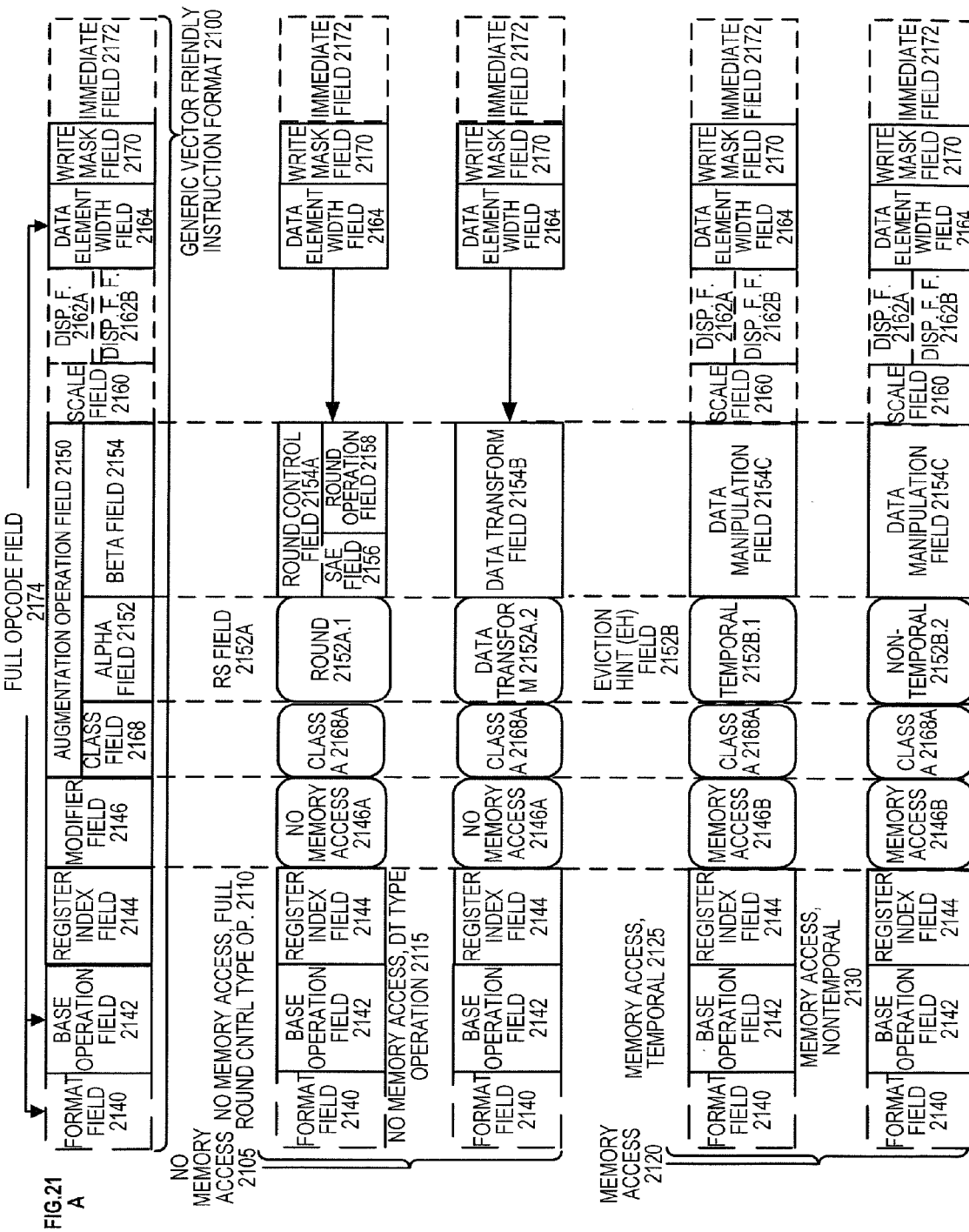
FIG. 21A is a block diagram illustrating a generic vector friendly instruction format and class A instruction templates thereof according to embodiments of the invention.
Figure 21B:
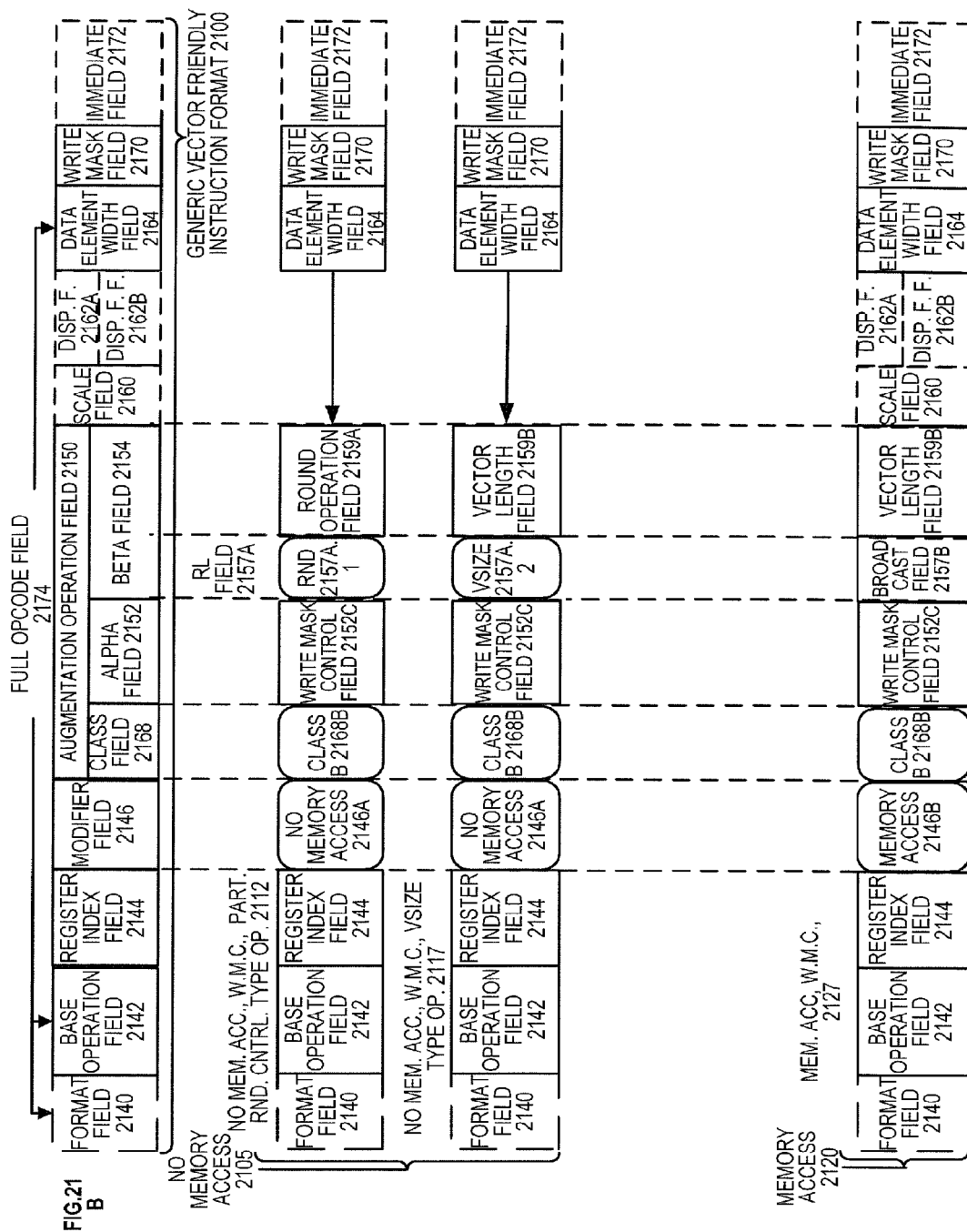
FIG. 21B is a block diagram illustrating the generic vector friendly instruction format and class B instruction templates thereof according to embodiments of the invention.

FIGS. 21A-21B are block diagrams illustrating a generic vector friendly instruction format and instruction templates thereof according to embodiments of the invention. FIG. 21A is a block diagram illustrating a generic vector friendly instruction format and class A instruction templates thereof according to embodiments of the invention; while FIG. 21B is a block diagram illustrating the generic vector friendly instruction format and class B instruction templates thereof according to embodiments of the invention. Specifically, a generic vector friendly instruction format 2100 for which are defined class A and class B instruction templates, both of which include no memory access 2105 instruction templates and memory access 2120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 21A include: 1) within the no memory access 2105 instruction templates there is shown a no memory access, full round control type operation 2110 instruction template and a no memory access, data transform type operation 2115 instruction template; and 2) within the memory access 2120 instruction templates there is shown a memory access, temporal 2125 instruction template and a memory access, non-temporal 2130 instruction template. The class B instruction templates in FIG. 21B include: 1) within the no memory access 2105 instruction templates there is shown a no memory access, write mask control, partial round control type operation 2112 instruction template and a no memory access, write mask control, vsize type operation 2117 instruction template; and 2) within the memory access 2120 instruction templates there is shown a memory access, write mask control 2127 instruction template.

The generic vector friendly instruction format 2100 includes the following fields listed below in the order illustrated in FIGS. 21A-21B.

Format field 2140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2142—its content distinguishes different base operations.

Register index field 2144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2146—its content distinguishes occurrences of instructions in the generic vector instruction format that specify memory access from those that do not; that is, between no memory access 2105 instruction templates and memory access 2120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2150—its content distinguishes which one of a variety of different operations to be performed in addition to the base operation. This field is context specific. In one embodiment of the invention, this field is divided into a class field 2168, an alpha field 2152, and a beta field 2154. The augmentation operation field 2150 allows common groups of operations to be performed in a single instruction rather than 2, 3, or 4 instructions.

Scale field 2160—its content allows for the scaling of the index field's content for memory address generation (e.g., for address generation that uses $2^{scale}*\text{index}+\text{base}$).

Displacement Field 2162A—its content is used as part of memory address generation (e.g., for address generation that uses $2^{scale}*\text{index}+\text{base}+\text{displacement}$).

Displacement Factor Field 2162B (note that the juxtaposition of displacement field 2162A directly over displacement factor field 2162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2174 (described later herein) and the data manipulation field 2154C. The displacement field 2162A and the displacement factor field 2162B are optional in the sense that they are not used for the no memory access 2105 instruction templates and/or different embodiments may implement only one or none of the two.

Data element width field 2164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2170 allows for partial vector operations, including loads, stores, arithmetic, logical, etc. While embodiments of the invention are described in which the write mask field's 2170 content selects one of a number of write mask registers that contains the write mask to be used (and thus the write mask field's 2170 content indirectly identifies that masking to be performed), alternative embodiments instead or additional allow the mask write field's 2170 content to directly specify the masking to be performed.

Immediate field 2172—its content allows for the specification of an immediate. This field is optional in the sense that is it not present in an implementation of the generic vector friendly format that does not support immediate and it is not present in instructions that do not use an immediate.

Class field 2168—its content distinguishes between different classes of instructions. With reference to FIGS. 21A-B, the contents of this field select between class A and class B instructions. In FIGS. 21A-B, rounded corner squares are used to indicate a specific value is present in a field (e.g., class A 2168A and class B 2168B for the class field 2168 respectively in FIGS. 21A-B).

Instruction Templates of Class A

In the case of the non-memory access 2105 instruction templates of class A, the alpha field 2152 is interpreted as an RS field 2152A, whose content distinguishes which one of the different augmentation operation types are to be performed (e.g., round 2152A.1 and data transform 2152A.2 are respectively specified for the no memory access, round type operation 2110 and the no memory access, data transform type operation 2115 instruction templates), while the beta field 2154 distinguishes which of the operations of the specified type is to be performed. In the no memory access 2105 instruction templates, the scale field 2160, the displacement field 2162A, and the displacement scale filed 2162B are not present.

No-Memory Access Instruction Templates—Full Round Control Type Operation

In the no memory access full round control type operation 2110 instruction template, the beta field 2154 is interpreted as a round control field 2154A, whose content(s) provide static rounding. While in the described embodiments of the invention the round control field 2154A includes a suppress all floating point exceptions (SAE) field 2156 and a round operation control field 2158, alternative embodiments may support may encode both these concepts into the same field or only have one or the other of these concepts/fields (e.g., may have only the round operation control field 2158).

SAE field 2156—its content distinguishes whether or not to disable the exception event reporting; when the SAE field's 2156 content indicates suppression is enabled, a given instruction does not report any kind of floating-point exception flag and does not raise any floating point exception handler.

Round operation control field 2158—its content distinguishes which one of a group of rounding operations to perform (e.g., Round-up, Round-down, Round-towards-zero and Round-to-nearest). Thus, the round operation control field 2158 allows for the changing of the rounding mode on a per instruction basis. In one embodiment of the invention where a processor includes a control register for specifying rounding modes, the round operation control field's 2150 content overrides that register value.

No Memory Access Instruction Templates—Data Transform Type Operation

In the no memory access data transform type operation 2115 instruction template, the beta field 2154 is interpreted as a data transform field 2154B, whose content distinguishes which one of a number of data transforms is to be performed (e.g., no data transform, swizzle, broadcast).

In the case of a memory access 2120 instruction template of class A, the alpha field 2152 is interpreted as an eviction hint field 2152B, whose content distinguishes which one of the eviction hints is to be used (in FIG. 21A, temporal 2152B.1 and non-temporal 2152B.2 are respectively specified for the memory access, temporal 2125 instruction template and the memory access, non-temporal 2130 instruction template), while the beta field 2154 is interpreted as a data manipulation field 2154C, whose content distinguishes which one of a number of data manipulation operations (also known as primitives) is to be performed (e.g., no manipulation; broadcast; up conversion of a source; and down conversion of a destination). The memory access 2120 instruction templates include the scale field 2160, and optionally the displacement field 2162A or the displacement scale field 2162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2152 is interpreted as a write mask control (Z) field 2152C, whose content distinguishes whether the write masking controlled by the write mask field 2170 should be a merging or a zeroing.

In the case of the non-memory access 2105 instruction templates of class B, part of the beta field 2154 is interpreted as an RL field 2157A, whose content distinguishes which one of the different augmentation operation types are to be performed (e.g., round 2157A.1 and vector length (VSIZE) 2157A.2 are respectively specified for the no memory access, write mask control, partial round control type operation 2112 instruction template and the no memory access, write mask control, VSIZE type operation 2117 instruction template), while the rest of the beta field 2154 distinguishes which of the operations of the specified type is to be performed. In the no memory access 2105 instruction templates, the scale field 2160, the displacement field 2162A, and the displacement scale filed 2162B are not present.

In the no memory access, write mask control, partial round control type operation 2110 instruction template, the rest of the beta field 2154 is interpreted as a round operation field 2159A and exception event reporting is disabled (a given instruction does not report any kind of floating-point exception flag and does not raise any floating point exception handler).

Round operation control field 2159A—just as round operation control field 2158, its content distinguishes which one of a group of rounding operations to perform (e.g., Round-up, Round-down, Round-towards-zero and Round-to-nearest). Thus, the round operation control field 2159A allows for the changing of the rounding mode on a per instruction basis. In one embodiment of the invention where a processor includes a control register for specifying rounding modes, the round operation control field's 2150 content overrides that register value.

In the no memory access, write mask control, VSIZE type operation 2117 instruction template, the rest of the beta field 2154 is interpreted as a vector length field 2159B, whose content distinguishes which one of a number of data vector lengths is to be performed on (e.g., 128, 256, or 512 byte).

In the case of a memory access 2120 instruction template of class B, part of the beta field 2154 is interpreted as a broadcast field 2157B, whose content distinguishes whether or not the broadcast type data manipulation operation is to be performed, while the rest of the beta field 2154 is interpreted the vector length field 2159B. The memory access 2120 instruction templates include the scale field 2160, and optionally the displacement field 2162A or the displacement scale field 2162B.

With regard to the generic vector friendly instruction format 2100, a full opcode field 2174 is shown including the format field 2140, the base operation field 2142, and the data element width field 2164. While one embodiment is shown where the full opcode field 2174 includes all of these fields, the full opcode field 2174 includes less than all of these fields in embodiments that do not support all of them. The full opcode field 2174 provides the operation code (opcode).

The augmentation operation field 2150, the data element width field 2164, and the write mask field 2170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 22 is a block diagram illustrating an exemplary specific vector friendly instruction format according to embodiments of the invention. FIG. 22 shows a specific vector friendly instruction format 2200 that is specific in the sense that it specifies the location, size, interpretation, and order of the fields, as well as values for some of those fields. The specific vector friendly instruction format 2200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 21 into which the fields from FIG. 22 map are illustrated.

It should be understood that, although embodiments of the invention are described with reference to the specific vector friendly instruction format 2200 in the context of the generic vector friendly instruction format 2100 for illustrative purposes, the invention is not limited to the specific vector friendly instruction format 2200 except where claimed. For example, the generic vector friendly instruction format 2100 contemplates a variety of possible sizes for the various fields, while the specific vector friendly instruction format 2200 is shown as having fields of specific sizes. By way of specific example, while the data element width field 2164 is illustrated as a one bit field in the specific vector friendly instruction format 2200, the invention is not so limited (that is, the generic vector friendly instruction format 2100 contemplates other sizes of the data element width field 2164).

The generic vector friendly instruction format 2100 includes the following fields listed below in the order illustrated in FIG. 22A.

EVEX Prefix (Bytes 0-3) 2202—is encoded in a four-byte form.

Format Field 2140 (EVEX Byte 0, bits [7:0])—the first byte (EVEX Byte 0) is the format field 2140 and it contains 0x62 (the unique value used for distinguishing the vector friendly instruction format in one embodiment of the invention).

The second-fourth bytes (EVEX Bytes 1-3) include a number of bit fields providing specific capability.

REX field 2205 (EVEX Byte 1, bits [7-5])—consists of a EVEX.R bit field (EVEX Byte 1, bit [7]—R), EVEX.X bit field (EVEX byte 1, bit [6]—X), and 2157BEX byte 1, bit[5]—B). The EVEX.R, EVEX.X, and EVEX.B bit fields provide the same functionality as the corresponding VEX bit fields, and are encoded using 1 s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2110—this is the first part of the REX' field 2110 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2215 (EVEX byte 1, bits [3:0]—mmmm)—its content encodes an implied leading opcode byte (0F, 0F 38, or 0F 3).

Data element width field 2164 (EVEX byte 2, bit [7]—W)—is represented by the notation EVEX.W. EVEX.W is used to define the granularity (size) of the datatype (either 32-bit data elements or 64-bit data elements).

EVEX.vvvv 2220 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 2220 encodes the 4 low-order bits of the first source register specifier stored in inverted (1 s complement) form. Depending on the instruction, an extra different EVEX bit field is used to extend the specifier size to 32 registers.

EVEX.0 2168 Class field (EVEX byte 2, bit [2]—U)—If EVEX.0=0, it indicates class A or EVEX.U0; if EVEX.0=1, it indicates class B or EVEX.U1.

Prefix encoding field 2225 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2152 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 2154 (EVEX byte 3, bits [6:4]—SSS, also known as $EVEX.s_{2-0}$, $EVEX.r_{2-0}$, EVEX.rr1, EVEX.LL0, EVEX.LLB; also illustrated with βββ)—as previously described, this field is context specific.

REX' field 2110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2170 (EVEX byte 3, bits [2:0]—kkk)— its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 2230 (Byte 4) is also known as the opcode byte. Part of the opcode is specified in this field.

MOD R/M Field 2240 (Byte 5) includes MOD field 2242, Reg field 2244, and R/M field 2246. As previously described, the MOD field's 2242 content distinguishes between memory access and non-memory access operations. The role of Reg field 2244 can be summarized to two situations: encoding either the destination register operand or a source register operand, or be treated as an opcode extension and not used to encode any instruction operand. The role of R/M field 2246 may include the following: encoding the instruction operand that references a memory address, or encoding either the destination register operand or a source register operand.

Scale, Index, Base (SIB) Byte (Byte 6)—As previously described, the scale field's 2150 content is used for memory address generation. SIB.xxx 2254 and SIB.bbb 2256—the contents of these fields have been previously referred to with regard to the register indexes Xxxx and Bbbb.

Displacement field 2162A (Bytes 7-10)—when MOD field 2242 contains 10, bytes 7-10 are the displacement field 2162A, and it works the same as the legacy 32-bit displacement (disp32) and works at byte granularity.

Displacement factor field 2162B (Byte 7)—when MOD field 2242 contains 01, byte 7 is the displacement factor field 2162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2162B is a reinterpretation of disp8; when using displacement factor field 2162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2162B substitutes the legacy x86 instruction set 8-bit displacement. Thus, the displacement factor field 2162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 2172 operates as previously described.

Full Opcode Field

FIG. 22B is a block diagram illustrating the fields of the specific vector friendly instruction format 2200 that make up the full opcode field 2174 according to one embodiment of the invention. Specifically, the full opcode field 2174 includes the format field 2140, the base operation field 2142, and the data element width (W) field 2164. The base operation field 2142 includes the prefix encoding field 2225, the opcode map field 2215, and the real opcode field 2230.

Register Index Field

FIG. 22C is a block diagram illustrating the fields of the specific vector friendly instruction format 2200 that make up the register index field 2144 according to one embodiment of the invention. Specifically, the register index field 2144 includes the REX field 2205, the REX' field 2210, the MODR/M.reg field 2244, the MODR/M.r/m field 2246, the VVVV field 2220, xxx field 2254, and the bbb field 2256.

Augmentation Operation Field

Figure 22D:
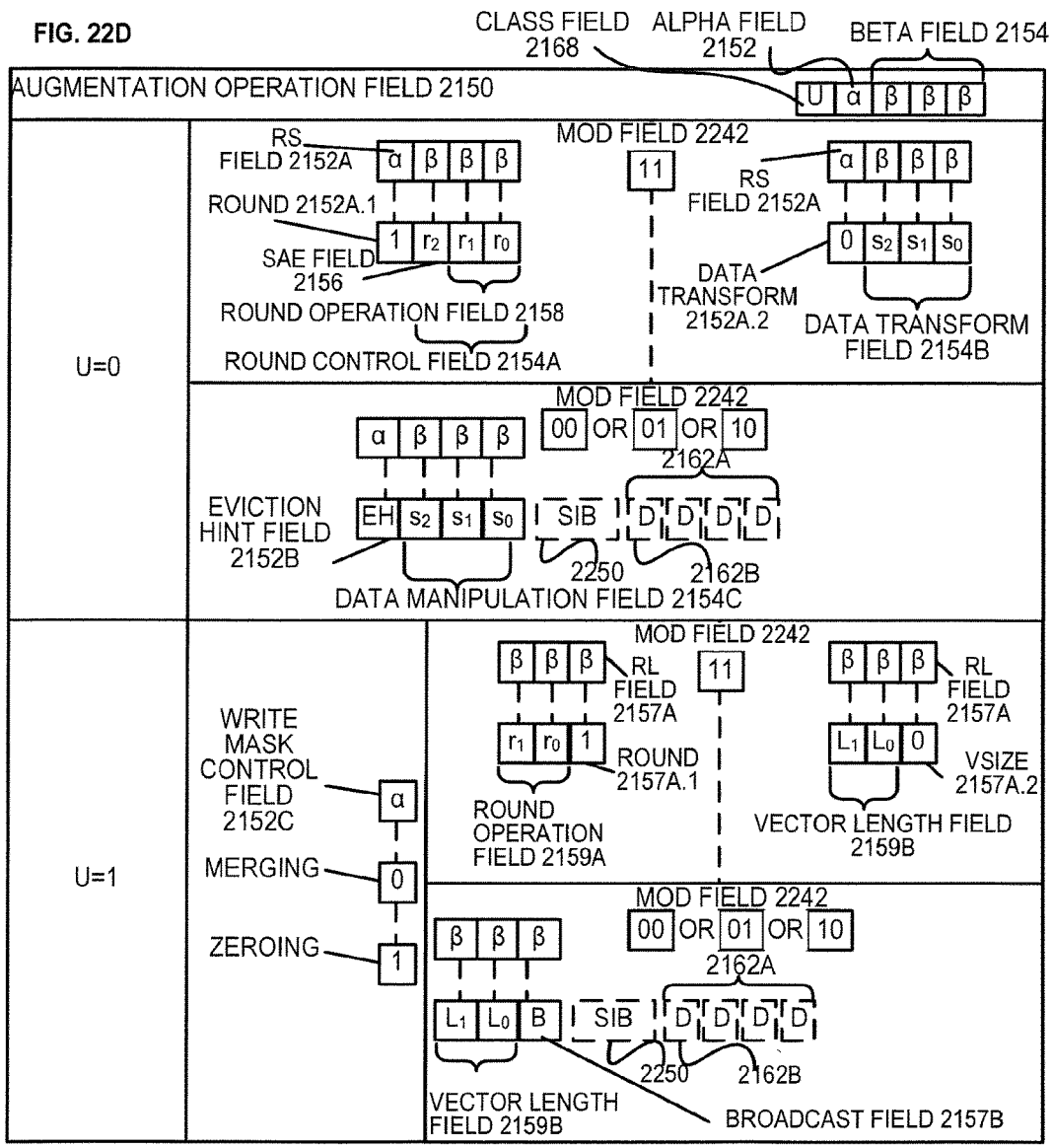
FIG. 22D is a block diagram illustrating the fields of the specific vector friendly instruction format that make up the augmentation operation field according to one embodiment of the invention.

FIG. 22D is a block diagram illustrating the fields of the specific vector friendly instruction format 2200 that make up the augmentation operation field 2150 according to one embodiment of the invention. When the class (U) field 2168 contains 0, it signifies EVEX.U0 (class A 2168A); when it contains 1, it signifies EVEX.U1 (class B 2168B). When U=0 and the MOD field 2242 contains 11 (signifying a no memory access operation), the alpha field 2152 (EVEX byte 3, bit [7]—EH) is interpreted as the rs field 2152A. When the rs field 2152A contains a 1 (round 2152A.1), the beta field 2154 (EVEX byte 3, bits [6:4]—SSS) is interpreted as the round control field 2154A. The round control field 2154A includes a one bit SAE field 2156 and a two bit round operation field 2158. When the rs field 2152A contains a 0 (data transform 2152A.2), the beta field 2154 (EVEX byte 3, bits [6:4]—SSS) is interpreted as a three bit data transform field 2154B. When U=0 and the MOD field 2242 contains 00, 01, or 10 (signifying a memory access operation), the alpha field 2152 (EVEX byte 3, bit [7]—EH) is interpreted as the eviction hint (EH) field 2152B and the beta field 2154 (EVEX byte 3, bits [6:4]—SSS) is interpreted as a three bit data manipulation field 2154C.

When U=1, the alpha field 2152 (EVEX byte 3, bit [7]—EH) is interpreted as the write mask control (Z) field 2152C. When U=1 and the MOD field 2242 contains 11 (signifying a no memory access operation), part of the beta field 2154 (EVEX byte 3, bit [4]—$S_0$) is interpreted as the RL field 2157A; when it contains a 1 (round 2157A.1) the rest of the beta field 2154 (EVEX byte 3, bit [6-5]—$S_{2-1}$) is interpreted as the round operation field 2159A, while when the RL field 2157A contains a 0 (VSIZE 2157.A2) the rest of the beta field 2154 (EVEX byte 3, bit [6-5]—$S_{2-1}$) is interpreted as the vector length field 2159B (EVEX byte 3, bit [6-5]—$L_{1-0}$). When U=1 and the MOD field 2242 contains 00, 01, or 10 (signifying a memory access operation), the beta field 2154 (EVEX byte 3, bits [6:4]—SSS) is interpreted as the vector length field 2159B (EVEX byte 3, bit [6-5]—$L_{1-0}$) and the broadcast field 2157B (EVEX byte 3, bit [4]—B).

Exemplary Register Architecture

Figure 23:
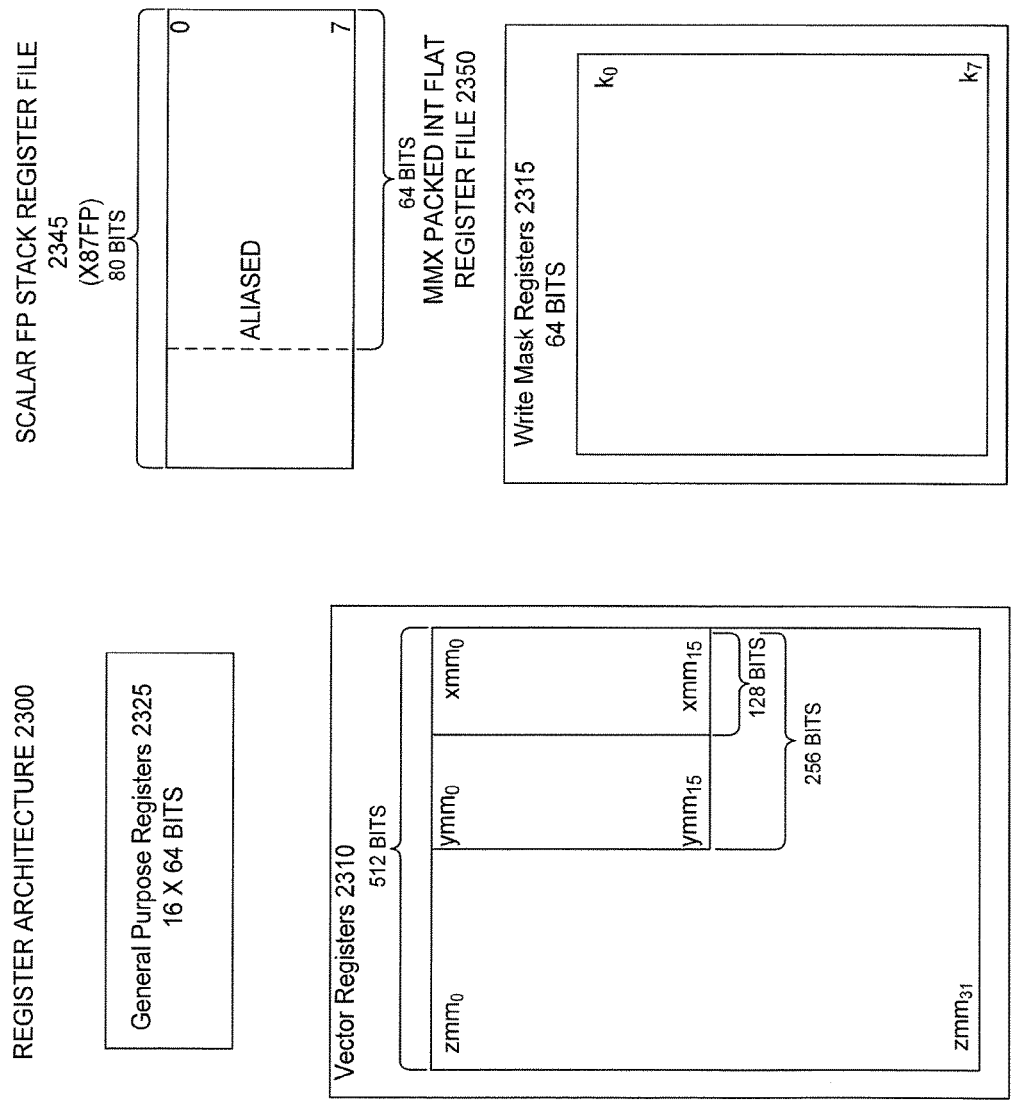
FIG. 23 is a block diagram of a register architecture according to one embodiment of the invention.

FIG. 23 is a block diagram of a register architecture 2300 according to one embodiment of the invention. In the embodiment illustrated, there are 32 vector registers 2310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2200 operates on these overlaid register file as illustrated in the below tables.

| Adjustable Vector Length | Class | Operations | Registers |
|---|---|---|---|
| Instruction Templates that do not include the vector length field 2159B | A (FIG. 21A; U = 0) | 2110, 2115, 2125, 2130 | zmm registers (the vector length is 64 byte) |
|  | B (FIG. 21B; U = 1) | 2112 | zmm registers (the vector length is 64 byte) |
| Instruction templates that do include the vector length field 2159B | B (FIG. 21B; U = 1) | 2117, 2127 | zmm, ymm, or xmm registers (the vector length is 64 byte, 32 byte, or 16 byte) depending on the vector length field 2159B |

In other words, the vector length field 2159B selects between a maximum length and one or more other shorter lengths, where each such shorter length is half the length of the preceding length; and instructions templates without the vector length field 2159B operate on the maximum vector length. Further, in one embodiment, the class B instruction templates of the specific vector friendly instruction format 2200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2315—in the embodiment illustrated, there are 8 write mask registers (k0 through k7), each 64 bits in size. In an alternate embodiment, the write mask registers 2315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 2325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2345, on which is aliased the MMX packed integer flat register file 2350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 24A is a block diagram illustrating both an exemplary in-order pipeline and an exemplary register renaming, out-of-order issue/execution pipeline according to embodiments of the invention. FIG. 24B is a block diagram illustrating both an exemplary embodiment of an in-order architecture core and an exemplary register renaming, out-of-order issue/execution architecture core to be included in a processor according to embodiments of the invention. The solid lined boxes in FIGS. 24A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 24A, a processor pipeline 2400 includes a fetch stage 2402, a length decode stage 2404, a decode stage 2406, an allocation stage 2408, a renaming stage 2410, a scheduling (also known as a dispatch or issue) stage 2412, a register read/memory read stage 2414, an execute stage 2416, a write back/memory write stage 2418, an exception handling stage 2422, and a commit stage 2424.

FIG. 24B shows processor core 2490 including a front end unit 2430 coupled to an execution engine unit 2450, and both are coupled to a memory unit 2470. The core 2490 may be a reduced instruction set computing (RISC) core, a complex instruction set computing (CISC) core, a very long instruction word (VLIW) core, or a hybrid or alternative core type. As yet another option, the core 2490 may be a special-purpose core, such as, for example, a network or communication core, compression engine, coprocessor core, general purpose computing graphics processing unit (GPGPU) core, graphics core, or the like.

The front end unit 2430 includes a branch prediction unit 2432 coupled to an instruction cache unit 2434, which is coupled to an instruction translation lookaside buffer (TLB) 2436, which is coupled to an instruction fetch unit 2438, which is coupled to a decode unit 2440. The decode unit 2440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2490 includes a microcode ROM or other medium that stores microcode for certain macroinstructions (e.g., in decode unit 2440 or otherwise within the front end unit 2430). The decode unit 2440 is coupled to a rename/allocator unit 2452 in the execution engine unit 2450.

The execution engine unit 2450 includes the rename/allocator unit 2452 coupled to a retirement unit 2454 and a set of one or more scheduler unit(s) 2456. The scheduler unit(s) 2456 represents any number of different schedulers, including reservations stations, central instruction window, etc. The scheduler unit(s) 2456 is coupled to the physical register file(s) unit(s) 2458. Each of the physical register file(s) units 2458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2458 comprises a vector registers unit, a write mask registers unit, and a scalar registers unit. These register units may provide architectural vector registers, vector mask registers, and general purpose registers. The physical register file(s) unit(s) 2458 is overlapped by the retirement unit 2454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2454 and the physical register file(s) unit(s) 2458 are coupled to the execution cluster(s) 2460. The execution cluster(s) 2460 includes a set of one or more execution units 2462 and a set of one or more memory access units 2464. The execution units 2462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2456, physical register file(s) unit(s) 2458, and execution cluster(s) 2460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2464). It should also be understood that where separate pipelines are used, one or more of these pipelines may be out-of-order issue/execution and the rest in-order.

The set of memory access units 2464 is coupled to the memory unit 2470, which includes a data TLB unit 2472 coupled to a data cache unit 2474 coupled to a level 2 (L2) cache unit 2476. In one exemplary embodiment, the memory access units 2464 may include a load unit, a store address unit, and a store data unit, each of which is coupled to the data TLB unit 2472 in the memory unit 2470. The instruction cache unit 2434 is further coupled to a level 2 (L2) cache unit 2476 in the memory unit 2470. The L2 cache unit 2476 is coupled to one or more other levels of cache and eventually to a main memory.

By way of example, the exemplary register renaming, out-of-order issue/execution core architecture may implement the pipeline 2400 as follows: 1) the instruction fetch 2438 performs the fetch and length decoding stages 2402 and 2404; 2) the decode unit 2440 performs the decode stage 2406; 3) the rename/allocator unit 2452 performs the allocation stage 2408 and renaming stage 2410; 4) the scheduler unit(s) 2456 performs the schedule stage 2412; 5) the physical register file(s) unit(s) 2458 and the memory unit 2470 perform the register read/memory read stage 2414; the execution cluster 2460 perform the execute stage 2416; 6) the memory unit 2470 and the physical register file(s) unit(s) 2458 perform the write back/memory write stage 2418; 7) various units may be involved in the exception handling stage 2422; and 8) the retirement unit 2454 and the physical register file(s) unit(s) 2458 perform the commit stage 2424.

The core 2490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2434/2474 and a shared L2 cache unit 2476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 25A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 25A is a block diagram of a single processor core, along with its connection to the on-die interconnect network 2502 and with its local subset of the Level 2 (L2) cache 2504, according to embodiments of the invention. In one embodiment, an instruction decoder 2500 supports the x86 instruction set with a packed data instruction set extension. An L1 cache 2506 allows low-latency accesses to cache memory into the scalar and vector units. While in one embodiment (to simplify the design), a scalar unit 2508 and a vector unit 2510 use separate register sets (respectively, scalar registers 2512 and vector registers 2514) and data transferred between them is written to memory and then read back in from a level 1 (L1) cache 2506, alternative embodiments of the invention may use a different approach (e.g., use a single register set or include a communication path that allow data to be transferred between the two register files without being written and read back).

The local subset of the L2 cache 2504 is part of a global L2 cache that is divided into separate local subsets, one per processor core. Each processor core has a direct access path to its own local subset of the L2 cache 2504. Data read by a processor core is stored in its L2 cache subset 2504 and can be accessed quickly, in parallel with other processor cores accessing their own local L2 cache subsets. Data written by a processor core is stored in its own L2 cache subset 2504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 25B is an expanded view of part of the processor core in FIG. 25A according to embodiments of the invention. FIG. 25B includes an L1 data cache 2506A part of the L1 cache 2504, as well as more detail regarding the vector unit 2510 and the vector registers 2514. Specifically, the vector unit 2510 is a 16-wide vector processing unit (VPU) (see the 16-wide ALU 2528), which executes one or more of integer, single-precision float, and double-precision float instructions. The VPU supports swizzling the register inputs with swizzle unit 2520, numeric conversion with numeric convert units 2522A-B, and replication with replication unit 2524 on the memory input. Write mask registers 2526 allow predicating resulting vector writes.

Processor with Integrated Memory Controller and Graphics

Figure 26:
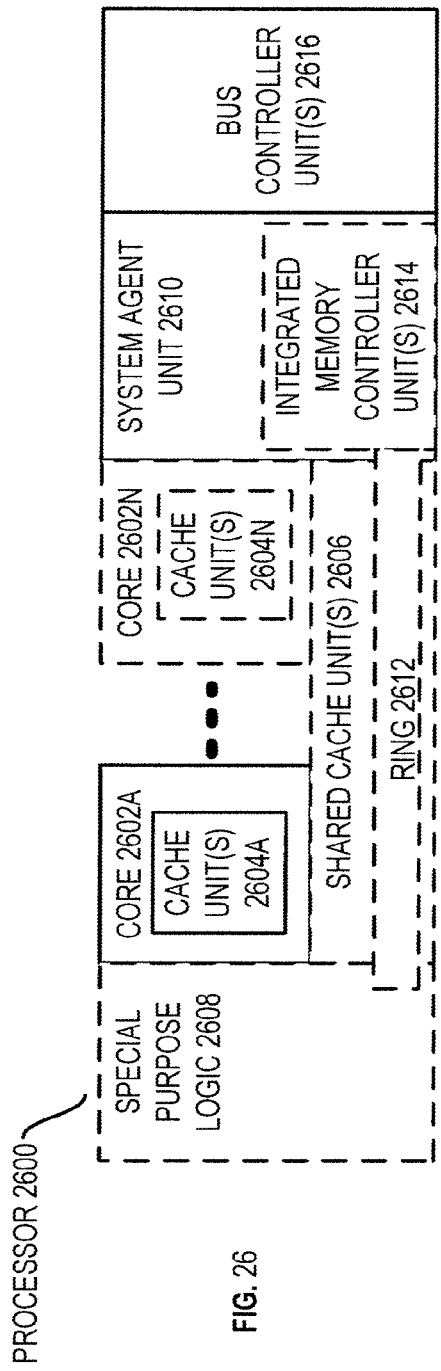
FIG. 26 is a block diagram of a processor that may have more than one core, may have an integrated memory controller, and may have integrated graphics according to embodiments of the invention.

FIG. 26 is a block diagram of a processor 2600 that may have more than one core, may have an integrated memory controller, and may have integrated graphics according to embodiments of the invention. The solid lined boxes in FIG. 26 illustrate a processor 2600 with a single core 2602A, a system agent 2610, a set of one or more bus controller units 2616, while the optional addition of the dashed lined boxes illustrates an alternative processor 2600 with multiple cores 2602A-N, a set of one or more integrated memory controller unit(s) 2614 in the system agent unit 2610, and special purpose logic 2608.

Thus, different implementations of the processor 2600 may include: 1) a CPU with the special purpose logic 2608 being integrated graphics and/or scientific (throughput) logic (which may include one or more cores), and the cores 2602A-N being one or more general purpose cores (e.g., general purpose in-order cores, general purpose out-of-order cores, a combination of the two); 2) a coprocessor with the cores 2602A-N being a large number of special purpose cores intended primarily for graphics and/or scientific (throughput); and 3) a coprocessor with the cores 2602A-N being a large number of general purpose in-order cores. Thus, the processor 2600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2606, and external memory (not shown) coupled to the set of integrated memory controller units 2614. The set of shared cache units 2606 may include one or more mid-level caches, such as level 2 (L2), level 3 (L3), level 4 (L4), or other levels of cache, a last level cache (LLC), and/or combinations thereof. While in one embodiment a ring based interconnect unit 2612 interconnects the integrated graphics logic 2608, the set of shared cache units 2606, and the system agent unit 2610/integrated memory controller unit(s) 2614, alternative embodiments may use any number of well-known techniques for interconnecting such units. In one embodiment, coherency is maintained between one or more cache units 2606 and cores 2602-A-N.

In some embodiments, one or more of the cores 2602A-N are capable of multi-threading. The system agent 2610 includes those components coordinating and operating cores 2602A-N. The system agent unit 2610 may include for example a power control unit (PCU) and a display unit. The PCU may be or include logic and components needed for regulating the power state of the cores 2602A-N and the integrated graphics logic 2608. The display unit is for driving one or more externally connected displays.

The cores 2602A-N may be homogenous or heterogeneous in terms of architecture instruction set; that is, two or more of the cores 2602A-N may be capable of execution the same instruction set, while others may be capable of executing only a subset of that instruction set or a different instruction set.

Exemplary Computer Architectures

FIGS. 27-30 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 27:
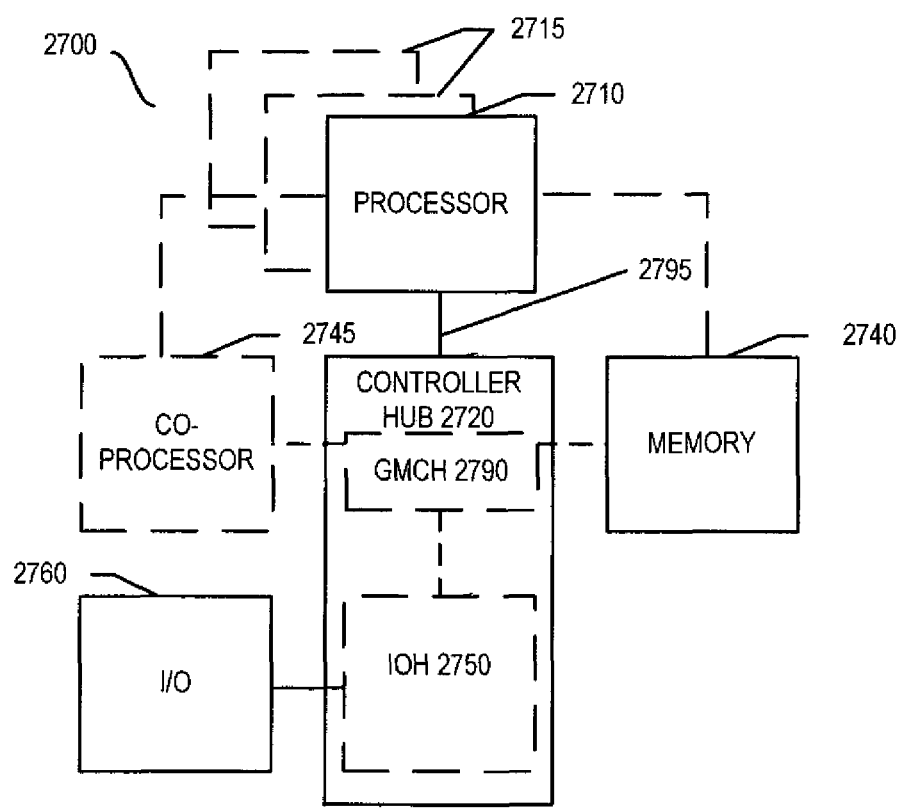
FIG. 27, shown is a block diagram of a system in accordance with one embodiment of the present invention.

Referring now to FIG. 27, shown is a block diagram of a system 2700 in accordance with one embodiment of the present invention. The system 2700 may include one or more processors 2710, 2715, which are coupled to a controller hub 2720. In one embodiment the controller hub 2720 includes a graphics memory controller hub (GMCH) 2790 and an Input/Output Hub (IOH) 2750 (which may be on separate chips); the GMCH 2790 includes memory and graphics controllers to which are coupled memory 2740 and a coprocessor 2745; the IOH 2750 is couples input/output (I/O) devices 2760 to the GMCH 2790. Alternatively, one or both of the memory and graphics controllers are integrated within the processor (as described herein), the memory 2740 and the coprocessor 2745 are coupled directly to the processor 2710, and the controller hub 2720 in a single chip with the IOH 2750.

The optional nature of additional processors 2715 is denoted in FIG. 27 with broken lines. Each processor 2710, 2715 may include one or more of the processing cores described herein and may be some version of the processor 2600.

The memory 2740 may be, for example, dynamic random access memory (DRAM), phase change memory (PCM), or a combination of the two. For at least one embodiment, the controller hub 2720 communicates with the processor(s) 2710, 2715 via a multi-drop bus, such as a frontside bus (FSB), point-to-point interface such as QuickPath Interconnect (QPI), or similar connection 2795.

In one embodiment, the coprocessor 2745 is a special-purpose processor, such as, for example, a high-throughput MIC processor, a network or communication processor, compression engine, graphics processor, GPGPU, embedded processor, or the like. In one embodiment, controller hub 2720 may include an integrated graphics accelerator.

There can be a variety of differences between the physical resources 2710, 2715 in terms of a spectrum of metrics of merit including architectural, microarchitectural, thermal, power consumption characteristics, and the like.

In one embodiment, the processor 2710 executes instructions that control data processing operations of a general type. Embedded within the instructions may be coprocessor instructions. The processor 2710 recognizes these coprocessor instructions as being of a type that should be executed by the attached coprocessor 2745. Accordingly, the processor 2710 issues these coprocessor instructions (or control signals representing coprocessor instructions) on a coprocessor bus or other interconnect, to coprocessor 2745. Coprocessor(s) 2745 accept and execute the received coprocessor instructions.

Figure 28:
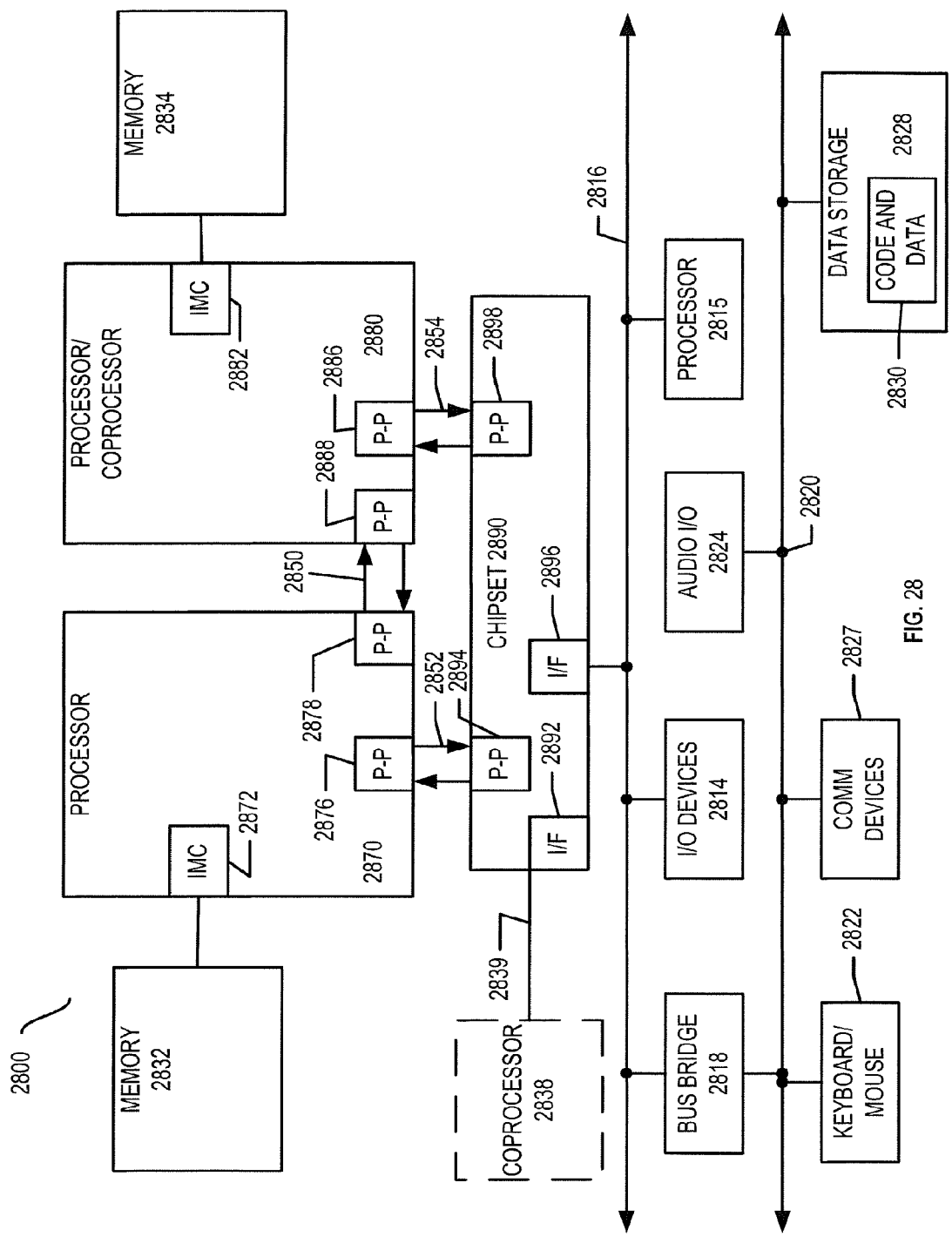
FIG. 28, shown is a block diagram of a first more specific exemplary system in accordance with an embodiment of the present invention.

Referring now to FIG. 28, shown is a block diagram of a first more specific exemplary system 2800 in accordance with an embodiment of the present invention. As shown in FIG. 28, multiprocessor system 2800 is a point-to-point interconnect system, and includes a first processor 2870 and a second processor 2880 coupled via a point-to-point interconnect 2850. Each of processors 2870 and 2880 may be some version of the processor 2600. In one embodiment of the invention, processors 2870 and 2880 are respectively processors 2710 and 2715, while coprocessor 2838 is coprocessor 2745. In another embodiment, processors 2870 and 2880 are respectively processor 2710 coprocessor 2745.

Processors 2870 and 2880 are shown including integrated memory controller (IMC) units 2872 and 2882, respectively. Processor 2870 also includes as part of its bus controller units point-to-point (P-P) interfaces 2876 and 2878; similarly, second processor 2880 includes P-P interfaces 2886 and 2888. Processors 2870, 2880 may exchange information via a point-to-point (P-P) interface 2850 using P-P interface circuits 2878, 2888. As shown in FIG. 28, IMCs 2872 and 2882 couple the processors to respective memories, namely a memory 2832 and a memory 2834, which may be portions of main memory locally attached to the respective processors.

Processors 2870, 2880 may each exchange information with a chipset 2890 via individual P-P interfaces 2852, 2854 using point to point interface circuits 2876, 2894, 2886, 2898. Chipset 2890 may optionally exchange information with the coprocessor 2838 via a high-performance interface 2839. In one embodiment, the coprocessor 2838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2890 may be coupled to a first bus 2816 via an interface 2896. In one embodiment, first bus 2816 may be a Peripheral Component Interconnect (PCI) bus, or a bus such as a PCI Express bus or another third generation I/O interconnect bus, although the scope of the present invention is not so limited.

As shown in FIG. 28, various I/O devices 2814 may be coupled to first bus 2816, along with a bus bridge 2818 which couples first bus 2816 to a second bus 2820. In one embodiment, one or more additional processor(s) 2815, such as coprocessors, high-throughput MIC processors, GPGPU's, accelerators (such as, e.g., graphics accelerators or digital signal processing (DSP) units), field programmable gate arrays, or any other processor, are coupled to first bus 2816. In one embodiment, second bus 2820 may be a low pin count (LPC) bus. Various devices may be coupled to a second bus 2820 including, for example, a keyboard and/or mouse 2822, communication devices 2827 and a storage unit 2828 such as a disk drive or other mass storage device which may include instructions/code and data 2830, in one embodiment. Further, an audio I/O 2824 may be coupled to the second bus 2820. Note that other architectures are possible. For example, instead of the point-to-point architecture of FIG. 28, a system may implement a multi-drop bus or other such architecture.

Figure 29:
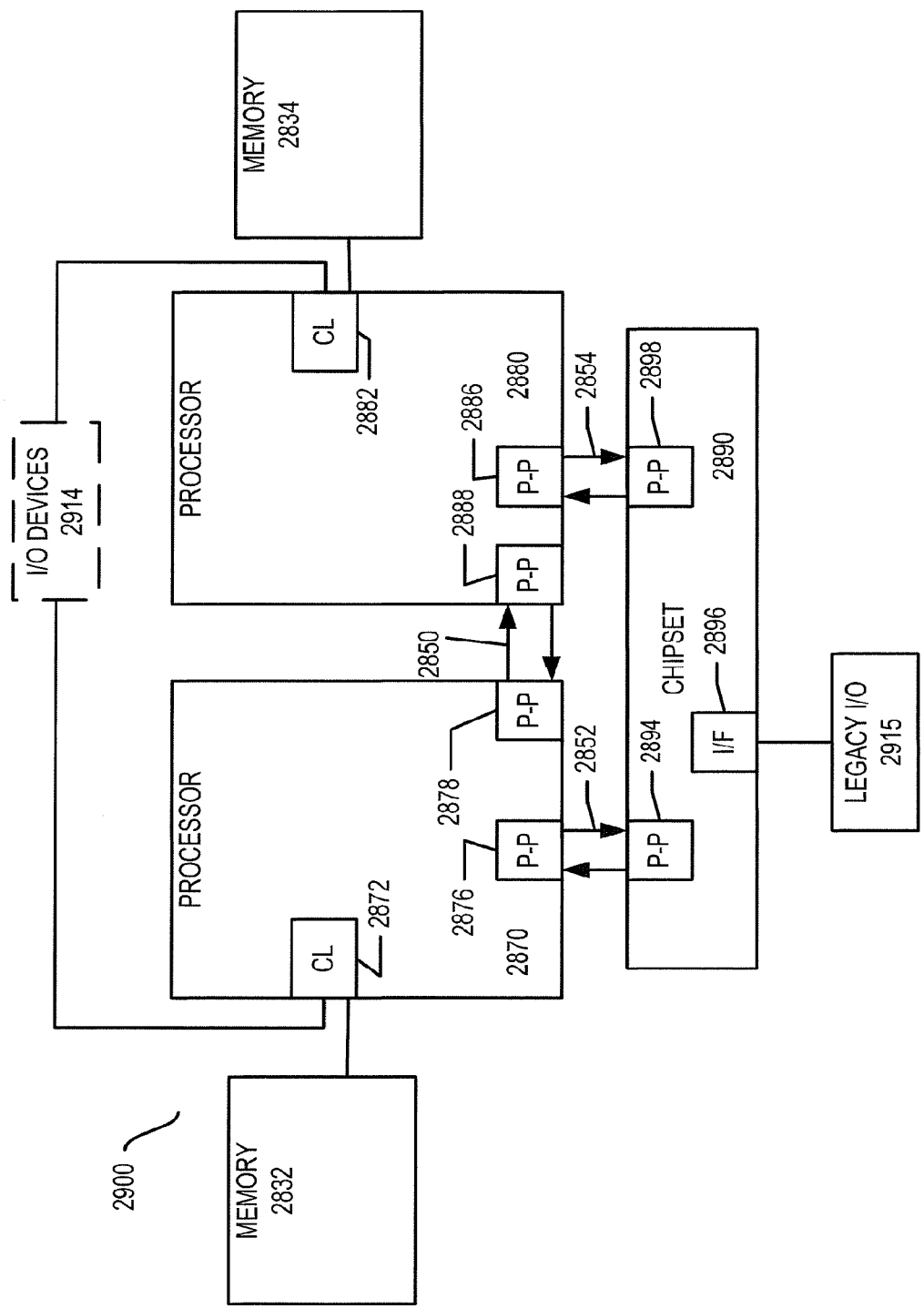
FIG. 29, shown is a block diagram of a second more specific exemplary system in accordance with an embodiment of the present invention.

Referring now to FIG. 29, shown is a block diagram of a second more specific exemplary system 2900 in accordance with an embodiment of the present invention. Like elements in FIGS. 28 and 29 bear like reference numerals, and certain aspects of FIG. 28 have been omitted from FIG. 29 in order to avoid obscuring other aspects of FIG. 29.

FIG. 29 illustrates that the processors 2870, 2880 may include integrated memory and I/O control logic ("CL") 2872 and 2882, respectively. Thus, the CL 2872, 2882 include integrated memory controller units and include I/O control logic. FIG. 29 illustrates that not only are the memories 2832, 2834 coupled to the CL 2872, 2882, but also that I/O devices 2914 are also coupled to the control logic 2872, 2882. Legacy I/O devices 2915 are coupled to the chipset 2890.

Figure 30:
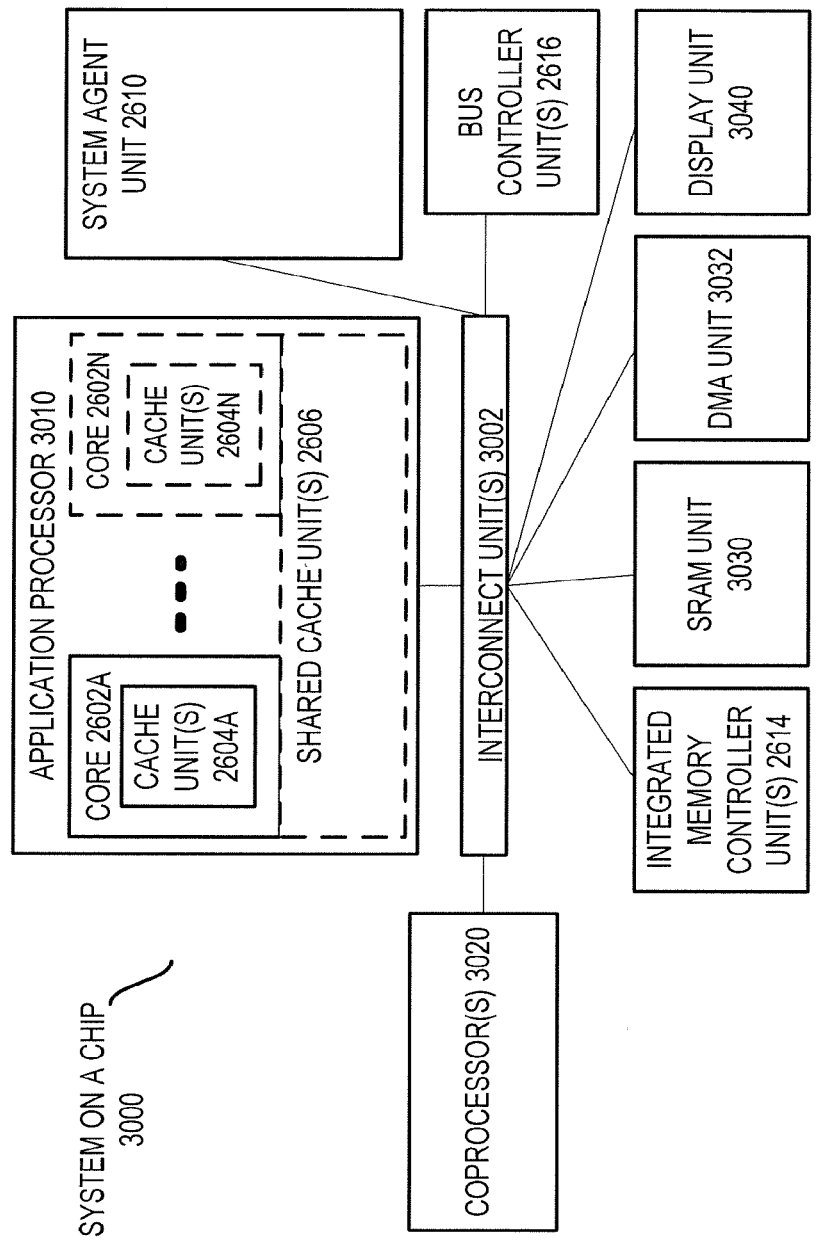
FIG. 30, shown is a block diagram of a SoC in accordance with an embodiment of the present invention.

Referring now to FIG. 30, shown is a block diagram of a SoC 3000 in accordance with an embodiment of the present invention. Similar elements in FIG. 26 bear like reference numerals. Also, dashed lined boxes are optional features on more advanced SoCs. In FIG. 30, an interconnect unit(s) 3002 is coupled to: an application processor 3010 which includes a set of one or more cores 202A-N and shared cache unit(s) 2606; a system agent unit 2610; a bus controller unit(s) 2616; an integrated memory controller unit(s) 2614; a set or one or more coprocessors 3020 which may include integrated graphics logic, an image processor, an audio processor, and a video processor; an static random access memory (SRAM) unit 3030; a direct memory access (DMA) unit 3032; and a display unit 3040 for coupling to one or more external displays. In one embodiment, the coprocessor(s) 3020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2830 illustrated in FIG. 28, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 31 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 31 shows a program in a high level language 3102 may be compiled using an x86 compiler 3104 to generate x86 binary code 3106 that may be natively executed by a processor with at least one x86 instruction set core 3116. The processor with at least one x86 instruction set core 3116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3104 represents a compiler that is operable to generate x86 binary code 3106 (e.g., object code) that can, with or without additional linkage processing, be executed on the processor with at least one x86 instruction set core 3116. Similarly, FIG. 31 shows the program in the high level language 3102 may be compiled using an alternative instruction set compiler 3108 to generate alternative instruction set binary code 3110 that may be natively executed by a processor without at least one x86 instruction set core 3114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3112 is used to convert the x86 binary code 3106 into code that may be natively executed by the processor without an x86 instruction set core 3114. This converted code is not likely to be the same as the alternative instruction set binary code 3110 because an instruction converter capable of this is difficult to make; however, the converted code will accomplish the general operation and be made up of instructions from the alternative instruction set. Thus, the instruction converter 3112 represents software, firmware, hardware, or a combination thereof that, through emulation, simulation or any other process, allows a processor or other electronic device that does not have an x86 instruction set processor or core to execute the x86 binary code 3106.

While the sequences of numbers disclosed herein are useful for control indexes, their use is not limited to control indexes. They may also be used for other purposes (e.g., as input to other instructions or algorithms). In other embodiments, sequences of other numbers of integers (e.g., 6, 12, 20, 24, 128, etc.) may be stored.

The methods shown in the block flow diagrams herein may be performed by general-purpose processors, special-purpose processors (e.g., a graphics processors or a digital signal processors), or other types of digital logic devices or instruction processing apparatus. In various embodiments, the instructions may be received at the instruction processing apparatus, the processor, or a portion thereof (e.g., a decoder, instruction converter, etc.). In various aspects, the instruction may be received at the processor from an off-processor source (e.g., from a main memory, a disc, or a bus/interconnect), or from an on-processor source (e.g., from an instruction cache, instruction fetch unit, etc.). In some embodiments, the methods may be performed by the processor of FIG. 1 and/or the instruction processing apparatus of FIG. 4. Alternatively, the methods may be performed by different embodiments of processors and/or instruction processing apparatus. Moreover, the processor of FIG. 1 and/or the instruction processing apparatus of FIG. 4 may perform operations and methods that are either the same as, similar to, or different than those of the methods shown in the block flow diagrams.

The methods shown in the block flow diagrams herein describe operations that are visible from outside a processor or instruction processing apparatus (e.g., visible from a software perspective). For example, the instruction is provided to the processor and a result is stored in an architecturally visible storage location in response to the instruction. In other embodiments, any of these methods may optionally include one or more other operations occurring internally within the processor or instruction processing apparatus. By way of example, the instructions may be fetched, the instructions may be decoded or otherwise converted into one or more other instructions or control signals, execution units may be enabled to perform the operations according to the instructions, microarchitectural operations to implement the operations of the instructions may be performed (e.g., sequences of integers may be calculated or accessed from a non-architecturally visible storage location of an on-die ROM), etc.

The terms "coupled" and "connected," along with their derivatives, may be used herein. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register through one or more intervening components. In the figures, arrows are used to show couplings.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

Various operations and methods have been described. Some of the methods have been described in a basic form in the flow diagrams, but operations may optionally be added to and/or removed from the methods. In addition, a particular order of the operations may have been described, according to example embodiments, it is to be understood that that particular order is exemplary. Alternate embodiments may optionally perform the operations in different order, combine certain operations, overlap certain operations, etc.

Certain operations may be performed by hardware components, or may be embodied in machine-executable or circuit-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to instructions, microinstructions, or one or more control signals, derived from a machine instruction to perform certain operations.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
   a plurality of vector registers, including a destination vector register;
   a plurality of general-purpose registers;
   a plurality of mask registers;
   a decoder to decode an instruction specifying an integer offset, specifying an integer stride, and having a field specifying the destination vector register, wherein the instruction has one of an immediate specifying the integer offset and a field specifying a source register specifying the integer offset, wherein the instruction has one of an immediate specifying the integer stride and a field specifying a source register specifying the integer stride; and
   an execution unit coupled to the decoder and coupled to the plurality of vector registers, the execution unit to execute the instruction to generate and store a result in the destination vector register, the result including a sequence of at least eight integer indexes in numerical order, in which a least significant integer index of the sequence is equal to the integer offset, and in which all integer indexes of the sequence in consecutive positions differ by the integer stride.

2. The processor of claim 1, wherein the instruction has the immediate specifying the integer offset, and the instruction has the field specifying the source register specifying the integer stride.

3. The processor of claim 1, wherein the instruction has the immediate specifying the integer stride, and the instruction has the field specifying the source register specifying the integer offset.

4. The processor of claim 1, wherein the instruction has one or more immediates specifying the integer offset and the integer stride.

5. The processor of claim 1, wherein the instruction has one or more fields specifying one or more source registers specifying the integer offset and the integer stride.

6. The processor of claim 1, wherein the result is to include the sequence of at least thirty-two integer indexes in the numerical order.

7. The processor of claim 1, wherein the destination vector register comprises 512-bits.

8. The processor of claim 1, further comprising:
a level 1 cache; and
a level 2 cache.

9. The processor of claim 1, wherein the decoder and the execution unit are included in an out-of-order core, and wherein the out-of-order core comprises a reorder buffer (ROB).

10. The processor of claim 1, wherein the processor is a reduced instruction set computing (RISC) processor.

11. A processor comprising:
a plurality of vector registers, including a destination vector register that has 512-bits;
a plurality of general-purpose registers;
a plurality of mask registers;
a reorder buffer (ROB);
a decoder to decode an instruction having an immediate to specify an integer offset, having a field to specify a source register that is to specify an integer stride, and having a field to specify the destination vector register; and
an execution unit coupled to the decoder and coupled to the plurality of vector registers, the execution unit to execute the instruction to generate and store a result in the destination vector register, the result including a sequence of at least thirty-two integer indexes in numerical order, in which a least significant integer index of the sequence is equal to the integer offset, and in which all integer indexes of the sequence in consecutive positions differ by the integer stride,
wherein the processor is a reduced instruction set computing (RISC) processor.

* * * * *